(12) United States Patent
Stern-Berkowitz et al.

(10) Patent No.: US 11,743,079 B2
(45) Date of Patent: Aug. 29, 2023

(54) UPLINK OPERATION FOR LTE IN AN UNLICENSED BAND

(71) Applicant: INTERDIGITAL PATENT HOLDINGS, INC., Wilmington, DE (US)

(72) Inventors: Janet A. Stern-Berkowitz, Little Neck, NY (US); Pouriya Sadeghi, San Diego, CA (US); J. Patrick Tooher, Montreal (CA); Samian Kaur, Plymouth Meeting, PA (US); Marian Rudolf, Montreal (CA); Pascal M. Adjakple, Great Neck, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/875,064

(22) Filed: Jul. 27, 2022

(65) Prior Publication Data

US 2022/0368574 A1 Nov. 17, 2022

Related U.S. Application Data

(63) Continuation of application No. 16/785,309, filed on Feb. 7, 2020, now Pat. No. 11,405,246, which is a (Continued)

(51) Int. Cl.
*H04W 16/14* (2009.01)
*H04W 72/12* (2023.01)
(Continued)

(52) U.S. Cl.
CPC ........ *H04L 27/0006* (2013.01); *H04L 5/0048* (2013.01); *H04W 16/14* (2013.01);
(Continued)

(58) Field of Classification Search
CPC . H04L 27/0006; H04L 5/0048; H04L 5/0007; H04L 5/0091; H04W 16/14; H04W 72/1215; H04W 72/1268; H04W 74/085
See application file for complete search history.

(56) References Cited

U.S. PATENT DOCUMENTS 8,705,398 B2 4/2014 Koskela et al.
9,143,299 B2 9/2015 Seo et al.
(Continued)

FOREIGN PATENT DOCUMENTS

CN 101669401 A 3/2010
CN 102474486 A 5/2012
(Continued)

OTHER PUBLICATIONS

3rd Generation Partnership Project (3GPP), R1-101773, "SRS Transmission in LTE-A", CATT, 3GPP TSG RAN WG1 Meeting #60bis, Beijing, China, Apr. 12-16, 2010, 3 pages.
(Continued)

*Primary Examiner* — Ahmed Elallam
(74) *Attorney, Agent, or Firm* — Condo Roccia Koptiw LLP

(57) ABSTRACT

Systems, methods, and instrumentalities are disclosed for Uplink operation in LTE unlicensed spectrum (LTE-U). A wireless transmit/receive unit (WTRU) may receive licensed assisted access (LAA) configuration information, e.g., for a first cell from a second cell. The first cell may be associated with operation in an unlicensed band, and the second cell may be associated with operation in a licensed band. The WTRU may determine whether a first subframe is a sounding reference signal (SRS) subframe for the first cell. If the first subframe is an SRS subframe for the first cell, the WTRU may determine SRS resources for the first subframe and determine whether the WTRU is triggered to transmit an SRS transmission in the first subframe. If it is determined the
(Continued)

WTRU is triggered to transmit the SRS transmission in the first subframe, the WTRU may transmit the SRS transmission on the SRS resources for the first subframe.

14 Claims, 9 Drawing Sheets

Related U.S. Application Data continuation of application No. 16/183,277, filed on Nov. 7, 2018, now Pat. No. 11,502,882, which is a continuation of application No. 15/543,794, filed as application No. PCT/US2016/015464 on Jan. 28, 2016, now Pat. No. 10,171,276.

(60) Provisional application No. 62/204,135, filed on Aug. 12, 2015, provisional application No. 62/160,924, filed on May 13, 2015, provisional application No. 62/108,934, filed on Jan. 28, 2015.

(51) Int. Cl.
  *H04L 5/00* (2006.01)
  *H04L 27/00* (2006.01)
  *H04W 72/1268* (2023.01)
  *H04W 74/08* (2009.01)

(52) U.S. Cl.
  CPC ... *H04W 72/1215* (2013.01); *H04W 72/1268* (2013.01); *H04W 74/085* (2013.01)

(56) References Cited

U.S. PATENT DOCUMENTS

| | | | |
|---|---|---|---|
| 9,603,169 B2 | 3/2017 | Kim et al. | |
| 9,609,666 B2* | 3/2017 | Sun | H04W 74/0808 |
| 9,762,356 B2 | 9/2017 | Rudolf et al. | |
| 9,813,208 B2 | 11/2017 | Kim et al. | |
| 9,872,181 B2* | 1/2018 | Hwang | H04W 72/541 |
| 9,949,275 B2 | 4/2018 | Chen et al. | |
| 9,973,310 B2 | 5/2018 | Noh et al. | |
| 9,986,559 B2 | 5/2018 | Bontu et al. | |
| 10,129,908 B2* | 11/2018 | Kwon | H04W 16/14 |
| 10,171,276 B2 | 1/2019 | Stern-Berkowitz et al. | |
| 10,182,430 B2 | 1/2019 | Futaki | |
| 10,257,863 B2* | 4/2019 | Bergström | H04W 74/0833 |
| 10,314,059 B2* | 6/2019 | Lee | H04W 74/0808 |
| 10,362,602 B2* | 7/2019 | Yang | H04L 25/00 |
| 10,531,486 B2 | 1/2020 | Park et al. | |
| 10,630,442 B2 | 4/2020 | Seo et al. | |
| 10,791,027 B2* | 9/2020 | Sadek | H04W 28/0236 |
| 10,849,153 B2* | 11/2020 | Futaki | H04W 72/21 |
| 11,206,619 B2 | 12/2021 | Lee et al. | |
| 11,405,246 B2* | 8/2022 | Stern-Berkowitz | H04W 72/1268 |
| 11,502,882 B2* | 11/2022 | Stern-Berkowitz ... | H04W 16/14 |
| 2010/0091726 A1 | 4/2010 | Ishii et al. | |
| 2011/0044297 A1 | 2/2011 | Lee et al. | |
| 2011/0199944 A1 | 8/2011 | Chen et al. | |
| 2012/0250631 A1 | 10/2012 | Hakola et al. | |
| 2012/0307779 A1 | 12/2012 | Noh et al. | |
| 2012/0314671 A1 | 12/2012 | Noh et al. | |
| 2013/0156014 A1 | 6/2013 | Kim et al. | |
| 2013/0182618 A1 | 7/2013 | Chen et al. | |
| 2013/0235804 A1 | 9/2013 | Kwon et al. | |
| 2014/0254492 A1 | 9/2014 | Noh et al. | |
| 2015/0003351 A1 | 1/2015 | Park et al. | |
| 2015/0063151 A1 | 3/2015 | Sadek et al. | |
| 2015/0296528 A1* | 10/2015 | Coffey | H04W 74/0816 370/338 |
| 2016/0037365 A1* | 2/2016 | Makrakis | H04L 1/203 370/252 |
| 2016/0037510 A1 | 2/2016 | Park et al. | |
| 2016/0050667 A1 | 2/2016 | Papasakellariou et al. | |
| 2016/0066195 A1 | 3/2016 | Moon et al. | |
| 2016/0073344 A1 | 3/2016 | Vutukuri et al. | |
| 2016/0100420 A1 | 4/2016 | Chen et al. | |
| 2016/0226632 A1 | 8/2016 | Zhang et al. | |
| 2016/0227416 A1 | 8/2016 | Suzuki et al. | |
| 2016/0309464 A1 | 10/2016 | Mukherjee et al. | |
| 2016/0338107 A1 | 11/2016 | Zeng et al. | |
| 2016/0360422 A1 | 12/2016 | Zhang et al. | |
| 2017/0041803 A1 | 2/2017 | Shi et al. | |
| 2017/0118728 A1 | 4/2017 | Harada et al. | |
| 2017/0127389 A1 | 5/2017 | Nishikawa et al. | |
| 2017/0230986 A1 | 8/2017 | Moon et al. | |
| 2017/0238190 A1 | 8/2017 | Yang et al. | |
| 2017/0311337 A1 | 10/2017 | Mo et al. | |
| 2017/0332393 A1 | 11/2017 | Lee et al. | |
| 2017/0339568 A1 | 11/2017 | Wang et al. | |
| 2017/0339719 A1* | 11/2017 | Xu | H04W 74/08 |
| 2017/0347270 A1 | 11/2017 | Iouchi et al. | |
| 2017/0374679 A1 | 12/2017 | Park et al. | |
| 2018/0006788 A1 | 1/2018 | Lee et al. | |
| 2018/0041906 A1 | 2/2018 | Jang et al. | |
| 2018/0351704 A1 | 12/2018 | Papasakellariou et al. | |
| 2021/0136594 A1 | 5/2021 | Futaki | |

FOREIGN PATENT DOCUMENTS

| | | | |
|---|---|---|---|
| CN | 102857872 A | 1/2013 | |
| CN | 103580840 A | 2/2014 | |
| CN | 103875187 A | 6/2014 | |
| CN | 104144484 A | 11/2014 | |
| CN | 104254995 A | 12/2014 | |
| EP | 2651047 A2 | 10/2013 | |
| WO | 2012/164531 A1 | 12/2012 | |
| WO | 2014181176 A1 | 11/2014 | |
| WO | WO-2016072908 A1 * | 5/2016 | H04W 74/08 |

OTHER PUBLICATIONS

3rd Generation Partnership Project (3GPP), R1-102978, "Views on Detail Design of Dynamic Aperiodic SRS", KDDI, 3GPP TSG RAN WG1 Meeting #61, Montreal, Canada, May 10-14, 2010, pp. 1-4.
3rd Generation Partnership Project (3GPP), R1-103486, "On Aperiodic SRS Transmission in LTE-A", CATT, 3GPP TSG RAN WG1 Meeting #61bis, Dresden, Germany, Jun. 28-Jul. 2, 2010, 4 pages.
3rd Generation Partnership Project (3GPP), R1-103710, "Email Discussion on Aspects of Dynamic Aperiodic SRS", Texas Instruments, 3GPP TSG RAN WG1 #61bis, Dresden, Germany, Jun. 28-Jul. 2, 2010, pp. 1-7.
3rd Generation Partnership Project (3GPP), R1-104336, "Remaining Issues on Aperiodic SRS Transmission in LTE-A", CATT, 3GPP TSG RAN WG1 Meeting #62, Madrid, Spain, Aug. 23-27, 2010, 3 pages.
3rd Generation Partnership Project (3GPP), R1-105849, "Configuration of Aperiodic SRS", Huawei, HiSilicon, 3GPP TSG RAN WG1 meeting #63, Jacksonville, USA, Nov. 15-19, 2010, 5 pages.
3rd Generation Partnership Project (3GPP), R1-105995, "Configuration for Dynamic Aperiodic SRS Triggering", Alcatel-Lucent Shanghai Bell, Alcatel-Lucent, 3GPP TSG RAN WG1 Meeting #63, Jacksonville, USA, Nov. 15-19, 2010, pp. 1-5.
3rd Generation Partnership Project (3GPP), R1-110242, "Remaining Issues for Aperiodic SRS", NTT DoCoMo, 3GPP TSG RAN WG1 Meeting #63bis, Dublin, Ireland, Jan. 17-21, 2011, pp. 1-4.
3rd Generation Partnership Project (3GPP), R1-110286, "Remaining Details of Aperiodic SRS", Research in Motion, UK Limited, 3GPP TSG RAN WG1 Meeting #63bis, Dublin, Ireland, Jan. 17-21, 2011, 7 pages.
3rd Generation Partnership Project (3GPP), R1-110700, "Outstanding Aspects for Aperiodic SRS Configuration", Texas Instruments, 3GPP TSG RAN WG1 #64, Taipei, Taiwan, Feb. 21-25, 2011, pp. 1-5.
3rd Generation Partnership Project (3GPP), R1-110739, "Remaining Issues for Aperiodic SRS in Rel.10", Samsung, 3GPP TSG RAN WG1 #64, Taipei, Taiwan, Feb. 21-25, 2011, pp. 1-2.

(56) References Cited

OTHER PUBLICATIONS

3rd Generation Partnership Project (3GPP), R1-111670, "Further Discussion on Remaining Details of Aperiodic SRS for LTE Rel-10", Motorola Mobility, 3GPP TSG RAN WG1 Meeting #65, Spain, Barcelona, May 9-13, 2011, pp. 1-3.

3rd Generation Partnership Project (3GPP), R1-140067, "Remaining Details of L1 Signaling for UL-DL Reconfiguration", CATT, 3GPP TSG RAN WG1 Meeting #76, Prague, Czech Republic, Feb. 10-14, 2014, 5 pages.

3rd Generation Partnership Project (3GPP), R1-141518, "Remaining Issues for TDD-FDD CA", ITL Inc., 3GPP TSG RAN WG1 Meeting #76bis, Shenzhen, China, Mar. 31-Apr. 4, 2014, 7 pages.

3rd Generation Partnership Project (3GPP), R1-143827, "Required Functionalities and Design Targets of LAA", ZTE, 3GPP TSG-RAN1#78bis, Ljubljana, Slovenia, Oct. 6-10, 2014, pp. 1-7.

3rd Generation Partnership Project (3GPP), R1-144221, "Design Targets for LAA Using LTE", Hitachi Ltd., 3GPP TSG RAN WG1 Meeting #78bis, Ljubljana, Slovenia, Oct. 6-10, 2014, pp. 1-4.

3rd Generation Partnership Project (3GPP), R1-144626, "Discontinuous Transmission on Scell for LAA", CATT, 3GPP TSG RAN WG1 Meeting #79, San Francisco, USA, Nov. 17-21, 2014, 3 pages.

3rd Generation Partnership Project (3GPP), R1-144970, "Views on issues Related to LAA UL", NTT DoCoMo, 3GPP TSG RAN WG1 Meeting #79, San Francisco, USA, Nov. 17-21, 2014, pp. 1-4.

3rd Generation Partnership Project (3GPP), TS 36.211 V12.1.0, "Technical Specification Group Radio Access Network, Evolved Universal Terrestrial Radio Access (E-UTRA), Physical Channels and Modulation (Release 12)", Mar. 2014, pp. 1-120.

3rd Generation Partnership Project (3GPP), Ts 36.211 V12.4.0, "Technical Specification Group Radio Access Network, Evolved Universal Terrestrial Radio Access (E-UTRA), Physical Channels and Modulation (Release 12)", Dec. 2014, pp. 1-124.

3rd Generation Partnership Project (3GPP), TS 36.212 V12.0.0, "Technical Specification Group Radio Access Network, Evolved Universal Terrestrial Radio Access (E-UTRA), Multiplexing and Channel Coding (Release 12)", Dec. 2013, pp. 1-88.

3rd Generation Partnership Project (3GPP), TS 36.212 V12.3.0, "Technical Specification Group Radio Access Network, Evolved Universal Terrestrial Radio Access (E-UTRA), Multiplexing and Channel Coding (Release 12)", Dec. 2014, pp. 1-89.

3rd Generation Partnership Project (3GPP), TS 36.213 V12.1.0, "Technical Specification Group Radio Access Network, Evolved Universal Terrestrial Radio Access (E-UTRA), Physical Layer Procedures (Release 12)", Mar. 2014, pp. 1-186.

3rd Generation Partnership Project (3GPP), TS 36.213 V12.4.0, "Technical Specification Group Radio Access Network, Evolved Universal Terrestrial Radio Access (E-UTRA), Physical Layer Procedures (Release 12)", 2014, pp. 1-229.

3rd Generation Partnership Project (3GPP), TS 36.321 V12.4.0, "Technical Specification Group Radio Access Network, Evolved Universal Terrestrial Radio Access (E-UTRA), Medium Access Control (MAC) Protocol Specification (Release 12)", Dec. 2014, pp. 1-60.

3rd Generation Partnership Project (3GPP), TS 36.322 V12.1.1, "Technical Specification Group Radio Access Network, Evolved Universal Terrestrial Radio Access (E-UTRA), Radio Link Control (RLC) Protocol Specification (Release 12)", Dec. 2014, pp. 1-40.

3rd Generation Partnership Project (3GPP), TS 36.331 V12.4.1, "Technical Specification Group Radio Access Network, Evolved Universal Terrestrial Radio Access (E-UTRA), Radio Resource Control (RRC), Protocol Specification (Release 12)", Dec. 2014, pp. 1-410.

European Telecommunications Standards Institute (ETSI), EN 301 893 V1.7.1, "Broadband Radio Access Networks (BRAN), 5 GHz High Performance RLAN, Harmonized EN Covering the Essential Requirements of Article 3.2 of the R&TTE Directive", Jun. 2012, pp. 1-90.

TDOC R2-092947, "Increasing reordering depth for Dual Cell operation with MIMO", 3GPP TSG-RAN WG2 #66; Ericsson; San Francisco, USA, May 4-8, 2009, 5 pages.

3GPP TS 36.213 v11.9.0; 3rd Generation Partnership Project; Technical Specification Group Radio Access Network; Evolved Universal Terrestrial Radio Access (E-UTRA); Physical layer procedures (Release 11), Dec. 2014, 182 pages.

* cited by examiner

UPLINK OPERATION FOR LTE IN AN UNLICENSED BAND

CROSS REFERENCE

This application is a continuation of U.S. patent application Ser. No. 16/785,309, filed Feb. 7, 2020, which is a continuation of U.S. patent application Ser. No. 16/183,277, filed Nov. 7, 2018, which is a continuation of U.S. patent application Ser. No. 15/543,794, filed Jul. 14, 2017, now issued U.S. Pat. No. 10,171,276, which is the National Stage entry under 35 U.S.C. § 371 of Patent Cooperation Treaty Application No. PCT/US2016/015464, filed Jan. 28, 2016, which claims the benefit of U.S. Provisional Application No. 62/108,934, filed on Jan. 28, 2015; U.S. Provisional Application No. 62/160,924, filed on May 13, 2015; and U.S. Provisional Application No. 62/204,135, filed on Aug. 12, 2015. The contents of which are hereby incorporated by reference in their entirety.

BACKGROUND

Wireless systems, such as Long Term Evolution (LTE) systems, may have been introduced for use in licensed spectrum. For example, operators may acquire, such as by auction from the government, the right to use a part of a frequency band in an area for transmission and/or reception of wireless signals, in a cellular communications network for example. By using licensed spectrum, an operator may have exclusive use of that spectrum to provide services to its users, for example, without concern for in-band interference from the systems of other operators.

Unlicensed spectrum, which may be used, for example, in non-cellular services and/or applications such as Wi-Fi, may augment service offerings to meet an increased demand for broadband data.

SUMMARY

Systems, methods, and instrumentalities are disclosed for uplink operation in LTE unlicensed spectrum (LTE-U). LTE-U may be implemented using carrier aggregation and/or dual connectivity, and techniques for accessing LTE-U cells may be referred to as License-Assisted Access (LAA). For example, LAA may include a licensed LTE cell providing configuration information for accessing and/or otherwise utilizing an unlicensed cell. For example, certain data and/or signals may be configured to be allowed and/or disallowed on LAA cells. A WTRU may be configured to comply with allowance and/or disallowance configuration(s). A cell type may be identified and/or configured for a serving cell, e.g., LAA and/or non-LAA cells. For example, a cell operating in unlicensed spectrum for which assistance information is provided may be referred to as an LAA cell. A cell operating in a licensed band may be referred to as a non-LAA cell.

LTE may be used to communicate over a licensed spectrum or an unlicensed spectrum. When using LTE operation in unlicensed spectrum, coexistence of LTE with other unlicensed technologies, such as Wi-Fi, and among LTE operators, may be considered in an attempt to minimize interference and/or provide for fairness among the users of the spectrum.

One or more configurations or procedures may be specific to operation in LAA cells. For example, dynamic sounding reference signal (SRS) subframe indication may indicate to a WTRU to reserve a symbol in a subframe for SRS and/or whether to transmit an SRS in a subframe.

A MAC status MAC-CE may provide status and/or statistics for LAA cell transmission failures to the network. For example, MAC Status MAC-CE may provide status on LAA cell transmission failures, due to a busy channel. MAC Status MAC-CE may provide statistics on LAA cell transmission failures, for example, due to a busy channel. Parameters and/or counters may be maintained to modify parameters and/or to track success and/or failure to transmit a MAC PDU. Parameters may be identified to allow and/or disallow non-adaptive (e.g., non-grant based) retransmission on a cell or cell type. A WTRU may receive, select and/or use one or more sets of transmission parameters, e.g., based on one or more channel conditions during a Clear Channel Assessment (CCA). A WTRU may transmit multiple transport blocks (TBs). A WTRU may repeat a TB in a system frame (SF), e.g., based on a channel condition during a CCA. A WTRU may inform an eNB of selected parameter set(s) and/or repetition. A power control method for operation in an LAA cell may be defined, for example, power control that may be based on sources of interference. A dropped UL transmission may be handled by a WTRU acknowledging reception of a UL grant for a failed CCA and/or by WTRU treatment of a UL grant for a failed CCA.

The transmissions on an LAA cell or other cell type, such as radio bearers (RBs), logical channels (LCHs), MAC control elements (MAC-CEs), radio link control (RLC) Status protocol data unit (PDU), uplink control information (UCI), may be allowed. The transmissions on an LAA cell or other cell types, such as RBs, LCHs, MAC-CEs, RLC Status PDU, UCI, may be disallowed. WTRU modifications to comply with the allowance of transmissions including HARQ processing, power headroom reporting, and buffer status reporting may be described herein. WTRU modifications to comply with the disallowance of transmissions including HARQ processing, power headroom reporting, and buffer status reporting may be described herein.

A cell type for a cell, such as an LAA or non-LAA cell for a serving cell configured for a WTRU may be configured. Separate parameters, such as MAC parameters for example, for different cell types may be utilized. For example, a parameter may be identified to allow non-adaptive (e.g., non-grant based) retransmission based on the identity of a cell and/or the cell type. A parameter to disallow non-adaptive (e.g., non-grant based) retransmission on a cell or cell type may be utilized.

The transmissions and separate parameters with and/or without a separate MAC entity for an LAA cell (or cell of a certain type) or group of LAA cells (or cells of a certain type) may be allowed. The transmissions and separate parameters with and/or without a separate MAC entity for an LAA cell (or cell of a certain type) or group of LAA cells (or cells of a certain type) may be disallowed.

Parameters/counters to maintain related to the success/failure of transmitting a MAC PDU, such as TX-ACK, TX-NACK, NOTX_CNT, may be used to modify HARQ and/or PHR.

Dynamic SRS subframe indication may indicate to a WTRU to reserve a symbol in a subframe for SRS. Dynamic SRS subframe indication may indicate to a WTRU whether to transmit an SRS in a subframe.

Opportunistic UL transmission may be based on channel availability, such as in a future subframe or time window.

A WTRU may receive multiple sets of transmission parameters. A WTRU may select and/or use one or more sets, for example, considering one or more channel conditions during a CCA. A WTRU may transmit multiple TBs. A WTRU may repeat a TB in an SF, for example, considering a channel condition during a CCA. A WTRU may inform an eNB of selected parameter set(s) and/or repetition. A power control algorithm may be enhanced, for example, considering different sources of interference. A dropped UL transmission may be handled, for example, by a WTRU acknowledging reception of a UL grant for a failed CCA and/or by WTRU treatment of a UL grant for a failed CCA.

A WTRU may provide one or more radio link (RL) status reports to an eNB. A WTRU may provide a transmission indication that may be used (e.g., by an eNB) to determine transmission presence or successful reception and/or may not be subject to CRC.

A WTRU may receive LAA configuration information, e.g., for a first cell from a second cell. The first cell may be associated with operation in an unlicensed band, and the second cell may be associated with operation in a licensed band. The WTRU may determine whether a first subframe is a SRS subframe for the first cell. If the first subframe is an SRS subframe for the first cell, the WTRU may determine SRS resources for the first subframe and determine whether the WTRU is triggered to transmit an SRS transmission in the first subframe. If it is determined the WTRU is triggered to transmit the SRS transmission in the first subframe, the WTRU may transmit the SRS transmission on the SRS resources for the first subframe.

DETAILED DESCRIPTION

A detailed description will now be described with reference to the various figures. Although this description provides a detailed example of possible implementations, it should be noted that the details are intended to be exemplary and in no way limit the scope of the application.

Figure 1A:
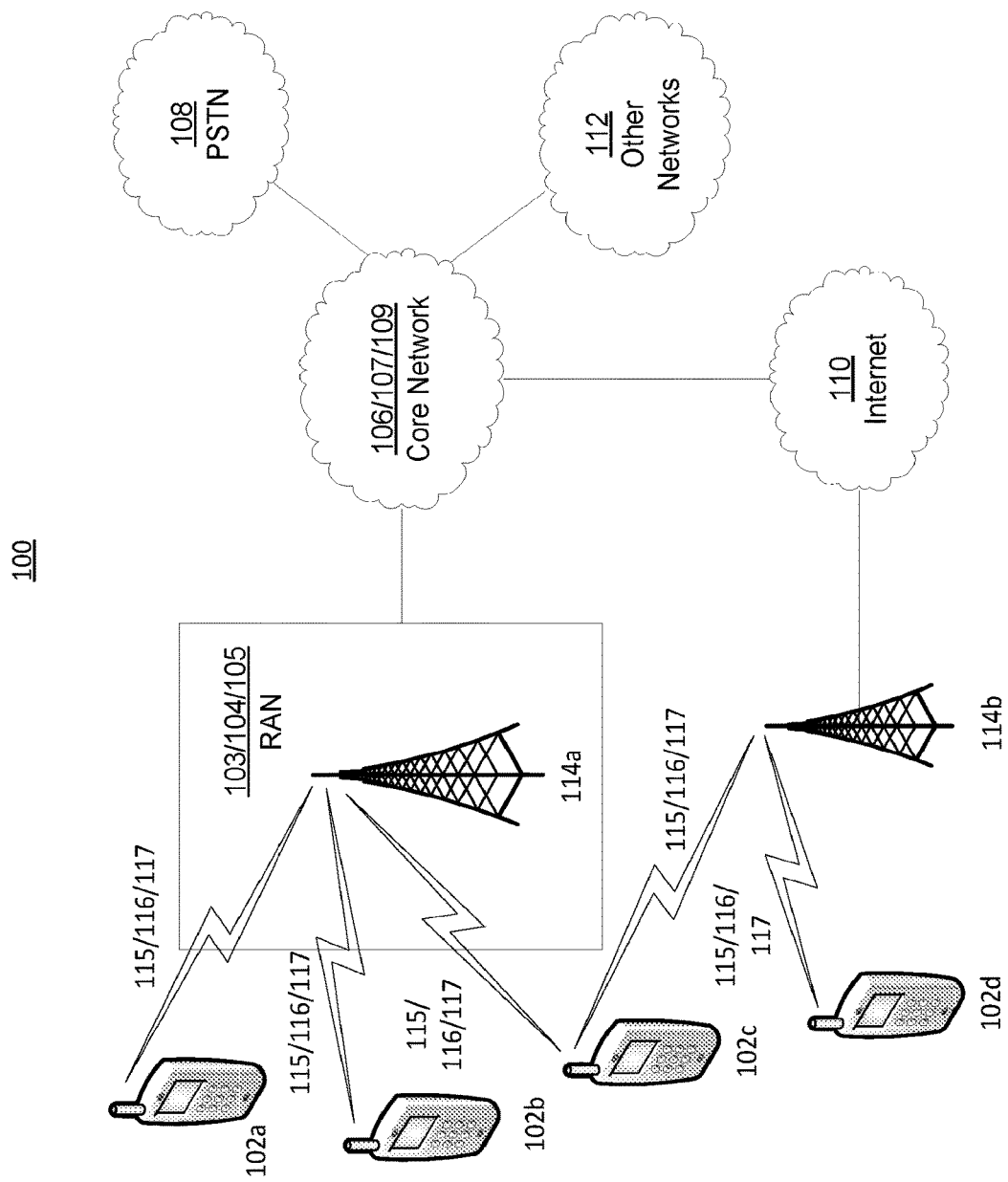
FIG. 1A is a system diagram of an example communications system.

FIG. 1A is a diagram of an example communications system 100. The communications system 100 may be a multiple access system that provides content, for example voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, for example code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include a user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, for example the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), for example a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, the base station 114a may include three transceivers, i.e., one for each sector of the cell. The base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, for example CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

The base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, for example a place of business, a home, a vehicle, a campus, and the like. The base station 114b and the WTRUs 102c, 102d may implement a radio technology such as IEEE 802.11 to establish a wireless local area network (WLAN). The base station 114b and the WTRUs 102c, 102d may implement a radio technology such as IEEE 802.15 to establish a wireless personal area network (WPAN). The base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, for example user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, for example the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
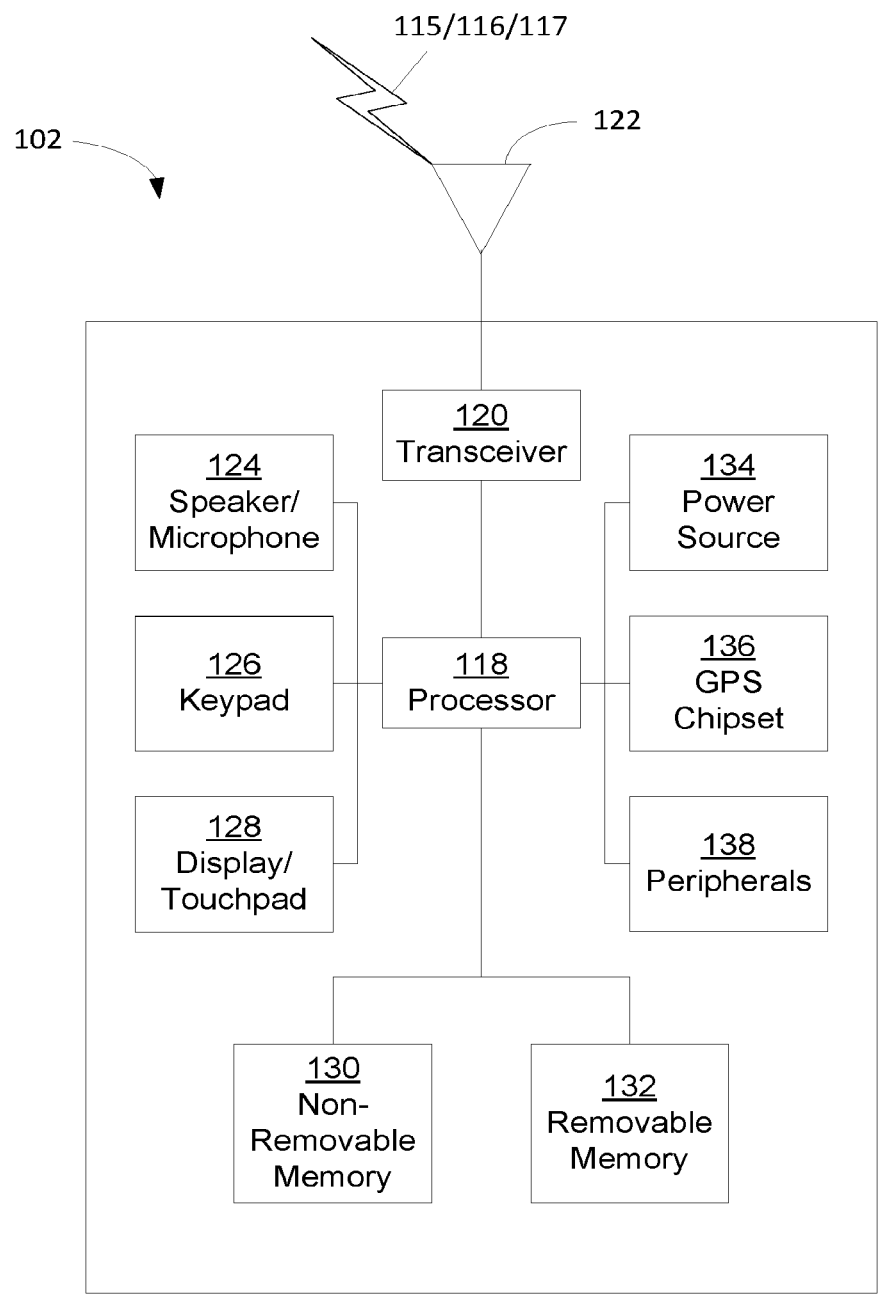
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, for example, but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, the TRU 102 may include two or more transmit/ receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, for example the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, for example on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
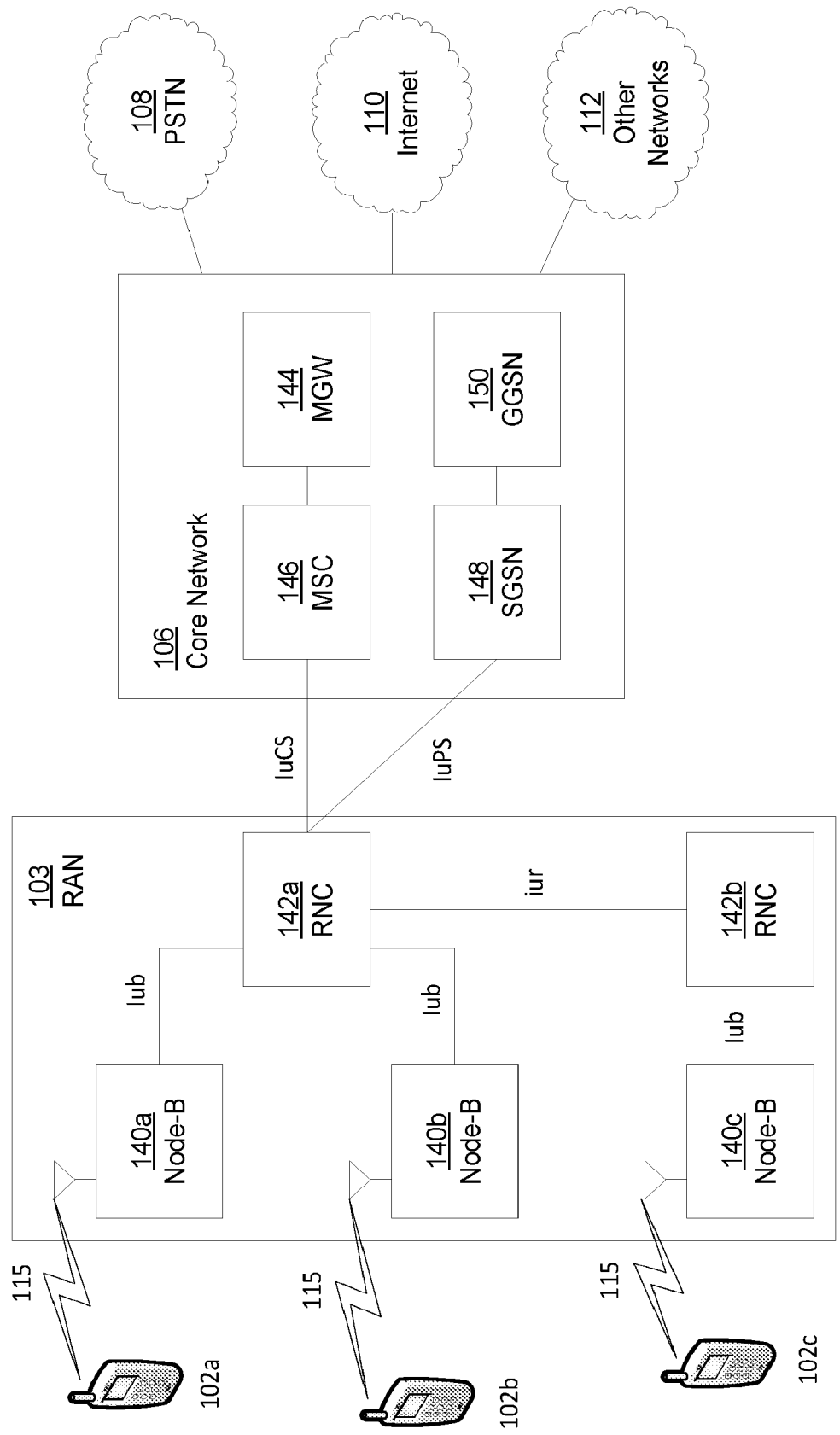
FIG. 1C is a system diagram of an example radio access network and an example core network that may be used within the communications system illustrated in FIG. 1A.

FIG. 1C is a system diagram of the RAN 103 and the core network 106. As noted above, the RAN 103 may employ a UTRA radio technology to communicate with the WTRUs 102a, 102b, 102c over the air interface 115. The RAN 103 may also be in communication with the core network 106.

As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, for example outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, for example the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, for example the Internet 110, to facilitate communications between the WTRUs 102a, 102b, 102c and IP-enabled devices.

As noted above, the core network 106 may also be connected to the networks 112, which may include other wired or wireless networks that are owned and/or operated by other service providers.

Figure 1D:
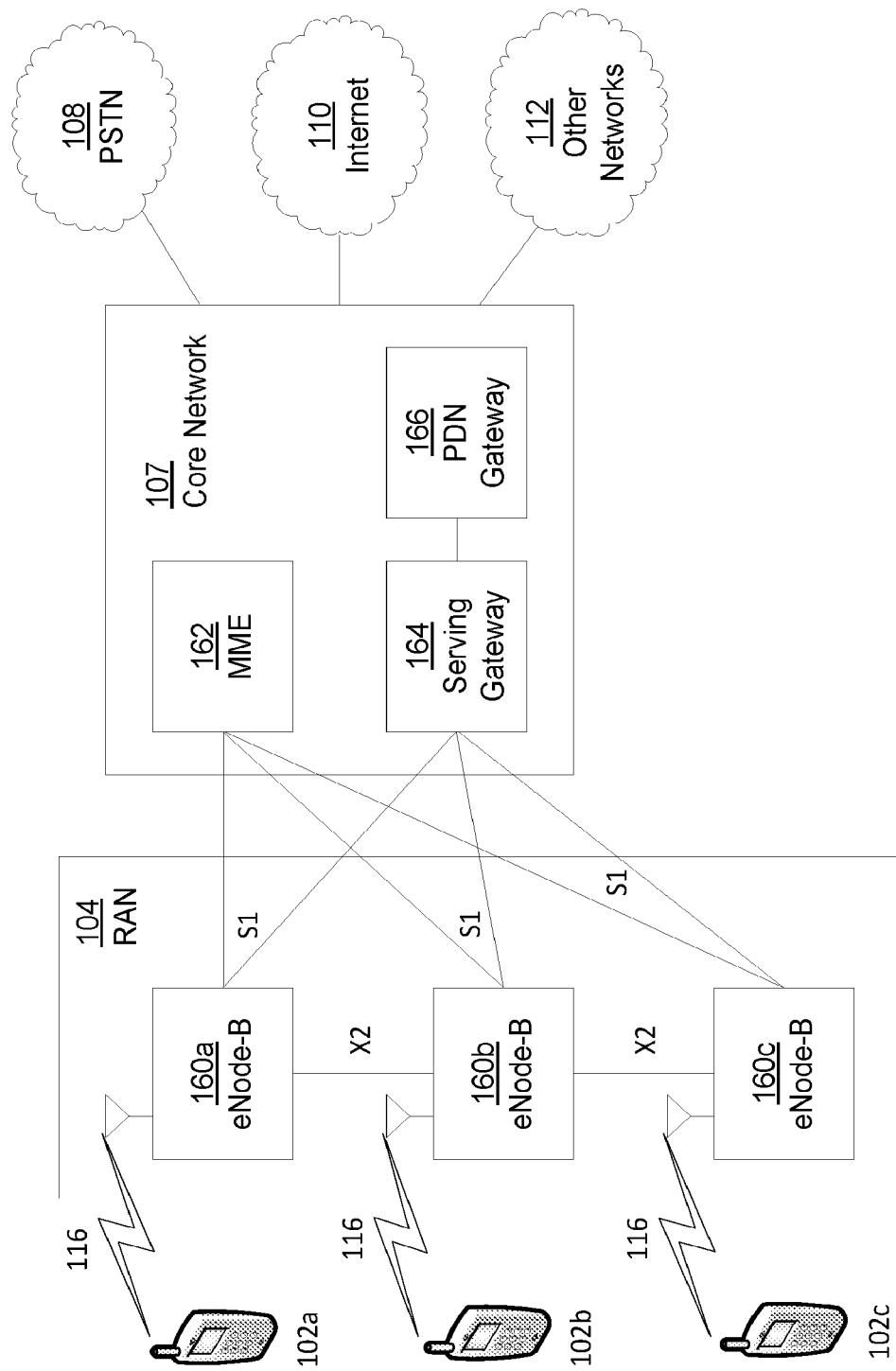
FIG. 1D is a system diagram of an example radio access network and an example core network that may be used within the communications system illustrated in FIG. 1A.

FIG. 1D is a system diagram of the RAN 104 and the core network 107. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. The eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, for example GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, for example anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, for example the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, for example the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
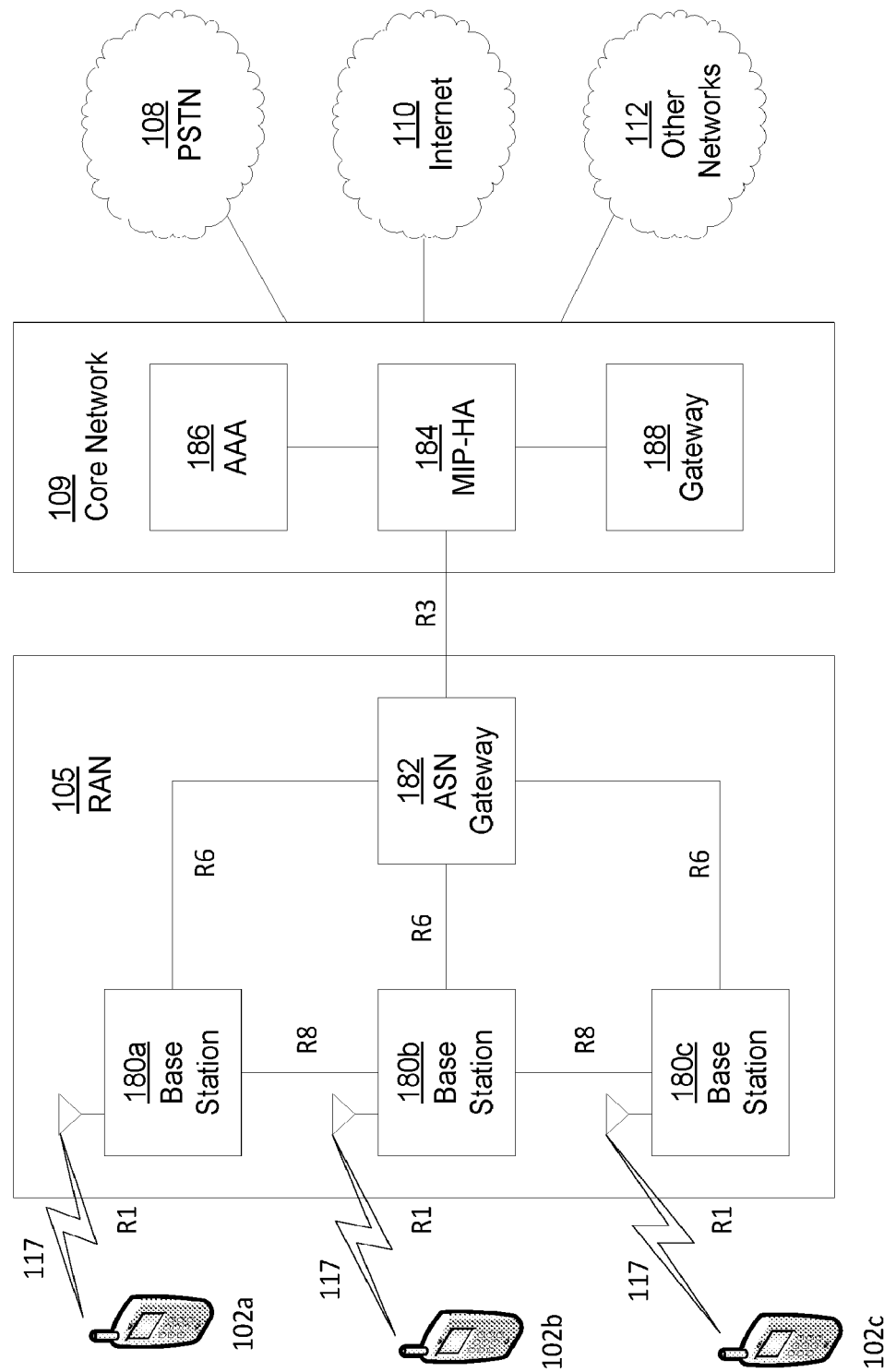
FIG. 1E is a system diagram of an example radio access network and an example core network that may be used within the communications system illustrated in FIG. 1A.

FIG. 1E is a system diagram of the RAN 105 and the core network 109. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways. The base stations 180a, 180b, 180c may each be associated with a particular cell (not shown) in the RAN 105 and may each include one or more transceivers for communicating with the WTRUs 102a, 102b, 102c over the air interface 117. The base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, for example handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, for example the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, for example the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Unlicensed spectrum, which has been previously used for non-cellular services and/or applications such as Wi-Fi, may be considered by cellular operators as a tool to augment service offerings to meet an increased demand for broadband data. For example, an expansion of LTE (and/or another licensed cellular technology) into operation in an unlicensed spectrum may be implemented in order to expand the bandwidth available for user data transmissions. However, extending a cellular technology typically used for licensed-band access (e.g., such as LTE) into operation in an unlicensed band may introduce complexities that may not have previously been an issue when operating in the licensed band. For example, the cellular technology may contend for unlicensed channel resources with other radio access technologies, such as Wi-Fi.

A cell that uses unlicensed spectrum may be known as an unlicensed cell (e.g., an unlicensed carrier). For example, an unlicensed cell may receive and/or transmit signals and/or messages in an unlicensed operating band (e.g., in spectrum that may be unlicensed). An unlicensed cell may be used (e.g., used primarily) for transmitting and/or receiving data traffic. A cell that uses licensed spectrum may be known as a licensed cell (e.g., a licensed carrier). For example, a licensed cell may receive and/or send signals and/or messages in a licensed operating band (e.g., in spectrum that may be licensed).

Carrier aggregation may be employed. For example, carrier aggregation may be employed to extend LTE to unlicensed bands. Carrier aggregation may allow a WTRU to connect to (e.g., transmit signals and/or messages to and/or receive signals and/or messages from) one or more (e.g., two) cells which may be referred to as serving cells. For example, carrier aggregation may aggregate a primary cell (e.g., primary serving cell) that may be a licensed cell (e.g., a cell and/or carrier operating in a licensed band and/or spectrum) with one or more secondary cells (e.g., secondary serving cells) that may be unlicensed cells (e.g., cells and/or carriers operating in an unlicensed band and/or spectrum). Utilizing carrier aggregation to support LTE operation jointly in licensed and/or unlicensed bands may be referred to as "Licensed-Assisted Access" (LAA) (e.g., to unlicensed spectrum). A primary cell or serving cell may be referred to as a PCell. A secondary cell or serving cell may be referred to as a SCell. Cell, carrier, serving cell, and component carrier may be used interchangeably.

Figure 2:
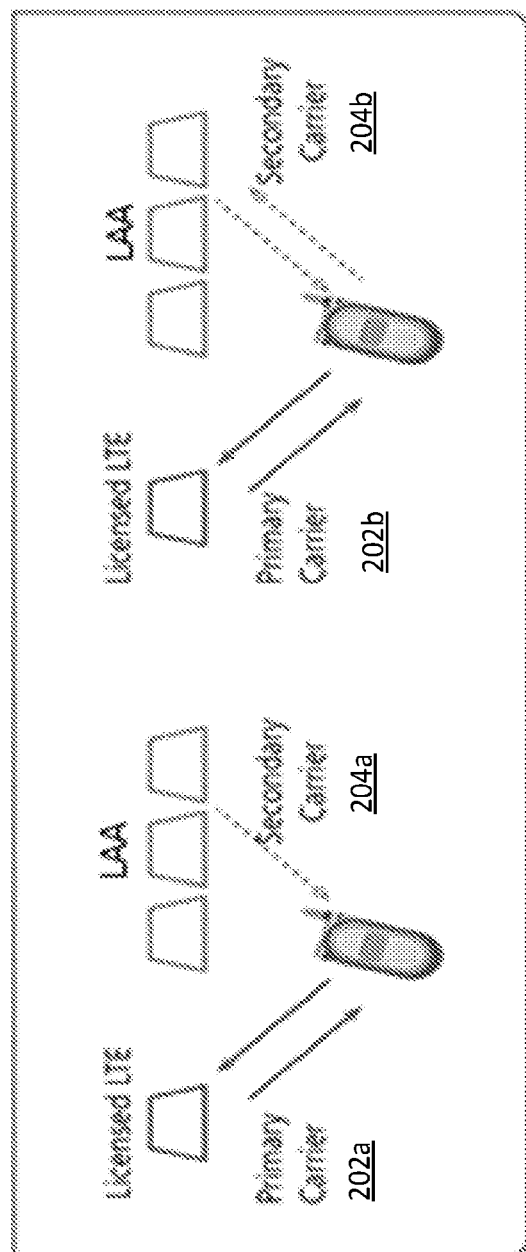
FIG. 2 illustrates an example licensed-assisted access (LAA) deployment.

FIG. 2 illustrates an example licensed-assisted access (LAA) deployment 200. As shown in FIG. 2, in LAA, a primary serving cell or carrier (e.g., PCell) such as 202a, 202b, may be or may use a licensed cell or carrier (e.g., a cell or carrier that may use licensed spectrum). A secondary serving cell or carrier (e.g., SCell) such as 204a, 204b may be or may use an unlicensed cell or carrier (e.g., a cell or carrier that may use unlicensed spectrum). One or more SCells may also be configured to operate in the licensed band. The PCell and SCell(s) may be aggregated to increase the bandwidth available for user transmissions. One or more unlicensed SCells and zero or more licensed SCells may be aggregated together with or without aggregation with a PCell. A PCell and SCells may belong to the same eNB. Primary cells or carriers (e.g., 202a, 202b) may be used for both uplink and downlink transmission, as shown in FIG. 2.

Secondary cells or carriers may be used for one direction (e.g., downlink or uplink) or both uplink and downlink. For example, Secondary Carrier 204a may be a downlink-only carrier and Secondary Carrier 204b may be used for both uplink and downlink transmission.

In a deployment scenario, dual connectivity may be employed for LAA to unlicensed spectrum. For example, access to a first cell that may be using or operating in a licensed band may be performed via communicating with a first base station (e.g., a Master evolved Node-B (MeNB)) and/or access to a second cell that may be using or operating in an unlicensed band may be performed via communicating with a second base station (e.g., a Secondary evolved Node-B (SeNB)). In another example, a WTRU may access or communicate with a first cell that may belong to a first base station or eNodeB (e.g., a MeNB) where the first cell may be using or operating in a licensed band. The WTRU may access or communicate with a second cell that may belong to a second base station or eNodeB (e.g., SeNB) where the second cell may be using or operating in an unlicensed band. The first base station and the second base station may not be co-located, and/or the first and the second base station may be independent from one another. The MeNB may support one or more cells (e.g., via carrier aggregation principles), which may be referred to as a master cell group (MCG). The cells in the MCG may each operate in the licensed band and/or one or more cells in the MCG may operate in the unlicensed band. For example, PCell for the MCG may operate in the licensed band and the SCells for the MCG may also operate in the licensed band. In an example, the PCell for the MCG may operate in a licensed band, one or more SCells for the MCG may operate in a licensed band, and one or more other SCells for the MCG may operate in an unlicensed band. In an example, the PCell for the MCG may operate in a licensed band and each of the one or more SCells for the MCG may operate in an unlicensed band.

In a dual connectivity deployment scenario, the SeNB may be associated with one or more cells which may be referred to as a Secondary Cell Group (SCG). For example, the SCG may include a primary secondary cell (PSCell) and one or more SCells. If carrier aggregation is not utilized by the SeNB, then there may be zero SCells in the SCG. The PSCell and/or the SCells of the SCG may be licensed cells (e.g., operating in a licensed band) or unlicensed cells (e.g., operating in an unlicensed band) and/or some combination of licensed and unlicensed cells.

LTE may be utilized to communicate over a licensed spectrum and/or an unlicensed spectrum. When using LTE operation in unlicensed spectrum, coexistence of LTE with other unlicensed technologies (e.g., such as Wi-Fi, other unlicensed spectrum LTE operators, etc.) may be considered in an attempt to minimize interference and/or provide for fairness among the users of the spectrum. Mechanisms such as Listen-Before-Talk (LBT) and transmission gaps may be used. With LBT, a system node such as an Access Point (AP), eNodeB (eNB), user equipment (UE), a WTRU, and the like, may listen to a channel to determine whether there may be another user using the channel before transmitting on the channel or a portion of the channel. A channel may be a frequency band with a certain center frequency and/or bandwidth. Listening and/or determination of usage by another may include and/or be based on measurements, such as energy detection. With transmission gaps, a system node that may transmit on a channel or part of a channel may include or ensure there are gaps in its transmission, for example, to allow other potential users to see the channel as free and/or use the channel. LTE operation in unlicensed spectrum, which may or may not be combined with operation in licensed spectrum (e.g., which may be with or without aggregation or dual connectivity with a licensed PCell and/or PSCell), may be referred to as LTE-Unlicensed operation or LTE-U.

Channel evaluation may be performed and/or used, for example to support transmission on an unlicensed channel/cell. For example, a potential transmitter on a channel (e.g., a WTRU with UL data available for transmission and/or an eNB with DL data available for transmission) may determine and/or may be configured to determine if the unlicensed channel is available (e.g., relatively free from interference) prior to transmitting the data. For example, the potential transmitter on an unlicensed channel may evaluate and/or monitor (e.g., receive) the channel. The potential transmitter may evaluate and/or monitor the channel to measure and/or determine signal presence on the channel and/or identify whether interference (e.g., another transmission) is present on the channel. A potential transmitter on a channel may measure and/or determine signal presence or interference on the channel prior to transmission, for example in order to determine whether the channel may be in use (e.g., busy and/or occupied) by another system, user, or signal. Such channel evaluation and/or monitoring may be referred to as Listen-Before-Talk (LBT), Clear Channel Assessment (CCA), or LBT/CCA. LBT, CCA, and LBT/CCA may be used interchangeably herein.

The potential transmitter may, for example, as part of LBT/CCA, compare the received signal and/or interference from the channel to some criteria. The criteria for comparison may comprise one or more threshold levels. The potential transmitter may determine based on the comparison whether the channel is free or occupied. A potential transmitter may transmit on a channel, for example, when a potential transmitter determines the channel is free. A potential transmitter may not transmit on the channel, for example, when the potential transmitter determines the channel is occupied. A potential transmitter may defer or delay a potential transmission, for example when the potential transmitter determines the channel is occupied. A potential transmitter may discard a potential transmission, for example when the potential transmitter determines the channel is occupied. A potential transmitter may send the transmission on a licensed cell and/or send a request to transmit the transmission on a licensed cell upon determining that the unlicensed channel is occupied.

Frame Based Equipment (FBE) may refer to equipment (e.g., eNBs, WTRUs, etc.) for which transmit/receive timing may be fixed and/or structured. Equipment such as FBE may refer to or include any node and/or device, such as a WTRU, UE, eNB, STA, or AP, which may transmit and/or receive on a licensed or unlicensed channel.

Load Based Equipment (LBE) may refer to equipment (e.g., eNBs, WTRUs, etc.) for which transmit/receive timing may not be fixed or structured. For LBE, transmit and/or receive timing may be based on when data becomes available for transmission. For example, rather than utilizing a fixed and/or structured pattern for transmissions, the transmission times for LBE may occur at irregular intervals. LBE may perform LBT/CCA whenever the device has data to transmit, for example, when operating on a channel that may be used by others such as an unlicensed channel.

Figure 3:
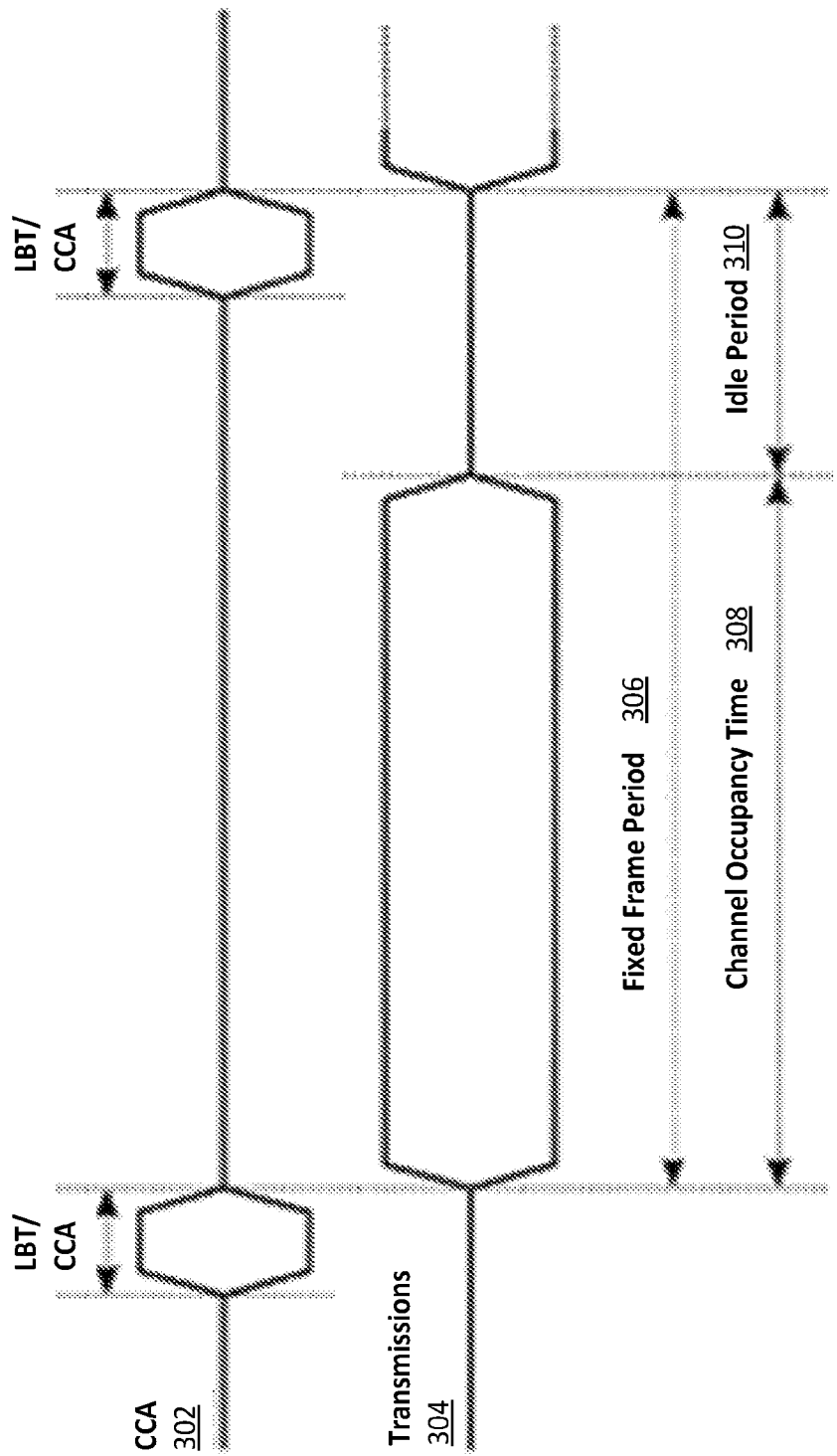
FIG. 3 depicts an example of listen before talk/clear channel assessment (LBT/CCA) timing that may apply to frame based equipment (FBE)

FIG. 3 is an example of LBT/CCA timing that may apply to FBE. As shown on FIG. 3, clear channel assessment (CCA) 302 may be a measurement used to determine whether the channel is free. Transmissions 304 may be the transmissions (e.g., actual transmissions) made if the channel is free. The following may apply to LBT/CCA. For example, the following may apply to some equipment, such as FBE. LBT/CCA may be performed periodically, such as at predefined time instances that may be according to a predetermined frame structure. The LBT/CCA periodicity (e.g., Fixed Frame Period 306) may equal Channel Occupancy Time 308 plus Idle Period 310. The LBT/CCA time period for channel evaluation may be a fixed time. The LBT/CCA time period for channel evaluation may have a minimum time. Channel Occupancy Time 308 may be the total time during which the equipment may have transmissions on a given channel without re-evaluating the availability of that channel. Idle Period 310 may be the time (e.g., a consecutive period of time) during which the equipment may not transmit on the channel. The Channel Occupancy Time 308 may have an allowed range, such as 1 ms to 10 ms. The Idle Period 310 may have a minimum requirement which may be with respect to the Channel Occupancy Time 308, such as 5% of the Channel Occupancy Time 308 which may be used by the equipment for the current Fixed Frame Period 306. Transmission may occur (e.g., transmission may occur immediately). For example, transmission may occur when the equipment finds an operating channel or channels to be clear. The equipment may transmit on the clear channel or channels. The equipment may find an operating channel or channels to be clear during or as a result of LBT/CCA. Equipment may not transmit on a channel (e.g., during the upcoming or next Fixed Frame Period 306), for example, when the equipment finds an operating channel occupied. The equipment may find an operating channel occupied during or as a result of LBT/CCA.

The terms clear, free, unoccupied, not occupied, and/or not busy may be used interchangeably herein. The terms not clear, not free, occupied, and/or busy may also be used interchangeably. The terms channel and operating channel may be used interchangeably.

The following may apply to LBT/CCA. For example, the following may apply to some equipment, such as LBE. Equipment may perform a LBT/CCA check that may detect energy on a channel. For example, equipment may perform a LBT/CCA check that may detect energy on the channel before a transmission and/or a burst of transmissions on an operating channel. Equipment may transmit (e.g., transmit immediately) on a clear channel or channels. For example, equipment may transmit on a clear channel or channels when the equipment finds an operating channel or channels to be clear. Equipment may find the operating channel or channels to be clear during or as a result of LBT/CCA.

Maximum Channel Occupancy Time may be the total time that an equipment may make use of an operating channel for a given transmission or burst of transmissions. Maximum Channel Occupancy Time for certain equipment may be less than a maximum allowed value. The maximum allowed value may be set by the manufacturer of the equipment. For example, the maximum allowed value may be (13/32)×q ms, where q may be set by the manufacturer as a value between 4 and 32. For q=32, the Maximum Channel Occupancy Time may be equal to 13 ms. Equipment may not transmit in a channel (e.g., when the equipment finds an operating channel occupied), for example, until it may perform a subsequent LBT/CCA that may find the channel clear. Equipment may find an operating channel occupied during or as a result of LBT/CCA. An LBT/CCA that may be performed subsequent to one that may have found a channel not clear may involve a wait or backoff time before checking for the clear channel. An LBT/CCA that may be performed subsequent to one that may have found a channel not clear may involve a longer period during which to determine whether the channel may be clear and until subsequently transmitting.

When performing uplink transmissions on an uplink channel that may be subject to contention-based access (e.g., an unlicensed channel), a WTRU may perform channel evaluation to attempt to ensure that the contentious channel is clear prior to sending the uplink transmission. For example, performing channel evaluation for a UL transmission may include a WTRU performing LBT/CCA. Performing LTE channel evaluation for a UL transmission may include a WTRU performing LBT/CCA prior to UL transmissions on a serving cell in an unlicensed band. A WTRU may perform LBT/CCA. For example, a WTRU may perform LBT/CCA during an UL LBT/CCA period (e.g., or time window). A WTRU may perform LBT/CCA prior to some or all UL transmissions. UL may be replaced by another link or direction (e.g., sidelink or downlink) and still be consistent with this disclosure.

The length of the LBT/CCA period may be configured by the eNB. For example, the length of the LBT/CCA period may be configured with a specific value, such as 20 usec. The length of the LBT/CCA period may be dynamically signalled to the WTRU.

The UL LBT/CCA period may be located at the beginning of the current UL subframe. For example, the UL LBT/CCA period may be located in the first SC-FDMA symbol of the UL subframe. The UL LBT/CCA period may be located at the end of the subframe before the current UL subframe. The subframe before the current UL subframe may be an UL, DL, or special subframe. The UL LBT/CCA period may be located in the last SC-FDMA and/or OFDM symbol of that the subframe before the current subframe.

A WTRU may have and/or use a single UL LBT/CCA opportunity for a group of UL subframes (e.g., consecutive UL subframes). A group of UL subframes (e.g., consecutive UL subframes) may be referred to or correspond to a UL block. A UL LBT/CCA for a UL block may fail. For example, a UL LBT/CCA for a UL block may fail when the WTRU finds the channel to be busy. A WTRU may not transmit in the UL in any UL subframes within that UL block. For example, a WTRU may not transmit in the UL in any UL subframes within an UL block when the WTRU finds the channel is busy, for example, when UL LBT/CCA for the UL block finds the channel is busy. A WTRU may transmit in the UL subframes within a UL block. For example, a WTRU may transmit in the UL subframes within a UL block when the WTRU finds a channel to be free, for example, when UL LBT/CCA for the UL block finds the channel to be free.

A WTRU may have and/or use an UL LBT/CCA opportunity for a UL subframe (e.g., each UL subframe). A WTRU may or may not transmit in a UL subframe based on whether UL LBT/CCA finds the channel busy in the UL LBT/CCA opportunity for the UL subframe. A UL LBT/CCA may fail. For example, a UL LBT/CCA may fail when the WTRU finds the channel to be busy. A WTRU may not transmit in the UL in the corresponding UL subframe. For example, a WTRU may not transmit in the UL in the corresponding UL subframe (e.g., to an UL LBT/CCA opportunity) when the WTRU finds the channel to be busy (e.g., during the UL LBT/CCA opportunity). A WTRU may transmit in the corresponding UL subframe. For example, a WTRU may transmit in the corresponding UL subframe (e.g., to an UL LBT/CCA opportunity) when the WTRU finds the channel to be free (e.g., during the UL LBT/CCA opportunity). The failure of a specific UL LBT/CCA opportunity (e.g., the channel being busy) may not impact the UL transmission in another UL subframe.

LTE may be deployed to support LAA access using various types of implementations and/or configurations. For example LAA operation for LTE-U cells may be implemented using carrier aggregation and/or dual connectivity. Transmission of certain types of data and/or signals may be configured to be allowed and/or disallowed. For example, transmission of data and/or signals may be configured to be allowed and/or disallowed on LAA cells and/or transmission of data and/or signals may be configured to be allowed and/or disallowed on other cells or cell types. Transmissions of data, channels, information and/or signals, such as radio bearers (RBs), logical channel (LCHs), medium access control (MAC)-control elements (CEs), RLC Status PDUs and uplink control information (UCI), may be configured for allowance and/or disallowance. A WTRU may comply or may be configured to comply with allowance and/or disallowance configuration(s). For example, a WTRU may comply or be configured to comply with allowance and/or disallowance configuration(s) for HARQ processing, building PDUs from LCHs, power headroom reporting and/or buffer status reporting. A cell type may be identified and/or configured for a cell or serving cell, e.g., of a WTRU. For example, a cell or serving cell may be identified as or configured (e.g., for a WTRU) with a cell type, such as an LAA cell or non-LAA cell.

A sounding reference signal (SRS) subframe may be scheduled, e.g., an SRS subframe may be scheduled in addition to scheduling an SRS trigger. A WTRU may be informed whether a subframe is an SRS subframe. For example, a WTRU may be informed whether a subframe is an SRS subframe when a WTRU receives a grant for UL transmission on an LAA cell. A WTRU may not transmit in an SRS symbol. For example, a WTRU may not transmit in an SRS symbol when a WTRU is informed of an SRS subframe unless the WTRU is also triggered to transmit SRS in that subframe (e.g., the triggers for indicating a subframe is an SRS subframe and for indicating the a given WTRU should transmits SRS in the given subframe may be different/independent).

Dynamic SRS subframe indication may indicate to a WTRU to reserve a symbol in a subframe for SRS. For example, dynamic SRS subframe indications may be used rather than or in addition to higher layer configured (e.g., radio resource control (RRC) configured) static SRS subframes. Dynamic SRS subframe indication may indicate one or more of whether a given subframe includes an SRS opportunity and/or whether a given WTRU is to use the SRS opportunity to transmit an SRS in a subframe (and/or if the WTRU should "blank" the SRS opportunity).

A MAC status MAC-CE may provide status and/or statistics for LAA cell transmission failures, e.g., a MAC status MAC-CE may provide status and/or statistics for LAA cell transmission failures due to a busy channel. Parameters and/or counters may be maintained in relation to a success and/or failure to transmit a MAC PDU, e.g., as may be indicated by TX-ACK, TX-NACK, NOTX_CNT. Parameters and/or counters may be used. For example, parameters and/or counters may be used to modify procedures, such as HARQ and PHR. Parameters, such as MAC parameters, may be identified for different cell types. For example, one or more parameters may be identified to allow and/or disallow non-adaptive (e.g., non-grant based) retransmission on a cell and/or a cell type.

A WTRU may receive multiple sets of transmission parameters. A WTRU may select and/or transmit according to one or more sets of transmission parameters. For example, a WTRU may select and/or use one or more sets of transmission parameters considering one or more channel conditions during a CCA. A WTRU may transmit multiple transport blocks (TBs). A WTRU may repeat a TB in a subframe (SF). For example, a WTRU may repeat a TB in an SF, considering a channel condition during a CCA. A WTRU may inform an eNB of selected parameter set(s) and/or repetition. A power control algorithm may be enhanced. For example, a power control algorithm may be enhanced, considering different sources of interference. A dropped UL transmission may be handled, for example, by a WTRU acknowledging reception of a UL grant for a failed CCA and/or by WTRU treatment of a UL grant for a failed CCA.

In a Third Generation Partnership Project (3GPP) Long Term Evolution (LTE) wireless communication system, a radio frame may consist of ten subframes of 1 ms. A subframe may consist of two timeslots of 0.5 ms. There may a number (e.g., seven or six) Orthogonal Frequency Division Multiplexing (OFDM) symbols per timeslot where the number may depend on the cyclic prefix (CP) length. A resource element (RE) may correspond to a subcarrier during an OFDM symbol interval. Twelve (e.g., twelve consecutive) subcarriers during a timeslot may constitute one resource block.

A time-domain unit for dynamic scheduling may be a subframe. A subframe may consist of two timeslots (e.g., two consecutive timeslots). A subframe consisting of two timeslots may be referred to as a resource block pair. Subcarriers on some OFDM symbols may be allocated to carry pilot signals in the time-frequency grid. Subcarriers on some OFDM symbols may be allocated to carry reference signals in the time-frequency grid. A number of subcarriers at the edges of the transmission bandwidth may be reserved (e.g., may not be transmitted), for example, to comply with spectral mask requirements.

A WTRU may be configured to transmit on one or more uplink channels. For example, a WTRU may be configured to use a Physical UL Shared Channel (PUSCH) and/or Physical UL Control Channel (PUCCH). Uplink control information (UCI) may be transmitted by the WTRU on one or more uplink channels. For example, UCI may be transmitted by a WTRU in a given subframe on the PUSCH or the PUCCH. UCI may be transmitted in part on the PUCCH and in part on the PUSCH. UCI may include one or more of HARQ ACK/NACK, scheduling request (SR), and/or Channel State Information (CSI). Channel State Information (CSI) may include one or more of Channel Quality Indicator (CQI), Precoding Matrix Indicator (PMI), and/or Rank Indicator (RI). Resources may be allocated for PUCCH transmission. Resources for a PUCCH transmission may be located at or near the edges of the UL band.

The downlink channels that may be provided and/or may be used may include Physical Downlink Shared Channel (PDSCH) and/or downlink control channels. Downlink control channels may include one or more of Physical Control Format Indicator Channel (PCFICH), Physical Hybrid-ARQ Indicator Channel (PHICH), Physical Downlink Control Channel (PDCCH), and/or Enhanced PDCCH (EPDCCH).

The first few (e.g., 1 to 3) OFDM symbol(s) in a subframe in the DL may be occupied by one or more of PCFICH, PHICH, and PDCCH. For example, the first few (e.g., 1 to 3) OFDM symbol(s) in a subframe in the DL may be occupied by one or more of PCFICH, PHICH, and PDCCH, according to the overhead of the control channels. The symbols occupied may be referred to as the DL control region. The PCFICH may be transmitted in an OFDM symbol (e.g., symbol 0) in a subframe. The PCFICH may indicate the number of OFDM symbols used for the DL control region in the subframe. A WTRU may detect a Control Format Indicator (CFI) from a PCFICH. The DL control region may be defined in the subframe, for example, according to a CFI value. The PCFICH may be skipped. The PCFICH may be skipped, for example, when a subframe may be defined as a non-PDSCH supportable subframe. DL symbols that are not part of a DL control region may be referred to as the data and/or PDSCH region. EPDCCH may be provided and/or used in the PDSCH region. The location of an EPDCCH in that region may be signalled. The location of an EPDCCH in that region may be signalled, for example, via higher layer signalling to a WTRU. The WTRU may (e.g., or may be expected to) monitor, receive, and/or use the EPDCCH. Higher layer signalling may include Radio Resource Control (RRC) signalling. The PDCCH and/or EPDCCH may provide control information, resource allocations (e.g., grants) for UL, DL transmission, and/or the like.

DL signals and/or DL channels may be provided or transmitted by an eNB. DL signals and/or DL channels may be received by a WTRU. DL signals and/or DL channels may be used by a WTRU. UL signals and/or UL channels may be provided by a WTRU. UL signals and/or UL channels may be transmitted by a WTRU. UL signals and/or UL channels may be received by an eNB. UL signals and/or UL channels may be used by an eNB.

Signals and/or channels may be associated with a cell. The cell may correspond to a carrier frequency. The cell may correspond to a geographic area. A carrier frequency may be a center frequency of a cell (e.g., the center frequency of a cell's supported bandwidth). An eNB may have one or more cells associated with it. In examples described herein, an eNB and a cell may be used interchangeably.

Synchronization signals may include a Primary Synchronization Signal (PSS) and/or a Secondary Synchronization Signal (SSS). Synchronization signals may be provided and/or transmitted. Synchronization signals may be provided and/or transmitted, for example, by an eNB or cell. Such signals may be used by a WTRU to acquire time synchronization with an eNB or cell. Such signals may be used by a WTRU to acquire frequency synchronization with an eNB or cell. The PSS and/or SSS may be present in subframes 0 and/or 5. The PSS and/or SSS may be present in a radio frame (e.g., every radio frame). Transmission may be on a number of subcarriers that may be at the center of a cell's bandwidth. The number may be 62. Five subcarriers on one or more (e.g., each) side of the 62 may be reserved or unused. The synchronization signals may convey information regarding the physical cell identity (e.g., cell ID) of the cell.

A Physical Broadcast Channel (PBCH) may be transmitted by an eNB. A PBCH may carry cell information. A PBCH may carry cell information, such as a Master Information Block (MIB). The PBCH may be provided and/or transmitted in subframe 0 of one or more radio frames (e.g., in each radio frame). The PBCH may be repeated in one or more radio frames (e.g., in each of a number of radio frame). The PBCH may be repeated in one or more (e.g., each) of four radio frames. For example, the PBCH may be repeated in one or more (e.g., each) of four consecutive radio frames; 40 ms time period. The PBCH may be transmitted in the first four OFDM symbols of the second timeslot of subframe 0.

The PBCH may be transmitted on the 72 center subcarriers. The MIB may provide information, such as the DL bandwidth of the cell, PHICH information, and/or at least part of the System Frame Number (SFN), for example, the most significant 8 bits of a 10-bit SFN.

Downlink reference signals may include Cell-specific Reference Signals (CRS), a Channel-State-Information Reference Signal (CSI-RS), a DeModulation Reference Signal (DM-RS), and/or a Positioning Reference Signal (PRS). DL reference signals may be received and/or used by a WTRU. CRS may be used by a WTRU for channel estimation. The CRS may be used by a WTRU for channel state information measurements, for example for the reporting of CQI, PMI, and/or RI. For example, the CRS may be used by a WTRU for channel state information measurements for the reporting of CQI, PMI, and/or RI when the WTRU is configured with a transmission mode using CRS for PDSCH demodulation. The CRS may be used by a WTRU for cell-selection and/or mobility-related measurements. The CRS may be received in subframes (e.g., any subframe). Antenna ports (e.g., up to four antenna ports) may be supported. DM-RS may be used by a WTRU for demodulation of channels (e.g., certain channels). The channels for demodulation may include at least one of EPDCCH and/or PDSCH. The DM-RS that may be used for the demodulation of a channel (e.g., a certain channel, such as EPDCCH or PDSCH) may be transmitted in the resource blocks assigned to the channel (e.g., EPDCCH or PDSCH). CSI-RS may be transmitted. CSI-RS may be transmitted with a duty cycle. CSI-RS may be used by a WTRU for channel state information measurements. For example, CSI-RS may be used by a WTRU for channel state information measurements when the WTRU may be configured with a transmission mode that may use DM-RS for PDSCH demodulation. The CSI-RS may be used for cell-selection and/or mobility-related measurements. For example, the CSI-RS may be used for cell-selection and/or mobility-related measurements when a WTRU may be configured with a certain transmission mode (e.g., TM10). The PRS may be used by a WTRU for position related measurements.

In certain subframes, a WTRU may transmit a Sounding Reference Symbol (SRS). For some cells (e.g., cells in a licensed band), a WTRU may transmit an SRS periodically. For example, a WTRU may transmit an SRS periodically based on a schedule. A WTRU may transmit an SRS periodically based on transmission parameters. One or more of the transmission parameters that may define the SRS periodic transmission may be provided semi-statically to the WTRU by the eNB. For example, transmission parameters may be provided semi-statically to the WTRU via broadcast and/or RRC dedicated signalling (e.g., via a combination of broadcast and/or RRC dedicated signalling). A cell-specific SRS configuration may identify or define subframes (e.g., cell-specific SRS subframes). For example, a cell-specific SRS configuration may identify or define subframes (e.g., cell-specific SRS subframes) in which SRS may be permitted to be transmitted by WTRUs for a given cell. A WTRU-specific SRS configuration may identify or define subframes (e.g., WTRU-specific SRS subframes) and transmission parameters. A WTRU-specific SRS configuration may identify or define subframes (e.g., WTRU-specific SRS subframes) and transmission parameters that may be used by a specific WTRU. The parameters may include one or more of starting resource block, SRS bandwidth, and/or frequency hopping bandwidth. In its WTRU-specific subframes, a WTRU may transmit SRS in a symbol (e.g., the last symbol) across the frequency band (e.g., the entire frequency band) of interest. A WTRU may transmit SRS in a symbol (e.g., across the frequency band of interest) with a single SRS transmission. A WTRU may transmit SRS in a symbol across part of the band with hopping in the frequency domain. For example, a WTRU may transmit SRS in a symbol across part of the band, with hopping in the frequency domain, in such a way that a sequence of SRS transmissions may jointly cover the frequency band of interest.

A WTRU may be configured to determine the frequency band over which SRS is to be transmitted. For example, the frequency band of interest for SRS transmission may be determined from the WTRU-specific starting resource block. The frequency band of interest may be determined from the WTRU-specific SRS bandwidth. A WTRU may transmit SRS on demand. For example, a WTRU may transmit SRS on demand in response to an aperiodic SRS request from an eNB. The aperiodic SRS request from an eNB may be included in an UL grant downlink control information (DCI) format. For example, separate WTRU-specific SRS configurations may be provided to a WTRU for periodic and/or aperiodic SRS transmissions. Multiple WTRU-specific SRS configurations may be provided to a WTRU for aperiodic SRS transmissions. The aperiodic request may indicate the configuration that may apply to the request. SRS may (e.g., may only) be transmitted in a symbol (e.g., the last symbol) of cell-specific SRS subframes. A WTRU may (e.g., may only) transmit SRS in WTRU-specific SRS subframes. The WTRU-specific SRS subframes may be a subset of the cell-specific SRS subframes. The symbol for SRS transmission may be an SC-FDMA symbol. Providing the SRS configuration that defines SRS subframes may be utilized for non-LAA cells while on-demand or dynamic signalling of SRS subframes/SRS transmission opportunities may be used for LAA cells (as is described in more detail herein).

The WTRU may follow rules to determine what to transmit and/or how to transmit. For example, in cell-specific SRS subframes in which PUSCH and/or PUCCH may be scheduled for transmission by a WTRU, the WTRU may follow rules to determine what and how to transmit. A WTRU may shorten the PUSCH transmission. For example, a WTRU may shorten the PUSCH transmission when a PUSCH may be scheduled for transmission in a cell-specific SRS subframe. A WTRU may not map PUSCH to the last symbol. For example, a WTRU may not map PUSCH to the last symbol when the PUSCH transmission may partly or fully overlap with the cell-specific SRS bandwidth. The same rule may apply to a scheduled PUCCH transmission. A scheduled PUCCH may be transmitted without shortening. The SRS may be dropped (e.g., not transmitted). Whether to shorten the PUCCH and/or drop the SRS may be determined by configuration and/or the PUCCH format.

Multiple TDD uplink-downlink subframe configurations may be supported. For example, multiple TDD uplink-downlink subframe configurations may be supported for LTE TDD. One or more of the TDD uplink-downlink subframe configurations may be used in an eNB. One or more (e.g., each) TDD uplink-downlink subframe configuration may contain one or more downlink subframes 'D', uplink subframes 'U', and/or special subframes 'S'. Special subframes may include a DL part, and/or an UL part. Special subframes may include a guard period between the DL part and/or the UL part. For example, special subframes may include a guard period between the DL part and/or the UL part to allow time for the transition from DL to UL. Example uplink-downlink subframe configurations are shown in Table 1. Uplink-downlink subframe configuration and uplink-downlink configuration may be used interchangeably.

TABLE 1

Example TDD Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A WTRU may have and/or be configured with one or more radio bearers and/or one or more logical channels. For example, a WTRU may be configured, by an eNB, with one or more radio bearers and/or one or more logical channels. A radio bearer (RB) may be a signaling radio bearer (SRB). A radio bearer (RB) may be a data radio bearer (DRB). An SRB may correspond to the Control Plane. An SRB may carry RRC signaling messages. Signaling messages may be considered to be data. For example, signaling messages may be considered to be data at the Medium Access Control (MAC) and/or physical layers. The term data may comprise SRB data, DRB data, and the like. A DRB may correspond to an Evolved Packet System (EPS) bearer. An RB may be UL and/or DL. Separate configuration for UL RBs and/or DL RBs may be provided and/or used.

A RB may be assigned and/or mapped by a configuration which may be from the eNB. For example, a RB may be assigned and/or mapped to at least one logical channel. A logical channel may have and/or may be configured with a logical channel priority (e.g., and/or priority level). A logical channel may have and/or be configured with one or more (e.g., additional) priority-related parameters. The logical channel priority (e.g., and/or priority level) and/or the one or more priority-related parameters may be used by the WTRU to determine the order in which data available for the logical channel may be served. Serving a logical channel may comprise preparing data available for the logical channel for transmission. Preparing data available for the logical channel for transmission may comprise including data in an RLC PDU and/or MAC SDU. Preparing data available for the logical channel for transmission may comprise mapping the data to a transport channel. Preparing data available for the logical channel for transmission may comprise transmitting the data. The parameters may include a Prioritized Bit Rate (PBR) and/or a Bucket Size Duration (BSD). Logical channels may be grouped into logical channel groups. A logical channel (LCH) may be UL and/or DL. Separate configuration for UL and/or DL LCHs may be provided and/or used.

A MAC layer, such as a WTRU MAC layer, may perform and/or be responsible for the following functions. A MAC layer, such as a WTRU MAC layer, may perform and/or be responsible for mapping between logical channels and/or transport channels. A MAC layer, such as a WTRU MAC layer, may perform and/or be responsible for multiplexing of SDUs (e.g., MAC SDUs) from one and/or different logical channels onto transport blocks (TB) that may be delivered to the physical layer on transport channels. A MAC layer, such as a WTRU MAC layer, may perform and/or be responsible for demultiplexing of SDUs (e.g., MAC SDUs) from one or different logical channels from transport blocks (TB) that may be delivered from the physical layer on transport channels. A MAC layer, such as a WTRU MAC layer, may perform and/or be responsible for scheduling information reporting. A MAC layer, such as a WTRU MAC layer, may perform and/or be responsible for error correction through HARQ. A MAC layer, such as a WTRU MAC layer, may perform and/or be responsible for priority handling between logical channels, such as of one MAC entity. A MAC layer, such as a WTRU MAC layer, may perform and/or be responsible for Logical Channel prioritization. A MAC layer, such as a WTRU MAC layer, may perform and/or be responsible for transport format selection.

A WTRU may have one or more MAC entities. For example, the MAC layer of a WTRU may have one or more MAC entities. One or more MAC entities of the WTRU may correspond to a scheduler, and/or one or more MAC entities may correspond an eNB, such as an eNB or the eNB with which the WTRU may communicate. In an example, one or more MAC entities may correspond to a set of one or more cells. The MAC entities may correspond to a set of one or more cells that may be a set of serving cells, such as for the WTRU. A MAC entity may correspond to one or more of a scheduler, an eNB, and/or a set of cells.

A set of one or more cells may correspond to a scheduler and/or eNB. A cell may be a macro cell and/or a cell may be a small cell. A set of cells may correspond to a cell group. A set of cells may correspond to a cell group, such as a master cell group (MCG) and/or a secondary cell group (SCG). A set of cells (e.g., cell group) may include a primary cell and/or one or more secondary cells. A primary cell may carry UL control information or a control channel, such as PUCCH, in the UL. A primary cell may be a cell that may carry UL control information and/or a control channel, such as PUCCH, in the UL. The control information and/or control channel may be transmitted by the WTRU. In some examples, such as dual connectivity, a set of cells (e.g., a cell group, such as a SCG), may include a primary secondary cell. A primary secondary cell may carry UL control information and/or a UL control channel, such as PUCCH, for the set of cells or cell group. Set of cells and cell group may be used interchangeably.

An RB may be mapped to, and/or associated with, a logical channel of one or more cell groups. For example, an RB may be mapped to, and/or associated with, a logical channel of each of one or more cell groups. An SRB may be (e.g., may only be) mapped to, scheduled in, transmitted by, and/or received in cells in the MCG. A DRB may be mapped to, scheduled in, transmitted by, and/or received in cells in the MCG and/or SCG. The mapping and/or association may be configured by an eNB, such as by signaling. The signaling may be RRC signaling that may be broadcast and/or dedicated to one or more WTRUs. A DRB may be split over the MCG and/or SCG, for example, when configured to allow this. A WTRU may use a configuration that may be provided by an eNB.

A HARQ entity may be associated with a cell. There may be one or more HARQ entities associated with a MAC entity. The cell may belong to the cell group of a MAC entity. For example, a HARQ entity may be associated with a cell that may belong to the cell group of a MAC entity.

In response to receipt of an UL grant for a cell in a cell group, a WTRU may obtain data from one or more logical channels associated with that cell group to transmit over the granted UL resources.

The terms layer, sublayer, and entity may be used interchangeably. The layers, sublayers, and entities described herein are for example purposes. Other layers, sublayers, aspects, and/or components of a WTRU, or other device, or a WTRU or other device, may be substituted for these and be consistent with examples described herein. eNB, cell, and serving cell may be used interchangeably. The entities and layers described herein may be entities and layers of a WTRU or eNB.

Figure 4:
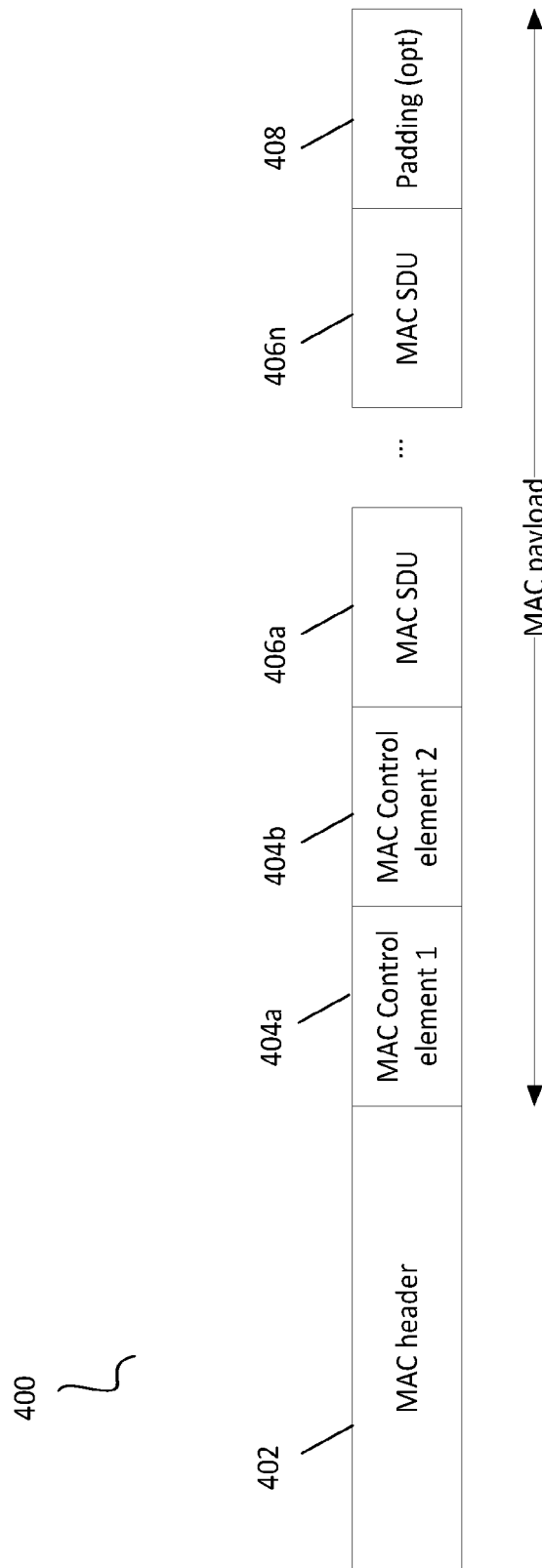
FIG. 4 depicts an example MAC PDU.

FIG. 4 is an example MAC protocol data unit (PDU) 400. A MAC PDU 400 may consist of at least one of a MAC header 402, zero or more MAC Service Data Units (MAC SDU) 406a, 406n, zero or more MAC control elements (MAC-CEs) 404a, 404b, and, optionally, padding 408. One MAC PDU, such as MAC PDU 400, may be transmitted per transport block (TB) per MAC entity. For a serving cell, a WTRU may receive a grant for one or more (e.g., up to two) TBs per transmission time interval (TTI). The TTI may correspond to a subframe. One or more (e.g., two) TBs may be granted for UL MIMO transmission. A (e.g., one) TB may be granted otherwise, for example, when UL MIMO may not be used.

A MAC SDU, such as MAC SDU 406a, may comprise one or more RLC PDUs and/or RLC PDU segments. The MAC header 402 may contain subheaders. The subheaders may provide information regarding the MAC SDUs, such as the identity of the LCH (LCID) and/or LCHs included in one or more (e.g., each) MAC SDU. A MAC SDU, such as MAC SDU 406a, may include an RLC Status PDU for acknowledged mode (AM) transmissions. The Status PDU may be used (e.g., sent) by a receiving side AM RLC. For example, the Status PDU may be used by a receiving side AM RLC to inform its peer transmitting AM RLC about RLC PDUs that may have been received successfully and/or that may have been detected to be lost by the peer receiving side AM RLC.

A MAC-CE, such as MAC-CE 404a, may be and/or may include at least one of a Power Headroom Report (PHR) and/or a Buffer Status Report (BSR).

Use of LBT/CCA to allow or disallow transmission on a serving cell may result in transmission delay. Use of LBT/CCA to allow or disallow transmission on a serving cell may result in the inability to transmit data and/or signals at specific, expected, and/or designated times on that serving cell. Signals, status, messages, data, and the like may be delayed. Signals, status, messages, data, and the like may not be possible to transmit when configured, scheduled, desired, or required.

A WTRU may be configured to perform UL transmissions with an unlicensed cell, while attempting to avoid and/or reduce the impact (e.g., the impact of using unlicensed spectrum or LBT/CCA) to transmissions. The impact may include delay. The impact may include the inability to transmit when configured, scheduled, desired, and/or required. A WTRU may be configured to perform UL transmissions with a cell that may have characteristics or properties that may be different from another cell (e.g., legacy, configured, and the like), such as the WTRU's PCell, while attempting to avoid and/or reduce the impact to transmissions.

An eNB may use one or more SRS transmissions by a WTRU for UL scheduling decisions. SRS transmissions may (e.g., may only) be made in SRS transmission opportunities that may be scheduled or configured. The transmission opportunities may be periodic (e.g., cell-specific and/or WTRU-specific SRS subframes). Channel availability in LAA operation may be unpredictable. Some of the configured and/or scheduled and/or requested UL signal transmissions, such as SRS, PUSCH and/or CSI reporting, may not be transmitted due to the channel being busy.

Channel availability, e.g., unpredictable channel availability, may impact the availability of SRS transmissions. The availability (e.g., limited or reduced availability) of SRS transmissions may impact the eNB's ability to make proper scheduling decisions.

Allowing and/or disallowing transmissions on an LAA cell, or other cell type, such as RBs, LCHs, MAC-CEs, RLC Status PDU, UCI, may be used to avoid and/or reduce the impact to some (e.g., important) transmissions when a WTRU may be configured with a cell that may operate in an unlicensed band and/or that may have characteristics or properties which may be different from another cell.

WTRU modifications (e.g., procedure modifications) may be used to comply with the allowance and/or disallowance of transmissions, such as modifications to HARQ processing, power headroom reporting, and/or buffer status reporting, may be used to avoid and/or reduce the impact to some (e.g., important) transmissions when a WTRU may be configured with a cell that may operate in an unlicensed band and/or that may have characteristics or properties which may be different from another cell.

Identifying a cell type for a cell, such as an LAA or non-LAA cell for a serving cell configured for a WTRU, may be used to avoid and/or reduce the impact to some (e.g., important) transmissions when a WTRU may be configured with a cell that may operate in an unlicensed band and/or that may have characteristics or properties which may be different from another cell.

Separating parameters, such as MAC parameters, for different cell types, may be used to avoid and/or reduce the impact to some (e.g., important) transmissions when a WTRU may be configured with a cell that may operate in an unlicensed band and/or that may have characteristics or properties which may be different from another cell.

Identifying a parameter to allow and/or disallow non-adaptive (e.g., non-grant based) retransmission on a cell or cell type may be used to avoid and/or reduce the impact to some (e.g., important) transmissions when a WTRU may be configured with a cell that may operate in an unlicensed band and/or that may have characteristics or properties which may be different from another cell.

Allowing and/or disallowing transmissions and/or using or configuring separate parameters with and/or without a separate MAC entity for an LAA cell (or cell of a certain type) or group of LAA cells (or cells of a certain type) may be used to avoid and/or reduce the impact to some (e.g., important) transmissions when a WTRU may be configured with a cell that may operate in an unlicensed band and/or that may have characteristics or properties which may be different from another cell.

Generating and/or reporting a MAC Status (e.g., using a MAC-CE) that may provide status and/or statistics on LAA cell transmission failures may be used to avoid and/or reduce the impact to some (e.g., important) transmissions when a WTRU may be configured with a cell that may operate in an unlicensed band and/or that may have characteristics or properties which may be different from another cell. For example, generating and/or reporting a MAC Status (e.g., using a MAC-CE) that may provide status and/or statistics on LAA cell transmission failures due to a busy channel may be used to avoid and/or reduce the impact to some (e.g., important) transmissions when a WTRU may be configured with a cell that may operate in an unlicensed band and/or that may have characteristics or properties which may be different from another cell.

Parameters and/or counters related to the success/failure of transmitting a MAC PDU, such as TX-ACK, TX-NACK, NOTX_CNT, that may be used to modify HARQ and PHR, may be used to avoid and/or reduce the impact to some (e.g., important) transmissions when a WTRU may be configured with a cell that may operate in an unlicensed band and/or that may have characteristics or properties which may be different from another cell.

Dynamic SRS subframe indication that may indicate to a WTRU to reserve a symbol in a subframe for SRS may be used to avoid and/or reduce the impact to some (e.g., important) transmissions when a WTRU may be configured with a cell that may operate in an unlicensed band and/or that may have characteristics or properties which may be different from another cell. Dynamic SRS subframe indication that may indicate to a WTRU whether to transmit an SRS in a subframe may be used to avoid and/or reduce the impact to some (e.g., important) transmissions when a WTRU may be configured with a cell that may operate in an unlicensed band and/or that may have characteristics or properties which may be different from another cell.

Opportunistic UL transmission based on channel availability, such as in a future subframe or time window, may be used to avoid and/or reduce the impact to some (e.g., important) transmissions when a WTRU may be configured with a cell that may operate in an unlicensed band and/or that may have characteristics or properties which may be different from another cell.

In some examples described herein, eNB and cell may be used interchangeably. In some examples, unlicensed and license-exempt (LE) may be used interchangeably. In some examples, operate may be used interchangeably with transmit and/or receive. Component carrier may be used interchangeably with serving cell.

An LTE-U eNB may be an eNB or cell that may transmit and/or receive one or more LTE channels (e.g., physical channels) and/or LTE signals on an unlicensed or non-licensed channel or in an unlicensed or license-exempt (LE) band. An LTE-U eNB may be an eNB or cell that may operate (e.g., transmit and/or receive signals) in an unlicensed or license-exempt (LE) band. The LTE-U eNB may transmit and/or receive one or more LTE channels and/or LTE signals in a licensed band and/or in a LE band. In the LE band in which an LTE-U eNB may operate, one or more other radio access technologies (RATs), such as Wi-Fi, one or more other LTE-U eNBs, and/or one or more WTRUs may exist and/or operate. LTE-U eNB and eNB may be used interchangeably. WTRU may be substituted for eNB and/or vice versa and be consistent with the examples described herein. In some examples, UL may be substituted for DL and/or vice versa and be consistent with the examples described herein. LTE-U and LAA may be used interchangeably and be consistent with examples described herein.

Examples described herein may refer to a channel being utilized by a WTRU or eNB. In some examples, the term channel may refer to a frequency band that may have a center frequency, a carrier frequency, and/or a channel bandwidth. Licensed and/or unlicensed spectrum may include one or more channels. The channels may or may not overlap. The term channel may refer to one or more of a frequency channel, a wireless channel, and/or a LE channel. The terms channel, frequency channel, wireless channel, and LE channel may be used interchangeably. The term accessing a channel may refer transmitting and/or receiving on or over the channel and/or otherwise using the channel. In some examples, a channel may refer to an LTE channel or LTE signal. An LTE channel or LTE signal may include an uplink physical channel, downlink physical channel, uplink physical signal, and/or downlink physical signal that may be defined or used for LTE operation. Downlink channels and downlink signals may include one or more of PSS, SSS, PBCH, PDCCH, EPDCCH, PDSCH, and/or the like. Uplink channels and uplink signals may include one or more of PRACH, PUCCH, SRS, and PUSCH. For purposes of explanation, some examples may be described in terms of LTE channels but the examples may be more generally applicable to other types of channels as well. The terms channels and signals may be used interchangeably herein.

In some examples, the term data/control may mean data and/or control signals. In some examples, the term data/control may mean data and/or control channels. Control may include synchronization. The data/control may be LTE data/control. Data/control, data/control channels, and data/control signals may be used interchangeably. Channels and signals may be used interchangeably. LTE and LTE-A may be used interchangeably.

In some examples, channel resources may be resources (e.g., 3GPP LTE or LTE-A resources) such as time and/or frequency resources. Time and/or frequency resources may (e.g., at least sometimes) carry one or more channels and/or signals. In some examples, channel resources may be used interchangeably with channels and/or signals.

Reference signal, CSI-RS, CRS, DM-RS, DRS, measurement reference signal, reference resource for measurement, CSI-IM, and measurement RS may be used interchangeably. SCell, secondary cell, LTE-U cell, license-assisted cell, unlicensed cell, and LAA cell may be used interchangeably. PCell, primary cell, LTE cell, and licensed cell may be used interchangeably.

Interference and interference plus noise may be used interchangeably.

A WTRU may determine the UL and/or DL directions of one or more subframes. A WTRU may determine the UL and/or DL directions of one or more subframes, for example, according to one or more received and/or configured TDD UL/DL configurations.

One or more signals, status, messages, data, and the like may be transmitted on a non-LAA and/or other type of cell. The parameters related to transmission in one cell or type of cell, such as a cell that may operate in a licensed band, may be unsuitable or suboptimal for transmission in another cell or type of cell, such as a cell that may operate in an unlicensed band.

Examples are described herein to configure, identify, and/or determine what may and/or may not be transmitted on a certain cell or type of cell, such as an LAA cell that may have configured UL. Examples are described herein to perform transmissions in accordance with the configuration, identification, and/or determination.

Examples described herein may be described with respect to UL transmission, but may be applied to DL transmission, and vice versa.

One or more examples described herein may be described with respect to operation in a LAA cell. The procedures and/or architectures described herein may also be applicable to operations in other types of cells, such as cells operating in a licensed band. For many of the examples described herein, another cell or another type of cell may be substituted for, or otherwise be a replacement of, an LAA cell and still be consistent with examples described herein.

Some types of transmissions may be allowed on an LAA cell, and some types of transmissions may not be allowed on an LAA cell. For example, a WTRU may be configured such that the WTRU assumes that any type of transmission is allowed on an LAA cell unless a configuration is determined and/or received that disallows one or more types of transmissions on the LAA cell. In an example, the WTRU may be configured such that the WTRU assumes that no transmissions are allowed on an LAA cell unless a configuration is determined and/or received that allows one or more types of transmissions on the LAA cell. The WTRU may have a default configuration that allows some types of transmission on an LAA cell and disallows other types of transmission on an LAA cell. The default configuration may be modified by a subsequent configuration that changes the types of transmissions that are allowed/disallowed on the LAA cell.

For example, one or more RBs and/or types of RBs may be allowed or disallowed for transmission on an LAA cell. One or more logical channels and/or types of logical channels may be allowed or disallowed for transmission on an LAA cell. For example, when a radio bearer or logical channel is being configured, the configuration may indicate whether or not transmission of the RB/logical channel is allowed over an LAA cell. In an example, MAC control elements and/or certain types of MAC control elements may be allowed or disallowed for transmission over an LAA cell. In an example, RLC status PDUs and/or RLC status PDUs for certain RLC entities may be allowed or disallowed for transmission over an LAA cell. In an example, uplink control information (e.g., CQI, PMI, RI, ACK/NACK, etc.) and/or certain types of UCI may be allowed or disallowed for transmission over an LAA cell.

For example, a radio bearer and/or logical channel may be configured to be allowed or disallowed for transmission over an LAA cell. One or more RBs and/or logical channels may be allowed to be transmitted on an LAA cell. An eNB may provide configuration to a WTRU. The configuration may identify the RBs and/or logical channels that the WTRU may transmit on an LAA cell. The configuration may identify which RBs and/or logical channels over which the WTRU may not transmit on an LAA cell. The configuration may be specific to an LAA cell, a group of LAA cells, or all LAA cells.

A WTRU may receive and/or use a configuration that indicates the types of transmission that are allowed and/or disallowed on an LAA cell. The configuration may be from an eNB. The eNB may identify one or more RBs and/or logical channels the WTRU may transmit on an LAA cell. The eNB may identify one or more RBs and/or logical channels the WTRU may not transmit on an LAA cell.

A WTRU may determine whether it may transmit a RB or logical channel on an LAA cell. For example, a WTRU may allow and/or perform the transmission when the WTRU determines that it may transmit the RB or logical channel on an LAA cell. The WTRU may make the determination based on at least a configuration (e.g., to allow or disallow this transmission) it may have received from the eNB.

An RB or logical channel may be known by the WTRU to be allowed or disallowed on an LAA cell. For example, an RB or logical channel may be known by the WTRU to be allowed or disallowed on an LAA cell without explicit configuration from the eNB. An RB may be an SRB. For example, an SRB or a certain SRB, such as SRB0 or SRB1, may (e.g., may always) be disallowed on an LAA cell. A WTRU may make the determination as to whether it may transmit an RB or logical channel based, at least, on the known allowance or disallowance.

A MAC control element (MAC-CE) of one or more types may be allowed or disallowed for transmission on an LAA cell. Whether a MAC-CE of a certain type may be allowed or disallowed for transmission on an LAA cell may be known and/or configured. For example, whether a MAC-CE of a certain type may be allowed or disallowed for transmission on an LAA cell may be known and/or configured by the eNB. A configuration may allow or disallow a certain type or a set of types. A configuration may be specific to one LAA cell, a group of LAA cells, or all LAA cells. Whether a WTRU may transmit a MAC-CE of a certain type on an LAA cell may be based on whether the WTRU may be allowed to transmit a MAC-CE of the certain type on an LAA cell where the allowance or disallowance to transmit (e.g., on the cell) may be known or configured.

A WTRU may (e.g., may only) include a MAC-CE of a certain type in a MAC PDU that may be transmitted and/or intended for transmission on a cell that may not be an LAA cell. For example, a WTRU may include a MAC-CE of a certain type in a MAC PDU that may be transmitted and/or intended for transmission on a cell that may not be an LAA cell if and/or when a WTRU may determine that transmission of the certain type of MAC-CE may be disallowed for transmission on an LAA cell and/or the WTRU may intend to transmit the MAC-CE of the certain type to an eNB. Determination by a WTRU as to whether transmission may be allowed or disallowed on a certain cell or cell type may be based on known information or configuration.

Transmission of a PHR MAC-CE may be disallowed on an LAA cell. For example, the power headroom reporting may be modified such that PHR may (e.g., may only) be triggered and/or reported when an UL grant (e.g., for new transmission) may be available on another cell or type of cell, such as a cell that may operate in a licensed band.

A PHR MAC-CE may be and/or may include one or more of a normal (e.g., LTE Release 8) PHR MAC-CE, an Extended PHR MAC-CE, and/or a Dual Connectivity PHR MAC-CE among others.

Transmission of a BSR MAC-CE (e.g., of a certain type) may not be allowed on an LAA cell. Buffer status reporting may be modified, such that BSR of one or more types may (e.g., may only) be transmitted on a non-LAA cell.

An RLC Status PDU may be allowed or disallowed for transmission on an LAA cell. Whether an RLC Status PDU may be allowed or disallowed for transmission on an LAA cell may be known or configured. For example, whether an RLC Status PDU may be allowed or disallowed for transmission on an LAA cell may be known or configured by the eNB. A configuration may be specific to one LAA cell, a group of LAA cells, or all LAA cells. A configuration to allow/disallow RLC Status PDU transmission on an LAA cell may be specific to an RLC entity, a group of RLC entities, and/or all RLC entities. A configuration to allow/ disallow RLC Status PDU transmission on an LAA cell may be specific to RLC AM. For example, a configuration to allow/disallow RLC Status PDU transmission on an LAA cell may be specific to an RLC entity that may be configured for AM, a group of RLC entities that may be configured for AM, all RLC entities that may be configured for AM, and/or AM in general.

A WTRU may transmit an RLC Status PDU on an LAA cell. Whether a WTRU may transmit an RLC Status PDU on an LAA cell may be based on whether the WTRU may be allowed to transmit an RLC Status PDU on an LAA cell. Whether the WTRU may be allowed to transmit an RLC Status PDU on an LAA cell may be known or configured.

A WTRU may determine that there may be an RLC Status PDU to transmit to an eNB. The WTRU may determine that transmission of an RLC Status PDU or the specific RLC Status PDU may be disallowed for transmission on an LAA cell. The specific RLC Status PDU may be based on the RLC entity. A WTRU may (e.g., may only) map the RLC Status PDU to a logical channel (or logical channel PDU) that may be allowed for transmission, may be transmitted, and/or may be intended for transmission on a cell of another cell type (e.g., a non-LAA cell). The cell type may be a cell type for which RLC Status transmission may be allowed.

For example, a WTRU may map the RLC Status PDU to a logical channel (or logical channel PDU) that may be transmitted, and/or may be intended for transmission on a cell of another cell type (e.g., non-LAA cell) when the WTRU determines that transmission of an RLC Status PDU or the specific RLC Status PDU (e.g., based on the RLC entity) may be disallowed for transmission on an LAA cell.

A WTRU may (e.g., may only) map the RLC Status PDU to a transport channel (e.g., or MAC PDU) that may be allowed for transmission and/or transmitted and/or intended for transmission on a cell of a cell type for which RLC Status transmission may be allowed (e.g., a non-LAA cell). For example, a WTRU may map the RLC Status PDU to a transport channel (e.g., or MAC PDU) that may be allowed for transmission, transmitted, and/or intended for transmission on a cell of a cell type for which RLC Status transmission may be allowed when the WTRU determines that transmission of an RLC Status PDU or the specific RLC Status PDU (e.g., based on the RLC entity) may be disallowed for transmission on an LAA cell. Determination by a WTRU as to whether transmission may be allowed or disallowed on a certain cell or cell type may be based on known information or configuration.

Uplink control information (UCI) of one or more (e.g., all) types may be disallowed for transmission on an LAA cell. Disallowance may apply to the UCI for one or more cells or cell types. Whether UCI may be allowed or disallowed for transmission on an LAA cell may be known or configured. For example, whether UCI may be allowed or disallowed for transmission on an LAA cell may be preconfigured or known by the WTRU and/or may be configured by the eNB. The configuration may be specific to one LAA cell, a group of LAA cells, or all LAA cells. Whether transmission of UCI may be allowed or disallowed on an LAA cell may be specific to the type of UCI and/or the DL cell for which the UCI may correspond. For example, ACK/NACK (e.g., for any cell) may not be allowed on LAA cells. In an example, ACK/NACK for LAA cells may be allowed on LAA cells. ACK/NACK for non-LAA cells may not be allowed on LAA cells. Whether a WTRU may transmit certain UCI on an LAA cell may be based on whether the WTRU may be allowed to transmit the certain UCI on an LAA cell. Whether the WTRU may be allowed to transmit certain UCI on an LAA cell may be known or configured.

A WTRU may determine that there may be certain UCI to transmit to an eNB. A WTRU may (e.g., may only) include the UCI in a PUSCH that may be transmitted or may be intended for transmission on a cell that may be (or may not be) of a certain cell type. For example, a WTRU may include the UCI in a PUSCH that may be transmitted or intended for transmission on a cell that may be (or may not be) of a certain cell type when the WTRU determines that transmission of the certain UCI may be disallowed for transmission on an LAA cell. The cell may not be an LAA cell. A WTRU may transmit the UCI on PUCCH. For example, a WTRU may transmit the UCI on PUCCH when there may be no PUSCH to be transmitted on a non-LAA cell. Determination by a WTRU as to whether transmission may be allowed or disallowed on a certain cell or cell type may be based on known information or configuration.

A WTRU may transmit the UCI of a certain cell on a PUSCH of a cell in the cell group of the certain cell. For example, a WTRU may transmit the UCI on a PUSCH of a cell in the cell group of a certain cell when a WTRU may have UCI of the certain cell to transmit in a TTI or subframe. The WTRU may transmit the UCI on a PUSCH of a cell in the cell group of the certain cell when there may be a grant for a PUSCH for at least one cell in the cell group. A WTRU may transmit the UCI on a PUSCH of the PCell (or PSCell). For example, a WTRU may transmit the UCI on a PUSCH of the PCell (or PSCell) when there may be a PUSCH grant for the PCell (or PSCell) of the cell group. The WTRU may transmit the UCI on a PUSCH of another cell in the cell group. For example, the WTRU may transmit the UCI on a PUSCH of the secondary cell in the cell group that may have the smallest SCellIndex. SCellIndex may be configured by the eNB.

The UCI to be transmitted may be disallowed from transmission on an LAA cell, for example, due to its type and/or due to the cell to which the UCI may correspond. LAA cells (e.g., or certain LAA cells) may be excluded when determining on which cell the UCI may be transmitted, for example, when the UCI to be transmitted may be disallowed from transmission on an LAA cell. For example, the WTRU may transmit the UCI on a PUSCH of the non-LAA secondary cell in the cell group that may have the smallest SCellIndex, for example, when there may not be a PUSCH grant for the PCell or PSCell. A WTRU may transmit the UCI on PUCCH, for example, when there may not be a PUSCH grant for the PCell or PSCell and/or there may not be a grant for a non-LAA secondary cell.

UCI types may include one or more of HARQ ACK/NACK, Channel Quality Indicator (CQI), Precoding Matrix Indicator (PMI), and/or Rank Indicator (RI).

Disallowance of UCI transmission may not apply to aperiodic CSI reporting. Disallowance of UCI transmission may be configured separately for aperiodic and periodic CSI reporting.

ACK/NACK and one or more (e.g., all) other types of CSI may be separated. For example, ACK/NACK and one or more (e.g., all) other types of CSI may be separated when operating with LAA cells. ACK/NACK reporting may be disallowed on LAA cells. A WTRU may transmit ACK/NACK on the PUCCH. For example, a WTRU may transmit ACK/NACK on the PUCCH when the PUSCH grant(s) in a subframe are for LAA cells. A WTRU may transmit the remainder of the UCI on the PUSCH of an LAA cell, for example, when the PUSCH grant(s) in a subframe may be for LAA cells (e.g., and there are not any PUSCH grants for a non-LAA cell).

Cross carrier scheduling may be used for aperiodic CSI reporting. A WTRU may receive an aperiodic grant and/or trigger for CSI reporting for a cell (e.g., an LAA cell). The cell may have configured and/or activated uplink that may allocate resources for the transmission of the report on the uplink of another cell (e.g., a non-LAA cell).

A cell may be identified as a certain cell type. The type may be specific, such as an LAA cell. The type may be given an identifier, such as type 0, 1, 2, and the like. Such identification may be to a WTRU via configuration. For example, such identification may be to a WTRU via configuration by an eNB. Such identification may be to a WTRU via configuration by an eNB when the cell may be configured (e.g., added or modified) for the WTRU. A cell may have a fixed and/or known type that may not be (e.g., may not need to be) provided via configuration. A certain cell, such as the PCell, may have a fixed type, such as cell type 0.

Allowing transmission on a cell may be according to cell type. Disallowing transmission on a cell may be according to cell type. For example, an eNB may provide configuration to a WTRU. The configuration may allow transmission of a certain RB and/or LCH on a certain cell type. The configuration may disallow transmission of a certain RB and/or LCH on a certain cell type. For example, the configuration may allow or disallow transmission of a certain RB and/or LCH on a cell that may be identified as cell type X, where X may be 0, 1, 2, and the like. An LAA cell may correspond to a cell type. The type may be fixed, such as cell type 1.

Transmission of an SRB may be disallowed on an LAA cell. Transmission of an SRB may be disallowed on a cell of a certain type. One or more transmission parameters and/or transmission techniques may be different for LAA cells than for non-LAA cells. For example, default parameters used for transmission may take a certain value if the transmission is being performed in an LAA cell than for transmissions performed via a non-LAA cell. For example, MAC, HARQ, PHR, and/or BSR parameters may be configured and/or determined separately for different cells, where LAA cells utilize a first set of parameters while non-LAA cells utilize a second set of parameters.

The cells configured with different sets of parameters may be associated with and/or correspond to the same or different MAC entities. The MAC entities may be within the WTRU. For example, if carrier aggregation is utilized to implement LAA (e.g., the LAA cell is implemented as an SCell), then different cells within the same MAC entity may utilize different parameters (e.g., MAC, HARQ, PHR, and/or BSR parameters) for transmission. If dual connectivity is utilized to implement LAA (e.g., a second MAC entity is utilized for LAA), then different MAC entities at the WTRU may utilize different parameters (e.g., MAC, HARQ, PHR, and/or BSR parameters) for transmission.

Parameters may be configured and/or determined separately for different cells and/or types of cells. The following parameters may be configured and/or determined separately for different cells and/or types of cells, such as LAA cells and cells that are not LAA cells. The parameters may include: maximum number of transmissions or retransmissions for UL HARQ (e.g., maxHARQ-Tx); one or more timers related to BSR reporting, such as periodicBSR-Timer, retxBSR-Timer; one or more timers related to PHR reporting, such as periodicPHR-Timer, prohibitPHR-Timer; a threshold for a pathloss and/or P-MPR change that may be used to trigger PH reporting, such as dl-PathlossChange; and/or whether non-adaptive (e.g., non-grant based) retransmission may be allowed.

A WTRU may use the associated parameters that may be configured separately for different types of cells. For example, when performing the related process, such as HARQ, BSR, and/or PHR, a WTRU may use the associated parameters that may be configured separately for different types of cells. The cells may be LAA cells and cells that are not LAA cells.

The WTRU may use one or more parameters that may be configured (e.g., configured separately) for the LAA cell or for LAA cells in general. For example, when performing HARQ processing for a HARQ entity that may belong to an LAA cell, the WTRU may use one or more parameters that may be configured (e.g., configured separately) for the LAA cell or for LAA cells in general.

For a HARQ process, the WTRU may determine the corresponding cell or cell type. The WTRU may determine whether non-adaptive retransmission may be allowed for the cell or cell type. Whether non-adaptive retransmission may be allowed for the cell or cell type may be known or configured. Non-adaptive retransmission may be disallowed for a certain cell or cell type. A WTRU may not perform one or more (e.g., all) aspects of HARQ processing for a certain cell or cell type, for example, when non-adaptive retransmission may be disallowed for the certain cell or cell type. The aspects of HARQ processing that the WTRU may not perform may be related to non-adaptive retransmission for a HARQ process, which may be associated with the certain cell or cell type. A WTRU may (e.g., may only) retransmit a MAC PDU of the HARQ process in response to a grant. The grant may indicate retransmission (e.g., adaptive retransmission).

The MAC architecture utilized for implementing LAA cells may vary. For example, a WTRU may have one or more MAC entities. WTRU, UE, MAC entity, and WTRU MAC entity may be used interchangeably herein. There may be a separate MAC entity or sub-entity for one or more LAA cells or cells of a certain type. For example, there may be one MAC entity per each cell type. A primary MAC entity may be associated with non-LAA cells and a secondary MAC entity may be associated with LAA cells.

There may be a set of cells or a group of cells that may belong to an eNB. This set of cells or group of cells may be subdivided into one or more subsets of cells. For example, this set of cells or group of cells may be subdivided into one or more subsets of cells according to one or more cell types. A subset may include one or more (e.g., all) LAA cells. A subset may include one or more (e.g., all) non-LAA cells. A PCell may be included in the subset of non-LAA cells.

A configuration may be provided. For example, a configuration may be provided by an eNB. A configuration may be used, for example, by a WTRU. The configuration may inform the WTRU to which subset of cells a certain cell or cell type may belong. Separate MAC entities may be used for one or more (e.g., each) subset of cells. There may be a separate MAC sub-entity for one or more (e.g., each) subset of cells. Separate configuration may be provided and/or used for one or more (e.g., each) MAC entity or sub-entity. The configuration may identify what may be allowed for transmission by a certain MAC entity or sub-entity. The configuration may identify what may be disallowed for transmission by a certain MAC entity or sub-entity. The configuration may associate RBs and/or LCHs with the MAC entity or sub-entity. The configuration may identify and/or provide transmission allowance for one or more RBs, LCHs, MAC- CEs of one or more types, RLC Status PDUs, etc. The configuration may identify and/or provide transmission disallowance for one or more RBs, LCHs, MAC-CEs of one or more types, RLC Status PDUs, etc. A configuration may provide parameters, such as MAC, HARQ, PHR, and/or BSR parameters. The mapping of RBs to LCHs may be configured separately for one or more (e.g., each) MAC entity or sub-entity.

There may be a new type of cell group defined for LAA cells (e.g., or other cells). The new type of cell group may be an LAA Cell Group (LACG). An LACG may be a subset of cells in an MCG or a SCG. A WTRU may be configured with a cell. When a WTRU may be configured with a cell, the configuration may identify whether the cell may be in an LACG. The configuration may identify the LACG identity for the cell. A WTRU may be configured with one or more LACGs. A cell may (e.g., may only) belong to one LACG. A cell in a LACG may not be a PCell and/or a PSCell. PUCCH for a cell in a LACG may be transmitted on the associated PCell or PSCell.

The use of a separate MAC entity or sub-entity may be utilized for separating configurations for LAA and non-LAA cells. The use of a separate MAC entity or sub-entity may be inefficient. The LAA cells in a MCG or SCG may share a scheduler (e.g., not need their own scheduler).

A PHR trigger for a cell in one cell group (e.g., MCG or SCG) may result in a PHR transmission to the eNB of both cell groups. For example, in dual connectivity, a PHR trigger for a cell in one cell group (e.g., MCG or SCG) may result in a PHR transmission to the eNB of both cell groups. Cell groups may belong to the same eNB. For LAA and non-LAA cell groups of the same eNB, one PHR transmission for a trigger may be sufficient, for example, since the cell groups may belong to the same eNB.

A single MAC entity may be configured to support cells of different types. For example, cells of different types may be LAA cells and non-LAA cells. Thus, a single MAC entity may handle both one or more non-LAA cells and one or more LAA cells. For example, the MAC entity may support carrier aggregation and one or more of the SCells may correspond to an LAA cell. Separate parameters and/or rules may apply to different cells or cell types. The rules and/or parameters may be known or configured. One or more parameters may be configured. A configuration may be provided, for example, by an eNB. A configuration may be used, for example, by a WTRU. The configuration may inform the WTRU whether one or more RBs, LCHs, MAC-CEs of one or more types, RLC Status PDUs, etc., may be transmitted on a certain cell or cell type, such as an LAA cell. A configuration may provide one or more parameters that may be specific to a certain cell or cell type, such as an LAA cell. The parameters may be MAC, HARQ, PHR, and/or BSR parameters.

A WTRU (e.g., a WTRU MAC layer or entity) may determine, maintain, and/or use the type of cell for which a UL grant may be received. The physical layer (e.g., or lower layers) may provide the cell type to the MAC layer (e.g., or MAC or HARQ entity). The physical layer may provide the cell type to the MAC layer with the grant or HARQ information. A cell type may be associated with a HARQ entity. The HARQ entity may correspond to a serving cell.

A WTRU may build MAC PDUs based on the type of cell(s) for which the WTRU may receive a UL grant. A WTRU may build MAC PDUs based on the type of cell(s) for which the WTRU may receive a UL grant for a TTI and/or subframe. For one or more grants (e.g., each grant) received, a WTRU may determine logical channels that may be allowed to be transmitted. For one or more (e.g., each) grant and/or TB, the WTRU (e.g., or MAC entity) may (e.g., or may only) build a MAC PDU from the logical channels that may be allowed to be transmitted on the cell corresponding to the grant or TB. A HARQ entity may (e.g., or may only) include data from logical channels that may be allowed for transmission on the cell type associated with the HARQ entity. A WTRU (e.g., or MAC entity) may (e.g., or may only) include a MAC-CE of a type in a MAC PDU, for example, when the MAC-CE of the type may be allowed to be transmitted on the cell corresponding to the grant and/or TB to which the MAC PDU may correspond.

Maximum HARQ retransmissions may be configured and/or used per serving cell with configured UL. Maximum HARQ retransmissions may be configured and/or used per HARQ entity. The default value may be the value configured for the MAC entity to which the serving cell may belong. The default value may be the value configured for the MAC entity to which the HARQ entity may belong.

A MAC entity may follow a set of rules for assembling logical channels into a MAC PDU to be transmitted. The rules may be related to one or more of priority, parameters, and/or capacity of the grant for transmission. The MAC entity may be requested to transmit multiple MAC PDUs, e.g., in one TTI. A request to transmit a MAC PDU may be from or according to an UL grant. The rules may be applied to one or more grants (e.g., each grant) independently or the rules may be applied to the sum of the capacities of the grants. The order in which the grants may be processed may be determined by WTRU implementation. The MAC entity may be requested to transmit multiple MAC PDUs, e.g., in one TTI. It may be up to the WTRU implementation to decide in which MAC PDU a MAC control element may be included. It may be up to the WTRU implementation to decide in which MAC PDU a MAC control element may be included, for example, when the MAC entity may be requested to transmit multiple MAC PDUs in one TTI. The WTRU may be requested to generate MAC PDU(s) in one or more (e.g., two) MAC entities in a TTI. WTRU implementation may determine the order in which the grants may be processed. For example, when the WTRU may be requested to generate MAC PDU(s) in one or more (e.g., two) MAC entities in a TTI, WTRU implementation may determine the order in which the grants may be processed. These rules may be insufficient, e.g., when one or more grants may be for cells of a certain type, such as LAA cells.

The rules for assembling logical channels into a MAC PDU to be transmitted may be modified. The rules for assembling logical channels into a MAC PDU to be transmitted may be modified, for example, to account for channel type.

The WTRU and/or MAC entity may process grants for different cell types separately and/or together. For example, when assembling logical channels into a MAC PDU to be transmitted, the WTRU or MAC entity may process grants for different cell types separately. For example, when the MAC entity may be requested to transmit multiple MAC PDUs in a TTI, for a (e.g., each) cell type, the rules may be applied to one or more grants (e.g., each grant) independently or the rules may be applied to the sum of the capacities of the grants. The rules may be applied differently for different cell types. The capacities of grants from different cell types may be separate (e.g., may not be combined). In an example, the order in which the grants may be processed may be according to cell type. For example, grants for non-LAA cells may be processed before grants for LAA cells. Grants for non-LAA cells may be processed after grants for LAA cells.

A MAC control element may be included in a MAC PDU. The WTRU implementation may decide in which MAC PDU (e.g., from among the MAC PDUs that correspond to allowed cell types) a MAC control element may be included. The WTRU implementation may decide when the MAC entity may be requested to transmit multiple MAC PDUs in a TTI. When the WTRU may be requested to generate MAC PDU(s) in one or more (e.g., two) MAC entities in a TTI, the order in which the grants may be processed may be according to cell type. For example, grants for non-LAA cells may be processed before LAA cells. Grants for non-LAA cells may be processed after LAA cells.

A MAC-CE may be allowed on a cell of any type. Certain cell types (e.g., non-LAA cells) may be prioritized over others (e.g., LAA cells) for transmission of the MAC-CE.

Examples described herein for an architecture (e.g., WTRU architecture) with one MAC entity may be applied to an architecture with separate or multiple MAC entities and vice versa.

Transmission of a power headroom report (PHR) may or may not be allowed on a cell type. For example, transmission of a power headroom report (PHR) may or may not be allowed on a cell type, such as an LAA cell. Whether PH reporting may be allowed on a certain cell and/or type of cell may be known and/or configured. PHR transmission may be allowed (e.g., or only allowed) on certain cells or cell types (such as non-LAA cells), and PHR transmission may be disallowed on other cells or cell types (such as LAA cells). One or more PHR triggering events may be modified, for example, when PHR transmission may not be allowed on certain cells or cell types. Triggering may be restricted. Triggering may be restricted, for example, to when there may be UL resources for new transmission on a serving cell for which PHR transmission may be allowed. One or more PHR triggering events may be modified, for example, to restrict triggering to when there may be UL resources for new transmission on a serving cell for which PHR transmission may be allowed.

Pathloss change and/or P-MPR change may trigger a PHR. A Pathloss change trigger and/or a P-MPR change trigger may utilize, along with other criteria, the availability of UL resources for new transmission for the PHR trigger to occur. The pathloss change trigger and/or the P-MPR change trigger may be modified. The pathloss change trigger and/or the P-MPR change trigger may be modified, such that a WTRU or MAC entity may or may only trigger a PHR when there may be UL resources for new transmission on a serving cell for which PHR transmission may be allowed (e.g., a non-LAA cell).

Expiry of a periodic PHR timer may trigger a PHR. The periodic PHR timer expiry trigger may be modified. A WTRU and/or MAC entity may or may only trigger a PHR when there may be UL resources for new transmission on a serving cell for which PHR transmission may be allowed (e.g., on a non-LAA cell) The periodic PHR timer expiry trigger may be modified, such that a WTRU and/or MAC entity may or may only trigger a PHR when there may be UL resources for new transmission on a serving cell for which PHR transmission may be allowed (e.g., a non-LAA cell).

The WTRU and/or MAC entity may perform (e.g., only perform) one or more parts (e.g., all parts) of the PHR procedure for a TTI. For example, the WTRU and/or MAC entity may perform one or more parts of the PHR procedure for a TTI when the WTRU and/or MAC entity may have UL resources allocated for new transmission for the TTI.

PHR transmission may be allowed (e.g., only allowed) on certain cells and/or cell types (such as non-LAA cells). The WTRU and/or MAC entity may perform (e.g., only perform) one or more parts (e.g., all parts) of the PHR procedure. The WTRU and/or MAC entity may have UL resources allocated for new transmission for the TTI for a cell type that may allow PHR transmission for a TTI (e.g., a non-LAA cell). PHR transmission may be allowed (e.g., only allowed) on certain cells and/or cell types (such as non-LAA cells). A WTRU and/or MAC entity may perform (e.g., only perform) one or more parts (e.g., all parts) of the PHR procedure, for example, when the WTRU and/or MAC entity may have UL resources allocated for new transmission for the TTI for a cell type that may allow PHR transmission for this TTI (e.g., a non-LAA cell). Allowance of PHR transmission on a cell of a certain type may be specific to PH reporting that may be triggered by one or more specific events (e.g., all events). Disallowance of PHR transmission on a cell of a certain type may be specific to PH reporting that may be triggered by one or more specific events (e.g., all events).

For example, PHR transmission may be triggered based on, or due to, one or more events (e.g., event types) such as a pathloss change, a P-MPR change, and/or a periodic timer expiry. PHR transmission may be allowed (e.g., by configuration and/or other knowledge and/or determination) on a certain cell type for an (e.g., each) individual event type or for all event types. PHR transmission may be disallowed (e.g., by configuration and/or other knowledge and/or determination) on a certain cell type for an (e.g., each) individual event type or for all event types.

Sending a buffer status report (BSR) may be allowed or disallowed on certain types of cells. For example, the WTRU may be configured to allow or disallow BSRs on an LAA cell. A WTRU and/or WTRU MAC may add a MAC-CE, such as buffer status reporting (BSR) MAC-CE, to a MAC PDU. For example, a WTRU and/or WTRU MAC may add a MAC-CE, such as BSR MAC-CE, to a MAC PDU when there may be room in the PDU for the MAC-CE. In an example, transmission of a BSR (e.g., or BSR MAC-CE) of a certain type may be allowed or disallowed on a cell type, such as an LAA cell. Transmission of one or more of types of BSRs may be disallowed from transmission on a LAA cell. In an example, one or more types of BSR MAC-CEs may be disallowed from inclusion in a MAC PDU that may be intended for transmission and/or may be transmitted on a LAA cell. BSR (e.g., or BSR MAC-CE) types may include one or more of Regular BSR, Padding BSR, and/or Periodic BSR. Whether transmission of a BSR (e.g., or BSR MAC-CE) of a certain type may be allowed on a certain cell and/or type of cell may be known and/or configured.

BSR transmission of one or more types may be allowed (e.g., or only allowed) on certain cells and/or cell types (e.g., non-LAA cells). Buffer status reporting may be modified. Buffer status reporting may be modified, for example, to ensure the BSR of the one or more types may (e.g., or may only) be triggered and/or transmitted when the BSR may be transmitted on (e.g., transmitted on one of) the certain cells and/or cell types. BSR transmission of one or more types may be allowed on certain cells and/or cell types. Buffer status reporting may be modified to ensure the BSR of the one or more types may (e.g., may only) be triggered and/or transmitted, for example, when the BSR may be transmitted on one of the certain cells and/or cell types.

A BSR MAC-CE of a certain type may (e.g., may only) be generated by a MAC entity for a TTI. The MAC entity may have UL resources allocated for new transmission for the TTI, for example, for at least one serving cell. The serving cell may allow transmission of the BSR MAC CE type. For example, a BSR MAC-CE of a certain type may (e.g., may only) be generated by a MAC entity for a TTI, for example, when the MAC entity may have UL resources allocated for new transmission for the TTI for at least one serving cell for which transmission of the BSR MAC CE type may be allowed.

Data may be transmitted by an eNB in subframe n for a DL grant in subframe n. A WTRU may receive the data. The WTRU may send a positive or negative ACK in subframe n+k1. The eNB may retransmit (e.g., at the earliest) at subframe n+k2. In an example, k1 may be 4 and k2 may be 8, e.g., for FDD. The time from a first grant to a retransmission for the first grant (which may be associated with a second grant) may be referred to as the round trip time. For synchronous retransmission, round trip time may be k2. For asynchronous retransmission, the minimum value of round trip time may be k2, e.g., the retransmission grant and/or retransmission may come at a (e.g., any) time greater than or equal to k2 subframes after the first grant.

A (e.g., each) data transmission (e.g., new data transmission) may be associated with a HARQ process. Retransmissions of data may be associated with the same HARQ process. A WTRU may maintain a round trip time (RTT) timer, e.g., for a DL HARQ process. A DL HARQ process may be associated with a configured and/or specified value, e.g., HARQ RTT Timer. A timer may be started at a configured or specified value. A timer may be decremented, e.g., at certain times, such as in each subframe and/or each PDCCH subframe. Action(s) may be taken, e.g., by a WTRU, when the timer expires. A PDCCH subframe may be a subframe in which a PDCCH and/or EPDCCH may be received. PDCCH and EPDCCH may be used interchangeably. In an example, a round trip timer for a DL HARQ process may be started for a subframe n. PDCCH (and/or EPDCCH) may indicate a DL transmission and/or a DL assignment has been granted and/or configured for this subframe. Starting a timer may be based on one or more conditions. An example of a condition for starting a timer may be that DRX is configured. A timer may (e.g., may only) be started during DRX Active Time.

Active Time for a DRX cycle (e.g., when DRX is configured) may comprise the time while one or more timers related to UL and/or DL transmission are running. Timers may comprise, for example, an on-duration timer, an inactivity timer, and/or retransmission timer(s). In an example, a WTRU may not enter a power savings mode until at least one or more (e.g., all) timers have stopped, expired, and/or are otherwise not running. Active Time may, for example, help ensure ongoing processes (e.g., retransmissions) are completed before a WTRU enters a power savings mode.

A WTRU may maintain a retransmission timer for a DL HARQ process that may be associated with a configured value, e.g., drx-RetransmissionTimer. A retransmission timer may be started at this value, for example, when a round trip timer expires. A retransmission timer may be decremented at certain times (e.g., in each subframe and/or PDCCH subframe). The timer may be stopped, for example, when a retransmission grant for the DL HARQ process is received. Actions may be taken by the WTRU, e.g., when the timer expires.

UL retransmission may be synchronous. UL retransmissions may not be considered for DRX Active Time. For example, UL retransmissions may not be considered for DRX Active Time for non-LAA cells. UL retransmission may be considered when determining when the DRX cycle is in Active Time, for example, for LAA cells. DRX configuration parameters may be configured independently. For example, DRX configuration parameters may be configured independently per Cell Group (e.g., MCG and/or SCG). DRX configuration parameters may be common, for example, for PCell and/or SCell within a given cell group.

A UL HARQ process may have a round trip timer and/or a retransmission timer. A specified and/or configured value that a UL HARQ process timer may be set to may be different from a value for a DL HARQ process.

A parameter, e.g., UL HARQ RTT Timer, may be configured, for example, when DRX is configured. The parameter may indicate a minimum round trip time (e.g., in number of subframes) before a UL HARQ retransmission grant may be expected after a previous UL grant for the same HARQ process, e.g., by a WTRU MAC entity. The parameter may be fixed, predefined, and/or configurable, for example, by an eNB, e.g., through RRC signaling. A UL HARQ RTT parameter may be configured independently per cell, per cell group (e.g., MCG versus SCG), and/or per cell type (e.g., LAA cell and/or non-LAA cell). In an example, a UL HARQ RTT Timer parameter may be configured independently for LAA cells for MCG and/or LAA cells for SCG. A UL HARQ RTT Timer parameter may be configured (e.g., only configured) for certain cells, such as LAA cells and/or cells with asynchronous UL HARQ.

A WTRU may maintain a timer for a UL round trip time, for example, per UL HARQ process. A WTRU may maintain a timer, for example, when (e.g., only when) DRX is configured. A WTRU may maintain the timer for (e.g., only for) LAA cells and/or for cells for which UL HARQ may be asynchronous. The value of a timer may be set, e.g., at certain times, to the value of a parameter UL HARQ RTT Timer.

Uplink-DrxRetransmissionTimer may be configured. For example, uplink-DrxRetransmissionTimer may be configured when DRX is configured. This parameter may specify the maximum number of consecutive subframe(s) and/or PDCCH-subframe(s), for example, after the UL HARQ minimum round trip time has elapsed until a UL retransmission grant may be received, e.g., for a UL HARQ process. This parameter may be configured independently, for example, per cell, per cell group (MCG versus SCG), and/or per cell type (e.g., LAA cell and/or non-LAA cell). In an example, an uplink-DrxRetransmissionTimer parameter may (e.g., may only) be configured for, and/or applicable to, LAA cells. An uplink-DrxRetransmissionTimer may be configured independently for LAA cells for MCG and/or LAA cells for SCG. The parameter UL HARQ RTT Timer and/or the parameter uplink-DrxRetransmissionTimer may (e.g., may together) define a maximum time period that a UL HARQ process may wait for a retransmission, for example, to fulfill a condition to allow entry into power saving mode.

A WTRU may maintain a timer for UL HARQ retransmission time, for example, one timer per UL HARQ process. A WTRU may maintain the timer when (e.g., only when) DRX is configured. A WTRU may set a value of this timer to the value of the parameter uplink-DRXRetransmission-Timer, for example, at certain times, e.g., when starting the timer. WTRU, WTRU MAC entity, and/or MAC entity may be substituted for each other.

A WTRU may update one or more UL HARQ process timers. For example, a WTRU may update one or more UL HARQ process timers when one or more conditions are satisfied and/or depending on whether LBT is successful. Conditions may comprise one or more of: (a) PDCCH in subframe n-k (e.g., k=4) indicates a UL grant for UL data transmission in subframe n, (b) the grant is for a new data transmission (e.g., NDI is toggled) or the grant is not for new data transmission (e.g., NDI is not toggled) and the HARQ buffer is empty, and/or (c) the time (e.g., TTI or subframe) is during DRX cycle Active Time, where the time is subframe n and/or subframe n-k. In an example of a HARQ process associated with a grant, where one or more (e.g., all) conditions are satisfied and/or LBT is successful in and/or for subframe n, a WTRU may: (a) set a UL round trip timer to UL HARQ RTT Timer and start a UL round trip timer in subframe n; and/or (b) stop the UL HARQ retransmission timer for the corresponding UL HARQ process in subframe n.

A UL RTT timer may not be started and/or the UL HARQ retransmission timer may not be stopped. For example, a UL RTT timer may not be started and/or the UL HARQ retransmission timer may not be stopped when an LBT is not successful in subframe n. Data for transmission may not be put into HARQ buffer. Data may be put back into the multiplexing and/or assembly queue. In an example of a HARQ process associated with a grant, where one or more (e.g., all) conditions are satisfied (e.g., independent of LBT success) then the WTRU may, for example: (a) set a UL round trip timer to UL HARQ RTT Timer and/or start a UL round trip timer in subframe n or n-k; and/or (b) stop the UL HARQ retransmission timer for the corresponding UL HARQ process in subframe n and/or n-k. In an example, a WTRU may update one or more UL HARQ process timers, for example, when one or more conditions are satisfied, depending on whether LBT is successful. Conditions may include one or more of: (a) PDCCH in subframe n-k (e.g., k=4) indicates a UL grant for UL data transmission in subframe n, (b) the grant is not for new data transmission (e.g., NDI is not toggled), and/or (c) the time (e.g., TTI and/or subframe) is during DRX cycle Active Time, where the time is subframe n and/or subframe n-k. In an example, where one or more (e.g., all) conditions are satisfied and/or the UL HARQ buffer is not empty, a WTRU may, for example: (a) set a UL round trip timer to UL HARQ RTT Timer and/or start the UL round trip timer in subframe n and/or n-k, and/or (b) stop the UL HARQ retransmission timer for the corresponding UL HARQ process in subframe n and/or n-k.

A WTRU may set a UL HARQ retransmission timer for the UL HARQ process to the value of the parameter uplinkDRXRetransmissionTimer and/or start the UL HARQ retransmission timer in subframe n, for example, when a UL HARQ round trip timer expires, e.g., during a DRX cycle Active Time, for a HARQ process in a subframe n.

A WTRU may flush a UL HARQ buffer for a UL HARQ process upon expiration of a UL HARQ retransmission timer for the UL HARQ process. WTRU actions may, for example, be conditioned upon DRX being configured in the WTRU.

The UL HARQ round trip timer and/or UL HARQ retransmission timer may be decremented. For example, the UL HARQ round trip timer and/or UL HARQ retransmission timer may be decremented in every subframe and/or every PDCCH subframe. DRX Active Time may be modified to include time when a UL HARQ retransmission timer is running, for example, for a UL HARQ process associated with an LAA cell and/or a cell with synchronous UL HARQ.

A WTRU may monitor PDCCH (and/or EPDCCH) for UL grant assignment while an uplink HARQ retransmission timer is running.

A WTRU may monitor PDCCH for UL grant assignment. For example, a WTRU may monitor PDCCH for UL grant assignment during a UL grant assignment time window. Active Time, e.g., during DRX operation, may comprise a UL grant assignment time window. A WTRU may monitor PDCCH for UL grant assignment, e.g., during the UL grant assignment time window. A WTRU may be configured (e.g., via dedicated RRC signaling, system information broadcast, and/or MAC CE) with a UL grant assignment time window.

A UL grant assignment time window may be predefined and/or known to a WTRU. For example, a UL grant assignment time window may be predefined and/or known to a WTRU through specification. A UL grant assignment time window size may be defined and/or configured, for example, in a number of sub-frames. A position of a UL grant assignment time window may be defined and/or configured as a function of a reference subframe number and/or frame number. A UL grant assignment time window may be periodic. A WTRU, e.g., during DRX operation, may monitor time instances when an eNB may inform the WTRU of the timing of a UL grant assignment. A WTRU may be configured with such time instances (e.g., via dedicated RRC signaling, system information broadcast, and/or MAC CE). Time instances may be predefined and/or known to a WTRU. A time instance for acquisition of the timing of a UL grant assignment may be defined in terms of subframe number and/or may be relative to a reference subframe and/or frame.

One or more messages may be defined in order for a WTRU to provide status information about attempts to utilize an LAA cell. For example, a MAC Status MAC-CE may be defined in order to provide information about LAA access by the WTRU. The MAC Status MAC-CE may be used by a WTRU and/or MAC entity to provide status to the eNB. The status to the eNB may be regarding the WTRU's success and/or failure in its attempts to send MAC PDUs on one or more LAA channels. The MAC status MAC-CE may include information and/or statistics on how successful (e.g., or unsuccessful) the WTRU has been in sending MAC PDUs on one or more LAA cells. The MAC status MAC-CE may include information and/or statistics on whether it has been unable to send MAC PDUs on one or more LAA cells. The WTRU may (e.g., may only) send the MAC Status MAC-CE on non-LAA cells. For example, the WTRU may be configured to refrain from sending the MAC Status MAC-CE on an LAA cell. In another example, the WTRU may send the MAC status CE on an LAA cell.

The MAC status CE may include or more statistics or other information regarding attempts to access or transmit via an LAA cell. For example, the MAC status CE may include or indicate the number (e.g., or other statistics) of successful and/or failed attempts to transmit, such as a MAC PDU, on one or more LAA cells. The report included in the MAC status CE may be the number (e.g., or statistics) of success and/or failed transmissions since the last transmission of a MAC status and/or based on some other time frame. The MAC status CE may include or indicate the number of discarded PDUs in total and/or per HARQ entity and/or HARQ process (e.g., number of times one or more HARQ buffers may have been flushed) for one or more LAA cells. For example, the statistics may start or begin since the last transmission of a MAC status or based on some other time frame. The MAC status CE may include or indicate the LCH information (e.g., IDs) associated with the LAA access and/or associated with the statistics being provided. The MAC status CE may include or indicate the HARQ process information (e.g., IDs) associated with the LAA access and/or associated with the statistics being provided. The MAC status CE may include or indicate the time period, T, for which the report corresponds, for example, where T may be a number of subframes and/or frames such as the last T subframes and/or the last T frames. The MAC status CE may include or indicate the number (or other statistics) of failed attempts to transmit, e.g., a MAC PDU, for a particular HARQ process of an LAA cell, which may be the number (and/or statistics) since the last transmission of a MAC PDU for that HARQ process. The MAC status CE may include or indicate an indication that a (e.g., a most recent) previous attempt to transmit, e.g., a MAC PDU, for a particular HARQ process of an LAA cell failed. Various combinations of the statistics may be included in a given MAC status CE.

The WTRU may transmit the MAC Status MAC-CE. The WTRU may transmit the MAC Status MAC-CE periodically. The WTRU may transmit the MAC Status MAC-CE periodically, for example, based on a configured period. The WTRU may transmit the MAC Status MAC-CE, for example, based on a triggered event. A triggered event may be when one or more numbers, counts, and/or statistics (e.g., success and/or failure statistics) may exceed a threshold. The threshold may be configured.

A WTRU may be configured to implement one or more procedures on condition that an uplink transmission that the WTRU had intended to transmit on an LAA cell is blocked (e.g., LBT failed) or is otherwise unsuccessful. For example, a WTRU may transmit a MAC Status MAC CE with a retransmission on an LAA cell, for example, when the retransmission is for a HARQ process for which transmission of new data was prevented, e.g., by WTRU determination that the channel is busy.

A WTRU may have a potential transmission in a TTI and/or UL subframe. A WTRU may or may not be able to transmit the potential transmission in a TTI and/or UL subframe. A WTRU may or may not be able to transmit the potential transmission in a TTI and/or UL subframe, for example, due to a determination by the WTRU. The WTRU may make the determinations based on an LBT/CCA process that the channel may be busy.

The WTRU may perform processes and/or make decisions for UL transmission. The WTRU may prepare a transmission. The transmission may be and/or may include one or more of a transport block, a MAC PDU, and/or a MAC-CE, in advance of the subframe and/or an LBT/CCA. The LBT/CCA may be performed by the WTRU before the actual transmission. The LBT/CCA may prevent the transmission. One or more procedures, counters, timers, parameters, flags, and the like, which may be performed and/or maintained by the MAC, may be modified, for example, based on whether the WTRU actually transmitted. For example, the WTRU may modify HARQ processing and/or PHR reporting and/or one or more related counters, timers, parameters, flags, that may be related to HARQ processing and/or PHR reporting based on whether the WTRU actually transmitted. In an example, the WTRU may have, maintain, and/or use information that may be in the form of a flag, state, counter, other parameter (e.g., or a combination of zero, one, and/or more of each of these forms) regarding whether and/or how many times transmission of a MAC PDU in a HARQ process buffer may have been attempted (e.g., by the WTRU) and/or may have failed, e.g., due to LBT/CCA.

The WTRU may determine whether a transmission may have failed. One aspect or entity within the WTRU, such as the physical layer, may determine whether a transmission may have failed. One aspect and/or entity within the WTRU, such as the physical layer, may provide the information to another aspect and/or entity within the WTRU. The other aspect and/or entity within the WTRU may be the MAC layer and/or a MAC entity. For example, the physical layer may provide an indication to the MAC. The indication may be a TX-ACK. The indication may be a TX-NACK. The physical layer may provide an indication, e.g., TX-ACK, to the MAC, for example, to inform it that a MAC PDU and/or TB that may have been requested for transmission may have been transmitted. The physical layer may provide an indication, e.g., TX-NACK, to the MAC, for example, to inform it that a MAC PDU and/or TB that may have been requested for transmission may not have been transmitted. An indication may correspond to one or more MAC PDUs and/or TBs.

The WTRU and/or MAC entity may maintain a counter. The counter may be a NOTX_CNT. The counter may be for the number of times transmission (e.g., or requested, intended, and/or scheduled transmission) of a MAC PDU in a HARQ process buffer may have failed. Transmission of a MAC PDU in a HARQ process buffer may have failed, for example, due to LBT/CCA. The WTRU may use a transmission success and/or failure (e.g., which may be indicated by TX-ACK and/or TX-NACK) and/or the NOTX_CNT counter in one or more decisions. The decisions may be related to HARQ retransmission. The decisions may be to adjust the HARQ retransmission counter. The decisions may be to modify when and/or why the HARQ retransmission counter may be incremented, decremented, and/or reset.

A WTRU may not transmit UCI on an LAA cell, for example, when the channel is busy. The WTRU may determine that it may not transmit the UCI on an LAA cell in a certain subframe. The WTRU may transmit the UCI (e.g., or part of the UCI) on another cell, such as a non-LAA cell or the PCell and/or PSCell. For one or more types of UCI (e.g., ACK/NACK and/or CQI), the WTRU may transmit the UCI (e.g., or part of the UCI) on another cell, such as a non-LAA cell and/or the PCell and/or PSCell, for example, when a WTRU may determine that it may not transmit the UCI on an LAA cell in a certain subframe.

A WTRU may determine that the cell for transmission of some UCI may be an LAA cell. The WTRU may make the determination based on the availability (e.g., non-availability) of PUSCH on a PCell and/or PSCell and/or the SCellIndex of one or more SCells that may have PUSCH resources. The WTRU may determine that the LAA channel may be busy. The WTRU may determine that the LAA channel may be busy based on LBT/CCA. A WTRU may determine (e.g., re-determine) that the cell for transmission of the UCI may be another cell, for example, when the WTRU determines that the LAA channel may be busy. The other cell may be a cell with PUSCH resources and/or a higher SCellIndex. A WTRU may try (e.g., try again) until it may determine a suitable cell for the UCI transmission, for example, when one or more cells may be unsuitable. An unsuitable cell may be an LAA cell with a busy channel. A WTRU may drop (e.g., not transmit) the UCI (e.g., or part of the UCI), for example, when there may be no suitable cell with PUSCH for transmission. A WTRU may transmit the UCI on the PUCCH of the PCell and/or PSCell, for example, when there may be no suitable cell with PUSCH for transmission. In another example, a WTRU may determine that the cell for transmission of some UCI may be an LAA cell. The WTRU may make the determination based on the availability (e.g., non-availability) of PUSCH on a PCell and/or PSCell. The WTRU may make the determination based on the SCellIndex of one or more SCells that may have PUSCH resources. The WTRU may determine that the LAA channel may be busy, for example, based on LBT/CCA. A WTRU may drop (e.g., not transmit) the UCI (or part of the UCI) and/or may transmit the UCI on the PUCCH of the PCell and/or PSCell, for example, when the WTRU determines that the LAA channel may be busy.

Due to the unpredictable nature of channel usage on an LAA cell, configuring a predefined set of subframes and/or transmission resources (e.g., such as SRS transmission opportunities) may be difficult or inefficient. For example, if SRS transmission opportunities are periodic in nature, the LAA channel may be busy for consecutive SRS transmission opportunities (and/or for SRS transmission opportunities for a given WTRU) such that the eNB is unable to receive the SRS transmissions in order to estimate the uplink channel. Thus, rather than, or in addition to, receiving an indication of periodic SRS transmission subframes/opportunities, for LAA cells (and/or non-LAA cells) the SRS transmission opportunities for the LAA cell may be dynamically indicated. The eNB may be configured to dynamically indicate when an SRS transmission opportunity may occur and dynamically indicate which one and more WTRUs may transmit an SRS in accordance with the SRS transmission opportunity. A WTRU may be configured to receive the dynamic indication that an SRS transmission opportunity may occur and to determine whether the WTRU should transmit SRS during the dynamically indicated opportunity or whether the WTRU should blank (e.g., not transmit using) the SRS transmission opportunity. If the dynamically indicated SRS transmission opportunity is indicated to occur on resources that the WTRU may use for PUSCH transmission, and if the WTRU is not triggered to transmit SRS, then the WTRU may perform rate matching of its PUSCH transmission around the resources used for SRS.

A set of SRS resources may refer to a set of Resource Elements (REs) and/or symbols (e.g., SC-FDMA symbols) that may carry SRS information and/or symbols. A set of SRS resources may be indicated and/or referred to by the indication of the (UL) subframe. The indication of the (UL) subframe may be the index of the UL subframe. The indication of the (UL) subframe may include a set of SRS resources. The set of SRS resources may be located on one or more symbols (e.g., the last symbol) of a subframe (e.g., an UL subframe). A subframe (e.g., UL subframe) that may include SRS resources may be referred to as the SRS subframe.

A WTRU may transmit (e.g., may only transmit) SRS in the indicated SRS resources. A WTRU may not transmit a UL signal (e.g., other than SRS) in the indicated SRS resources. A WTRU may transmit SRS in the indicated SRS resources, for example, when the WTRU may receive a periodic and/or aperiodic SRS transmission request that may correspond to that set of SRS resources.

A WTRU may receive an SRS indication. The SRS indication may implicitly and/or explicitly inform the WTRU of at least one of the following indications: whether a UL subframe may be considered as an SRS subframe (e.g., which may imply that the WTRU may not use the last symbol of that subframe); whether a particular WTRU (e.g., the particular WTRU receiving the SRS indication) may send SRS in an UL subframe and/or whether a particular WTRU (e.g., the particular WTRU receiving the SRS indication) may not send SRS (e.g., blank the SRS in the last symbol of that subframe) in an UL subframe; the configurations and/or parameters of the SRS transmission (e.g., if any); and/or any combination(s) of the preceding. For example, the SRS indication may indicate that a UL subframe may be considered as an SRS subframe. If the SRS indication indicates that the UL subframe may be considered as an SRS subframe, an indication (e.g., an indication that is separate, or different, than the SRS indication) may indicate whether the WTRU (e.g., the particular WTRU receiving the SRS indication) may send the SRS. If the indication indicates that the particular WTRU may not send the SRS, and/or if the SRS indication indicates that the UL subframe may not be considered as an SRS subframe, the WTRU (e.g., the particular WTRU receiving the SRS indication) may not send the SRS. If the indication indicates that the particular WTRU may send the SRS, the WTRU (e.g., the particular WTRU receiving the SRS indication) may send the SRS in the indicated subframe. If the indication indicates that the particular WTRU may send the SRS and the indication (or another indication) indicates that the subframe may be considered as an SRS subframe, the WTRU (e.g., the particular WTRU receiving the SRS indication) may send the SRS in the indicated subframe. The WTRU may send the SRS in the indicated subframe if the WTRU determines the channel to be not busy (e.g., based on LBT/CCA) for the subframe or for at least the SRS resources in the subframe.

The last symbol is an example of SRS resources. Another location such as another symbol, multiple symbols, or one or more partial symbols may be substituted for last symbol and be consistent with the examples described herein.

SRS indication may be derived as a function of the signal type to be transmitted in an UL subframe. For example, the WTRU may consider a subframe as an SRS subframe, for example, when it may transmit a PUSCH signal in that subframe. The WTRU may consider a subframe as a SRS subframe, for example, when it may transmit a PUCCH signal in that subframe. The WTRU may send SRS in an UL subframe that it sends PUCCH.

The indication received from a cell may be applicable to the same cell and/or another cell. The indication received from the cell may include an SRS indication, and/or the indication received from the cell may include an indication of whether a particular WTRU may send an SRS (e.g., whether the particular WTRU may send an SRS in the UL subframe, or whether the particular WTRU may blank the SRS in the subframe). The indication received from the cell may include an indication of whether the cell and/or the other cell is associated with a licensed and/or unlicensed band (e.g., licensed spectrum and/or unlicensed spectrum). The indication received from the cell may include licensed assisted access (LAA) configuration information, e.g., which may include an indication of whether an unlicensed cell will be associated with an unlicensed cell. Blanking SRS in a subframe may mean not transmitting in the SRS resources that may be in the subframe. Blanking SRS in a subframe may comprise adapting an UL transmission (e.g., a PUSCH or PUCCH transmission) such that there is no transmission in the SRS resources. For example, blanking SRS in a subframe may comprise shortening a PUSCH or PUCCH transmission such that there is no transmission in the last symbol of the subframe.

SRS indication may be received by the WTRU as a part of a DCI, a group DCI, e.g., a DCI which may carry information for more than one WTRU; a UL grant, and/or a combination of the preceding. An SRS indication may be carried in a DCI. An SRS indication may be received by one and/or more WTRUs. An SRS indication may be received by one and/or more WTRUs, for example, where the interpretation of different WTRUs of the received indication and the information that it may carry may be different (e.g., depending on the WTRU individual and/or group IDs). When the WTRU receives an indication (e.g., as a part of an UL grant) that an UL subframe (e.g., the UL subframe associated with the UL grant) is a SRS subframe, the WTRU may not transmit a UL signal in the SRS resources (e.g., last symbol) of that UL subframe.

A subframe that may be indicated as an SRS subframe (e.g., by a DCI or UL grant) may not be a subframe configured as a cell-specific or WTRU-specific SRS subframe. Dynamically indicating whether a subframe in which a WTRU is granted UL resources is an SRS subframe may enable a (e.g., any) subframe to be an SRS subframe.

In an example, a WTRU may receive a DCI that may carry an UL grant. The DCI or UL grant may include an SRS indication. The SRS indication may indicate (e.g., implicitly or explicitly) that subframe n+k may be an SRS subframe. Subframe n+k may be the subframe of the granted resources. The DCI or grant may indicate the location of the SRS resources or the location of the SRS resources may be otherwise configured or known. The DCI or grant may include an indication (e.g., another indication) indicating that the WTRU may transmit SRS in the SRS resources. Based on the one or more indications, the WTRU may transmit SRS in the SRS resources in subframe n+k. The WTRU may transmit SRS in the SRS resources in subframe n+k, for example when the WTRU determines that the channel is not busy (e.g., based on LBT/CCA evaluation prior to the transmission time). The WTRU may or may also adapt a transmission in the SRS subframe (e.g., PUSCH that may be allocated and/or granted) to not transmit in the SRS resources (e.g., the WTRU may perform rate matching for the PUSCH transmission around the SRS resources/perform blanking across the SRS resources). The WTRU may make a transmission (e.g., an adapted transmission) in an SRS subframe when the WTRU determines that the channel is not busy (e.g., based on LBT/CCA evaluation prior to the transmission time).

In another example, a WTRU may receive a DCI that may carry an UL grant. The DCI or UL grant may include an SRS indication. The SRS indication may indicate (e.g., implicitly or explicitly) that subframe n+k may be an SRS subframe. Subframe n+k may be the subframe of the granted resources. The DCI or grant may indicate the location of the SRS resources or the location of the SRS resources may be otherwise configured or known. The DCI or grant may include an indication (e.g., another indication) indicating that the WTRU may not transmit SRS in the SRS resources. The DCI or grant may not include an indication (e.g., another indication) indicating that the WTRU may transmit SRS in the SRS resources. Based on the one or more indications, the WTRU may adapt a transmission in the SRS subframe (e.g., PUSCH that may be allocated and/or granted) to not transmit in the SRS resources. The WTRU may make a transmission (e.g., an adapted transmission) in an SRS subframe when the WTRU determines that the channel is not busy (e.g., based on LBT/CCA evaluation prior to the transmission time).

Figure 5:
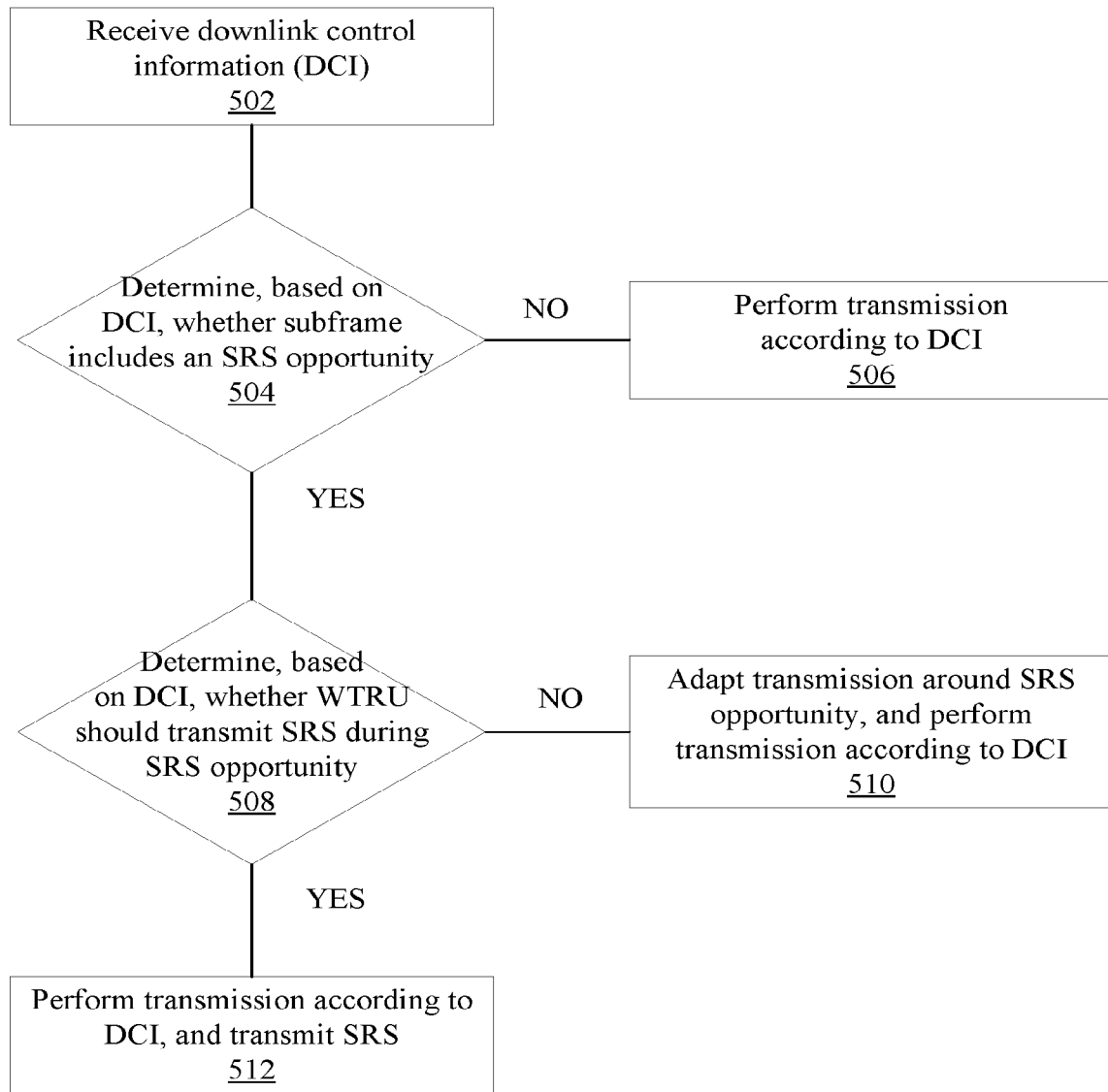
FIG. 5 depicts an example WTRU transmission in response to downlink control information (DCI).

An example WTRU transmission in response to DCI is shown on FIG. 5. At 502, the WTRU may receive a DCI. The DCI may include an SRS indication. The WTRU may determine, at 504, whether the DCI explicitly or implicitly indicates whether the subframe includes an SRS opportunity (e.g., whether WTRU may transmit SRS in the SRS resources). If the subframe does not include an SRS opportunity, the WTRU may transmit according to the DCI, at 506. If the subframe does include an SRS opportunity, the WTRU may determine at 508, based on the DCI, whether the WTRU should transmit SRS during the SRS opportunity. If the WTRU determines, at 508, that the WTRU should not transmit SRS during the SRS opportunity, the WTRU may adapt the transmission around the SRS opportunity, and the WTRU may perform transmission according to the DCI, at 510. If the WTRU determines, at 508, that the WTRU should transmit SRS during the SRS opportunity, the WTRU may perform transmission according to the DCI and transmit SRS, at 512. The WTRU may make a transmission (e.g., only make a transmission) in an SRS subframe when the WTRU determines that the channel is not busy (e.g., based on LBT/CCA evaluation prior to the transmission time).

A WTRU may determine the set of SRS subframes as a function of TDD UL/DL configuration (e.g., received and/or configured TDD UL/DL configuration) and/or other parameters. For example, after receiving a TDD UL/DL configuration, the WTRU may consider a UL subframe (e.g., the last UL subframe) in one or more (e.g., each) continuous blocks of UL subframes (e.g., a set of consecutive UL subframes) as a SRS UL subframe. A TDD UL/DL configuration with a block of UL subframes may have an SRS subframe (e.g., in TDD UL/DL configuration #3 the subframe #4 may be considered as the only SRS subframe). A TDD UL/DL configuration with two blocks of UL subframes may have SRS subframes (e.g., one or two SRS subframes, such as in TDD UL/DL configuration #1 the subframes #3 and #8 may be considered as the SRS subframes).

A WTRU may determine the set of SRS subframes as a function of the UL LBT opportunity (e.g., received and/or configured UL LBT opportunity). For example, the kth (UL) subframe after (e.g., immediately after) a UL LBT/CCA opportunity may be considered an SRS subframe. The location of the UL LBT/CCA opportunity may be known to the WTRU. For example, the WTRU may interpret the first UL subframe following (e.g., immediately following) a UL LBT/CCA opportunity as an SRS subframe.

A WTRU may receive an UL grant. The UL grant may carry an SRS indication. The WTRU may receive an indication as to which UL subframe the received SRS indication may apply. For example, with or as a part of the UL grant that may be received in subframe n, the WTRU may receive an indication identifying to which UL subframe the received SRS indication may apply. Such indication may be implicit. The SRS indication may apply (e.g., implicitly) to the subframe that the UL grant is intended. The SRS indication may apply to subframe n+k, where the value of k may be indicated (e.g., explicitly indicated) with the SRS indication (e.g., in or with the UL grant).

A WTRU may receive a SRS indication as a part of a received DCI. The DCI may indicate implicitly or explicitly the position of the SRS subframe. The position of the SRS subframe may be relative to the subframe index of the received DCI. For example, the received DCI in subframe n may carry another parameter. The parameter may be parameter k. The WTRU may consider the (UL) subframe n+k as a SRS subframe. In another example, the relative position of the SRS subframe to the DCI subframe may be known or configured.

A WTRU may receive a DCI (e.g., multi-SRS DCI). The DCI may indicate which subframes and/or UL subframes may be considered as SRS subframes. For example, the DCI may carry a bitmap. In the bitmap, one or more (e.g., each) bit may correspond to one and/or more (UL) subframes and/or radio frames. A WTRU may be configured to interpret one or more (e.g., each) received DCI bit. For example, a multi-SRS DCI may be received in the subframe n. The multi-SRS DCI may be detected by the WTRU. The multi-SRS DCI may be applied by the WTRU to the subframes of the next radio frame, such as radio frame n+1. For example, a multi-SRS DCI may carry m bits, where m may equal 10. One or more (e.g., each) bit may represent one subframe. The subframe may be in the next radio frame. In an example, a corresponding UL subframe (e.g., if any) may be considered as a SRS subframe, for example, when a bit is set to one. A WTRU may assume that it may not transmit a UL signal in n subframes following an indicated SRS subframe. For example, the WTRU may assume that the subframe following (e.g., immediate subframe following) an indicated SRS subframe, such as for n=1, may be a DL subframe and/or a silent subframe. A silent subframe may be a subframe with no UL and/or DL transmission from its eNB and/or other WTRUs related to that eNB.

A WTRU may perform LBT/CCA. For example, the WTRU may perform LBT/CCA during an SC-FDMA symbol period. The SC-FDMA symbol period may be configured as SRS resources for one or more WTRUs. A WTRU may receive a UL grant for a UL transmission in an UL subframe. For example, when a WTRU receives a UL grant for a UL transmission in an UL subframe, the WTRU may perform an LBT/CCA. The WTRU may perform an LBT/CCA during the SRS resources, such as the last SC-FDMA symbol of the subframe prior to the granted UL subframe. A WTRU may not transmit the granted UL transmission, for example, when the channel may seem to be busy during the aforementioned LBT/CCA period. A WTRU may perform LBT/CCA during the SRS resources periods, such as SC-FDMA symbol configured for SRS transmission.

An eNB may configure a UL subframe. An eNB may configure a UL subframe, for example, as an SRS subframe. An eNB may not configure/request a WTRU to transmit SRS. An eNB may use the unused SRS SC-FDMA symbol. An eNB may use the unused SRS SC-FDMA symbol, for example, to create channel idle time to comply with regulations. An eNB may use the unused SRS SC-FDMA symbol, for example, to create channel idle time to allow other users to access the channel.

A WTRU may be scheduled for multiple UL transmissions for an upcoming UL transmission period by a PDCCH in a preceding downlink transmission period. The downlink transmission period may be a period of subframes where the LAA SCell has acquired the channel for downlink transmissions. A WTRU may be scheduled for multiple UL transmissions for an upcoming UL transmission period a PDCCH transmitted over the PCell and/or by a previous periodic configuration. These UL transmissions may include at least one of: PUSCH for data transmissions (e.g., user plane and/or control plane); PUSCH for aperiodic CSI reporting; PUCCH for periodic CSI reporting; PUCCH for A/N reporting; periodic or aperiodic SRS; PRACH; and/or busy signal.

A UL transmission may be scheduled and/or configured. For example, the timing of an UL transmission (e.g., a scheduled and/or configured Ul transmission) may be tied to the timing of the scheduling. The timing of an UL transmission may be defined in the configuration. For example, an UL PUSCH grant timing may be tied to the subframe where the grant was provided. An UL transmission may occur in subframe n+k, where k may be fixed and/or may depend on n, for example, when the scheduling grant is provided in subframe n. In an example, a WTRU may be configured with a periodic UL transmission (e.g., periodic CSI reporting). The timing of the UL transmissions may be defined based on a periodicity and/or a subframe offset. The timing of an LAA UL transmission may be tied to the timing of the scheduling. The timing of an LAA UL transmission may be defined in the configuration. For example, where the timing of an LAA UL transmission is tied to the timing of the scheduling and/or defined in the configuration, the WTRU may drop a transmission, for example, when it has not acquired the LAA channel for the appropriate subframe.

The timing of an UL transmission on the LAA channel may be tied to the timing of a next acquired UL time period by a WTRU. A WTRU may receive a scheduling grant in subframe n. The scheduling grant may be valid for an upcoming UL time period, for example, starting in subframe m (e.g., where m>n). The UL transmission may be defined to occur in subframe m+k. For example, a WTRU may be configured with a periodic UL transmission (e.g., periodic CSI reporting). The timing of the periodic UL transmissions may be tied to the timing of the beginning of an acquired UL time period. For example, a WTRU may be configured to report RI in subframe m+k, where m may be the first subframe in the acquired UL time period. The value of k may be determined by at least one of: semi-statically configuration; an explicit indication in the scheduling grant; a function of n, the subframe where a scheduling request may be sent; and/or a function of m, the subframe where the UL time period may begin. Different UL transmissions and/or transmission types may have different semi-static values of k. For example, a periodic transmission configuration may include a value of k specific for that periodic transmission.

For configured periodic UL transmissions, the configuration may include a periodicity and/or a subframe offset. This may indicate to the WTRU the subframe (e.g., the first subframe) where such an UL transmission may occur. A configuration may include a delaying/dropping rule, for example, when the WTRU is incapable of acquiring the channel for that subframe. The delaying rule may be described in examples herein. For example, a WTRU may perform the UL transmission in subframe m+k, where m may be a valid UL subframe (e.g., the first valid UL subframe) after the configured (e.g., originally configured but unsuccessfully acquired) subframe and where k may be an offset.

The WTRU may receive an indication. The indication may include whether a UL transmission should be transmitted in a fixed subframe. The indication may include whether a UL transmission should be dropped. A UL transmission may be dropped, for example, when the channel may not be successfully acquired. The indication may include whether a UL transmission may be valid for an acquired UL time period (e.g., a future successfully acquired UL time period). The WTRU may be configured with a valid UL transmission window. A UL transmission may be dropped, for example, when a WTRU is unable to acquire a channel within a pre-configured time window. Whether an UL transmission grant and/or periodic transmission configuration may be valid for a pre-determined time and/or for a future UL time period may be determined by at least one of the following: an indication (e.g., explicit indication) in the scheduling grant and/or periodic transmission configuration; the type of transmission; higher layer configuration; and/or the carrier from which a scheduling grant is transmitted. A bit may indicate whether a UL transmission timing may be fixed. A bit may indicate whether a UL transmission may be dropped in the event of the WTRU not acquiring the channel. A bit may indicate whether a UL transmission timing is relative to the time a WTRU successfully may acquire an UL time period. A busy signal may be valid (e.g., may only be valid) for a subframe. The subframe may not be relative to a future UL time period. An aperiodic CSI report may be valid for a UL time period (e.g., any future UL time period). Upon being configured with an LAA SCell, the WTRU may be configured with an UL transmission behavior. Cross-carrier scheduling may mean that a UL transmission is valid for fixed timing (e.g., only for fixed timing). Cross-carrier scheduling may mean that a UL transmission is not valid for an acquired UL time period (e.g., any future successfully acquired UL time period).

An UL transmission may be delayed. For example, an UL transmission may be delayed until a WTRU acquires an UL time period. For example, where an UL transmission is delayed until a WTRU acquires an UL time period, multiple UL transmissions may utilize the same subframe. For example, a WTRU may be scheduled for an aperiodic CSI report in subframe n_1. The WTRU may be scheduled for PUSCH resources in subframe n_2. The WTRU may have multiple UL transmissions, for example, depending on the formula used for timing (e.g., the value of k). The WTRU may be unable to transmit one or more UL transmissions in the expected subframe. The WTRU may be configured with a priority ranking of one or more (e.g., all) UL transmissions. The UL transmission may be determined from at least one of: the type of UL transmission; the subframe number; and/or the number of times an UL transmission may have been delayed due to the WTRU not acquiring the channel. There may be a ranking of priorities between scheduled UL grants and/or configured periodic UL transmissions. In an example, one or more (e.g., each) channel type may have different priorities. For example, the use of the channel may impact the priority. Aperiodic CSI on PUSCH may have greater/lower priority than data on PUSCH. Different UL transmissions may have different priorities. Different UL transmissions may have different priorities, for example, depending on the subframe number. For example, the subframe number may be based on the system subframe numbering. The subframe number may be based on the subframe number. The subframe number may be within a UL time period. A periodic transmission may not have been delayed. A periodic transmission may be transmitted in its intended UL time period. A scheduled UL grant may have been delayed by x previous unsuccessful channel acquisitions. The scheduled UL grant may have precedence.

A delayed UL transmission may be transmitted in a subframe (e.g., a following subframe) within the same UL time period. A delayed UL transmission may be transmitted in a valid UL time period (e.g., following valid UL time period). A delayed UL transmission may be dropped.

A transmission may be delayed. For example, a transmission may be delayed due to unsuccessful channel acquisition. A transmission may be delayed due to collision with other UL transmissions. A transmission that is delayed may be transmitted later. A transmission that is delayed may reuse the same transmission parameters as indicated. For example, a transmission that is delayed may use a set of delayed transmission parameters. The delayed transmission parameters may ensure that the scheduler maintains flexibility when scheduling other WTRUs.

For periodic CSI reporting, some report types (e.g., RI, PMI, CQI, and/or subset of subbands) may have dependencies on other reported report types. For example, PMI and/or CQI may be dependent on reported RI (e.g., most recently reported RI). This may be impacted, for example, where the WTRU may delay and/or drop a periodic report type. For example, the WTRU may replace a lower priority report type with a higher priority report type that has been delayed. For example, the WTRU may be unable to acquire the channel to transmit RI. In a future UL time period, the WTRU may be configured with regular transmission of CQI. The RI may have been delayed. The RI may have higher precedence over the CQI. The resources intended for the transmission of CQI may be reused for the transmission of RI. The resources intended for the transmission of CQI may be reused for the transmission of a combination report (e.g., for RI and/or CQI). A lower priority report type may be delayed due to the transmission of a higher priority report type. The WTRU may delay and/or drop the lower priority report type to a subframe (e.g., a future subframe) within the UL time period. The WTRU may delay and/or drop the lower priority report type to a UL time period (e.g., future UL time period). A WTRU may delay and/or drop the lower priority report type to a future subframe within the UL time period and/or to a future UL time period, for example, when a lower priority report type has been delayed due to the transmission of a higher priority report type.

The periodic CSI reporting configuration may include timing that is based on UL time periods. For example, the timing may be based on counting subframes (e.g., all possible subframes) that a WTRU may acquire for UL transmissions (e.g., whether it has been successful or not). The timing may be based on counting subframes (e.g., only subframes) where the WTRU has acquired the channel for an UL time period. Such an acquisition of the channel may lead to the WTRU using it for UL transmissions. Such an acquisition of the channel may have been for the purposes of counting down subframes for periodic CSI reporting. The network may be aware of the time periods, for example, where a WTRU has acquired UL transmissions based on whether it has received UL transmissions from the WTRU. The WTRU may acquire a channel. The WTRU may not have UL transmissions scheduled for the UL time period. The WTRU may inform the eNB of such a case, for example, so that the eNB may know when to expect periodic CSI reporting from the WTRU.

A WTRU may receive an aperiodic CSI request. A WTRU may have to delay the aperiodic CSI report. For example, a WTRU may have to delay the aperiodic CSI report due to being unable to acquire the next UL time period. The reference resource used by the WTRU for CSI measurements may be unclear. For example, the subframe, CRS resource, CSI-RS resource, and/or reference resource used for measurements may be tied (e.g., may always be tied) to the timing of the aperiodic CSI request. The subframe, CRS resource, CSI-RS resource, and/or reference resource used for measurements may be tied to the timing of the transmission of the aperiodic CSI report. A reference resource may be determined to be in subframe m-k, where k may be semi-statically and/or dynamically configured, for example, when an aperiodic CSI request is to be transmitted in the subframe m of a UL time period. The reference resource may be tied to a pre-determined subframe (e.g., the first subframe) of an UL time period within which the aperiodic CSI report may be transmitted. The aperiodic CSI report may be in a different subframe as that used to determine the location of the reference resource. There may be multiple subsets of subframes. The WTRU may assume different measurements. The reference resource may be determined by any of the examples described herein. The reference resource may be determined by any of the subset of subframes where the CSI request was included. The reference resource may be determined by any of the subset of subframes where the aperiodic CSI report is included. The reference resource may be determined by any of the subset of subframes where the UL time period is included. For delayed periodic reports, similar rules may apply for the determination of the reference resource. For example, the intended reference resource may be used regardless of whether the periodic report was delayed. In an example, the reference resource may depend on the timing of the actual transmission of the periodic report.

A WTRU may attempt RACH on an LAA cell. For example, the WTRU may have to acquire the channel. The WTRU may attempt a transmission on the PRACH. The WTRU may attempt a retransmission on the PRACH. The WTRU may attempt a retransmission on the PRACH, for example, when it is configured for multiple PRACH transmissions. The WTRU may attempt a retransmission on the PRACH, for example, when the previous RACH attempt failed. The retransmission may be in the same UL time period. A WTRU may transmit (e.g., autonomously transmit) a busy signal, for example, when retransmission is in the same UL time period. The WTRU may transmit a busy signal until the time where it expects a random access response. The WTRU may transmit a busy signal until the time when it may retransmit the PRACH. For example, the WTRU may retransmit the PRACH preamble in (e.g., only in) a valid UL time period (e.g., future valid UL time period). The WTRU may be unable to acquire the channel in an UL time period (e.g., the next UL time period). The WTRU may be configured to count an unsuccessful channel acquisition as a failed PRACH attempt. In an example, the transmissions of PRACH preamble (e.g., only the actual transmissions of PRACH preamble) may be counted as failed PRACH attempts. The transmissions of PRACH preamble may be counted as failed PRACH attempts, for example, even when they are separated by multiple non-acquired UL time periods. The WTRU may indicate to the eNB the number of PRACH transmissions that were delayed. For example, the WTRU may indicate to the eNB the number of PRACH transmissions that were delayed due to being unable to acquire the channel. This may provide information regarding the eNB of the current traffic load on the license exempt channel.

WTRU power control techniques may be applicable to one or more of PUSCH, PUCCH, and/or SRS transmission power.

A WTRU may be capable of transmitting for a grant it has decoded. A WTRU in an LAA cell may not be able to acquire an unlicensed channel for a UL transmission, for example, when a channel is determined to be busy and/or in use by other wireless entities, such as other LAAs, Wi-Fi users, and/or other wireless transmitters.

A WTRU may determine a channel condition and/or availability. For example, a WTRU may determine a channel condition and/or availability by monitoring the channel during a CCA period. A WTRU may measure the received power and/or interference and compare it against one or more threshold levels. A measurement may include the received power from other LAA transmitters, other Wi-Fi transmitters, and/or other wireless interferers. A comparison may be performed, for example, by using fixed threshold and/or soft threshold mechanisms. A fixed threshold may comprise, for example, setting and/or configuring a WTRU with one or more interference and/or received power threshold values. A WTRU may determine a channel as free and/or available, for example, when a measured interference and/or received power do not exceed one or more thresholds. A WTRU may use a free and/or available channel, for example, by transmitting a UL signal (e.g., following the legacy procedures). A WTRU may determine a channel as busy, for example, when a measured interference and/or received power exceed one or more thresholds. A WTRU may not transmit a UL signal (e.g., granted PUSCH) and/or may not use a busy channel.

A soft threshold mechanism may be referred to as "adjustable threshold," "flexible threshold," etc. A soft threshold may comprise, for example, a WTRU transmitting a UL signal in one or more (e.g., most) channel interference conditions. A UL signal may be transmitted, for example, when a measured interference and/or received power during a CCA process exceed a threshold. UL transmission parameters for a transmitted UL signal may, for example, be a function of measured interference and/or received power during the CCA process. UL transmission parameters for a UL signal may comprise, for example, one or more of transmit UL power, Transport-Block (TB) size, Modulation and Coding Scheme (MCS), Resource Elements (RE) mapping, Reference Signal (RS) (e.g., DMRS, CRS), and/or allocated physical resource blocks (PRBs). A WTRU may, for example, determine a maximum allowable transmission power in a UL block of subframes. Allowable transmission power may be determined, for example, as a function of the measured interference and/or received power during a CCA process preceding a UL block of subframes.

WTRU "requested UL transmission power" may refer to WTRU transmission power calculated and/or derived. For example, WTRU "requested UL transmission power" may refer to WTRU transmission power calculated and/or derived using legacy procedures and/or parameters. Legacy procedures and/or parameters may comprise, for example, a legacy TPC accumulator, a WTRU maximum transmission power (e.g., WTRU maximum power regardless of channel condition), a requested MCS index (e.g., MCS index provided in the UL grant), path loss to an eNB, etc. A WTRU may use UL power, for example, when a WTRU follows legacy procedures.

A WTRU may determine its actual UL transmission power in an LAA cell. For example, a WTRU may determine its actual UL transmission power in an LAA cell as a function of allowable transmission power. Actual UL transmission power in a UL block of subframes may be calculated, for example, as a minimum of a maximum allowable transmission power and/or a requested UL transmission power.

A WTRU may set a maximum allowable transmission power for a UL block to an actual WTRU maximum transmission power and/or any other power level, for example, when a measured interference and/or received power during a CCA process is lower than a set and/or configured threshold. A power level may be configured by an eNB. A power level may be, for example, semi-statically configured. In an example, a WTRU may set its maximum allowable UL transmission power (e.g., for a UL transmission period/block following a CCA) to a maximum WTRU transmission power reduced by XX dB. The maximum allowable UL transmission power may be set, for example, when a measured interference and/or received power (e.g., during a CCA) is XX dB above a set and/or configured threshold.

A WTRU may be set and/or configured with a fixed power parameter, which may be referred to as fixed power. A WTRU may calculate a maximum allowable transmission power for a UL block (e.g., following a CCA process), as a minimum of the actual WTRU maximum transmission power and/or a difference of the fixed power and/or a measured interference and/or received power during the CCA process. This algorithm and/or mechanism may result in the total value of the actual transmit power and/or the measured interference and/or received power in the channel being equal to, or less than, the fixed power parameter. A WTRU may be configured by a parameter indicating a minimum UL transmission power. A WTRU may not transmit a UL signal, for example, when a calculated maximum allowable power is less than a minimum transmission power.

A WTRU may request an UL transmission power. A requested UL transmission power may be less than a maximum allowable UL transmission power. As a result, for example, a channel interference and/or received power may not impact a WTRU UL transmission, a WTRU may set an actual UL transmission power as a requested UL transmission power, and/or a WTRU may transmit a UL signal (e.g., PUSCH) without modification (e.g., as granted by a related UL grant). A requested UL transmission power may be higher than a maximum allowable UL transmission power. As a result, for example, a WTRU may set an actual UL transmission power as a maximum allowable UL transmission power. Power may be reduced, for example, as a function of one or more other UL signal characteristics (e.g., MCS, repetition) using one or more mechanisms.

A single TB may be transmitted per WTRU per subframe. A WTRU may be configured (e.g., implicitly and/or explicitly configured) with one or more TB size, MCS, resource block assignment, precoder, and/or TPC command. A WTRU may choose a combination, for example, depending on the measured interference and/or received power during a CCA process.

A WTRU may be configured (e.g., implicitly and/or explicitly configured) with one or more sets of transmission parameters. A WTRU may be provided with a first set of parameters that may indicate, for example, one or more of a first resource block assignment, a first MCS, a first precoder, and/or a first TPC command. A WTRU may be provided a second set of parameters that may indicate, for example, one or more of a second resource block assignment, a second MCS, a second precoder, and/or a second TPC command.

A WTRU may be provided with a UL grant. For example, a WTRU may be provided with a UL grant that may comprise multiple sets of transmission parameters and/or multiple MCS values, which may map to different TB sizes for a (e.g., the same) resource block assignment. A WTRU may receive a single MCS and/or set of transmission parameters, for example, as part of a UL grant. A WTRU may calculate a corresponding TB size, for example, by considering a resource block assignment. A WTRU may derive one or more TB sizes, MCS values, and/or set of transmission parameters, for example, by using predefined and/or configurable rules. A derived TB and/or MCS may correspond to lower UL transmission power values. In an example of this algorithm and/or mechanism, a WTRU and/or eNB may follow one or more procedures in any order. A WTRU may receive a single MCS, e.g., mcs_0, and may be allocated a certain number of PRBs, e.g., n_prb.

A WTRU may use legacy procedures to determine a TB size corresponding to a received mcs_0 and n_prb, which may be referred to tb_0.

A WTRU may receive a configuration to implicitly derive x (e.g., x=2) number of other sets of UL transmission parameters, for example, from the single received set of UL parameters. A WTRU may be configured with a TB size scaling factor sc_x. X may be an index of a set, for example, for one or more (e.g., each) derived sets of UL transmission parameters (e.g., sc_1=2 and sc_2=4). A first set may be referred to by its parameters, e.g., {mcs_1, tb_1, sc_1}, a second set may be referred to by its parameters, e.g., {mcs_1, tb_1, sc_1}, etc.

A WTRU may determine tb_1=func(tb_0/sc_1). For example, a WTRU may determine tb_1=func(tb_0/sc_1) for a first set of UL transmission parameters. Func(inp) may, for example, return an immediate higher or lower TB block size entry of inp, e.g., as may be defined in a specified TB block size table for the same number of layers and PRB size.

A WTRU may determine mcs_1 as an MCS corresponding to TB size of tb_1. For example, a WTRU may determine mcs_1 as an MCS corresponding to TB size of tb_1 for a first set of UL transmission parameters. TB size may be defined in a specified TB size table, e.g., for the same number of layers and/or PRB size. A WTRU may choose mcs_1 as the lowest index, for example, when there are two corresponding MCS indexes for the same tb_1, n_prb, and/or number of layers. A WTRU may repeat one or more procedures for other sets of UL parameters (e.g., repeat one or more procedures for a second set of UL parameters to determine {mcs_2, tb_2, sc_2}).

A WTRU may be configured with offset values to determine other sets of transmission parameters. For example, a WTRU may be configured with offset values to determine other sets of transmission parameters based on one or more sets of transmission parameters. A WTRU may be scheduled with, for example, one or more of an MCS value, precoder, TPC command, and/or fixed or configurable offsets. A WTRU may determine, for example, one or more MCS values, precoders and/or TPC commands. As an example, a WTRU may receive a UL grant with an MCS index. The MCS index may map to a modulation order and/or to a TBS, which may be obtained as a function of the MCS index and/or size of the resource block assignment. A WTRU may derive a set of transmission parameters (e.g., a set of possible modulation order and/or TB size pairs), for example, based on an MCS index. A WTRU may derive a set, for example, by obtaining new MCS indices from the MCS index granted, e.g., by applying one or more offsets to the granted MCS index. One or more new MCS indices may map to the same or different modulation orders and/or TB sizes. In an example, an MCS index in a UL grant may map to a TBS index. A WTRU may obtain a set of TB sizes, for example, by applying a set of offset values to the TBS index to obtain a set of possible TBS indices. In an example, an MCS index may map to a TB size. A WTRU may obtain a set of TB sizes, for example, by applying an offset value to the TB size obtained from the UL grant.

A WTRU may prepare one or more possible TBs (e.g., one per set of transmission parameter) in advance. A WTRU may choose a TB and/or its corresponding transmission parameters, such as MCS and/or TPC command, to transmit in a UL instance.

Thresholds used in a CCA to attempt to acquire a channel for one or more possible UL transmissions (e.g., one per set of transmission parameters) may be different. For example, thresholds used in a CCA to attempt to acquire a channel for one or more possible UL transmissions (e.g., one per set of transmission parameters) may be different depending on a required UL transmission power.

Selection of one or more of MCS, TB size, and/or set of transmission parameters may be a function of one or more of a measured interference/received power, maximum allowable UL transmission power, requested UL transmission power, set/configured parameters, and/or tables at the WTRU.

A set of transmission parameters may be selected. Selection of a set of transmission parameters may depend, for example, on a priority for each set and/or parameter. A WTRU may attempt CCA with a threshold for a set of transmission parameters having a highest priority. A WTRU may transmit using the highest priority set of parameters and/or may ignore other sets of transmission parameters, for example, when it is determined a channel is clear. A CCA measurement may not achieve a threshold for a transmission of the highest priority set of transmission parameters. A WTRU may compare a CCA measurement to a threshold of a second highest priority set of transmission parameters, etc. until a transmission using a set of parameters is possible and/or until the grant is dropped, for example, when a CCA measurement does not achieve a threshold for a transmission of the highest priority set of transmission parameters.

A WTRU may be configured with a set of possible target receive powers ($P_{O,PUSCH,c}$). A WTRU may use a set of target receive powers, for example, to obtain a set of possible UL transmission powers for an UL grant. One or more UL transmission powers may have different CCA thresholds. A WTRU may have a priority list of target receive powers, which may be configurable. A WTRU may determine a UL power that may achieve the highest priority target receive power while satisfying the CCA threshold, for example, based on the priority list.

A WTRU may determine (e.g., autonomously determine) one or more transmission parameters for a UL grant (e.g., transmission power). A WTRU may indicate autonomously determined transmission parameters to a serving cell.

A WTRU may modify and/or ignore a TPC command in a UL grant. A WTRU may indicate to the serving cell whether it ignored or modified the TPC command. A WTRU may indicate a power offset to the serving cell, for example, when a WTRU modifies a TPC command. A power offset may indicate to a serving cell the actual TPC command used by the WTRU.

A modified and/or dropped TPC command may be ignored from a closed loop power control accumulation, for example, for TPC command accumulation. A suggested TPC command from a serving cell may be used for accumulation, for example, regardless of whether it was actually used and/or modified by a WTRU. An actual value for a TPC command used by a WTRU may be used for accumulation purposes.

A transmission parameter used may be indicated using one or more techniques.

An eNB may blindly decode for one or more possible MCS values, TB sizes, and/or sets of transmission parameters signalled to the WTRU. A WTRU may indicate a TB size utilized and/or MCS, for example, as a part of UL signalling, possibly transmitted over the licensed cell, e.g., via PUCCH signalling. A WTRU may inform a serving cell of a set of transmission parameters and/or transmission power used, for example, for one or more (e.g., each) transmission with multiple UL transmission power potential candidates. An indication of UL transmission parameters and/or transmission power used may be made, for example, concurrent with a UL transmission and/or at a future time.

An indication may be transmitted to a PCell. An indication may be a set of UL transmission parameters, e.g., for multiple LAA SCells. An indication may be transmitted within a UL transmission. As an example, a set of REs within a PUSCH may be reserved to include an indication of the parameters of the transmission. A set of REs may, for example, use a pre-configured and/or fixed MCS (e.g., QPSK). A set of REs may be located near a DM-RS, for example, to ensure appropriate demodulation. A PUSCH may be punctured, for example, to enable inclusion of a set of REs indicating one or more transmission parameters. CRC may be used on symbols transmitted within a set of REs indicating one or more transmission parameters. An indication may be included (e.g., implicitly) with an UL transmission. One or more parameters of a UL transmissions may depend on a set of transmission parameters used. In an example, a WTRU may have n possible sets of transmission parameters per UL grant. A WTRU may indicate which of the n possible sets is used in a transmission, for example, by using the index to determine another parameter of the UL transmission. As an example, DM-RS base sequence, cyclic shift, and/or the DM-RS OCC may be determined by the index of the set of parameters used. An eNB may blind detect a set of possible indication parameters (e.g., possible DM-RS), for example, to determine which set of transmission parameters are used by a WTRU. An indication may be transmitted in a later subframe, e.g., in a PUCCH transmission.

A WTRU may inform a serving cell of power headroom available while achieving a current and/or other CCA threshold, for example, in an indication of a set of transmission parameters used and/or other indication. As an example, assume a WTRU has one or more (e.g., two) sets of parameters. A WTRU may have been able to transmit at a power level between and/or among the one or more (e.g., two) quantized values. The WTRU may indicate the power headroom for one or more possible CCA thresholds. A reported indication may be responsive (e.g., highly responsive) (e.g., provided as quickly as possible), for example, when interference landscape may change rapidly.

A WTRU may transmit with a UL power lower than that of the requested UL transmission power, for example, due to a high measurement of interference and/or received power during a CCA process. One or more techniques may be used to improve reception of a UL signal by an eNB.

Multiple TBs per WTRU per subframe may be transmitted. A WTRU may receive indications from an eNB to transmit multiple (e.g., two or more) TBs and/or multiple instances of a (e.g., the same) TB in one or more (e.g., the same) subframe(s). Multiple instances of a TB may, for example, have the same TB size, the same MCS, the same payload, the same number of assigned PRBs and/or the same information bits. Transmitted TBs may have the same MCS and/or may have the same size. TBs and/or multiple instances of the same TB may be mapped to available Res, for example, by a frequency first and/or time first mapping arrangement. Transmission of different TBs and/or transmission of multiple instances of the same TB may be used interchangeably. A TB may be mapped to REs immediately available after the last RE containing the previous TB in the order of RE mapping, e.g., by a frequency first and/or time first arrangement. A TB may be mapped to the first available REs in a SC-FDMA symbol after the last SC-FDMA symbol containing the previous TB in that subframe in the order of RE mapping, e.g., by frequency first arrangement. A TB may be mapped to the first available REs in a subcarrier after the last subcarrier containing the previous TB in that subframe in the order of RE mapping, e.g., by time first arrangement. A TB may be mapped to the first available REs in a PRB after the last PRB containing the previous TB in that subframe in the order of RE mapping, e.g., by PRB first. REs may be mapped by frequency first and/or time first arrangement, for example, within a PRB and/or PRB set used for the same TB. An available RE may refer, for example, to an RE available to carry PUSCH symbols and may not be allocated to other signals, such as PDCCH, DMRS, CRS, CSI, etc.

A WTRU may receive one or more TB sizes and/or MCSs. For example, a WTRU may receive one or more TB sizes and/or MCSs as part of a UL grant. In an example, there may be one or more (e.g., only one) MCS in a UL grant that may include a number (e.g., different number) of PRB indications. As an example, a grant may carry a sequence of {2,1,3}, which may indicate that 2 PRBs may be allocated to the same TB, 1 PRB may be allocated to a single TB, and 3 PRBs may be allocated to another TB. Each allocation may correspond to the same or different TB sizes considering the same received MCS. A WTRU may prepare one or more TB sizes in advance.

A WTRU may receive one or more (e.g., only one) MCS. For example, a WTRU may receive one or more (e.g., only one) MCS as part of a UL grant. A WTRU may, for example, follow certain rules. A WTRU may divide a total number of allocated PRBs in more than one set of PRBs. A WTRU may determine (e.g., for one or more sets of PRBs) the TB size by considering the number of PRBs and/or the signalled MCS. As an example, a WTRU may receive a PRB assignment with 6 PRBs. A WTRU may divide 6 PRBs into one or more (e.g., two) sets of 3 PRBs. A WTRU may use the same received MCS for each set. A WTRU may determine the TB size to be transmitted in each of these sets (e.g., two sets of 3 PRBs). A WTRU may indicate and/or be configured with more than one TB in the same subframe(s). A WTRU may transmit one or more TBs as requested, for example, when a maximum allowable UL transmission power is higher than the requested UL transmission power. UL transmission power may be calculated as a function of the measured interference and/or received power during a CCA process.

A WTRU may transmit one or more (e.g., a subset) of granted TBs, repeat one or more TBs in the same or different subframe(s), and/or drop remaining TBs, for example, when the maximum allowable UL transmission power is lower than the requested UL transmission power. Maximum allowable UL transmission power may be calculated, for example, as a function of the measured interference and/or received power during a CCA process. Repeating the same TB in the same subframe may, for example, improve the reception of the UL signal by the eNB. A WTRU may determine a number of repetition(s), for example, as a function of the requested UL transmission power, actual UL transmitted power, maximum allowable UL transmission power, measured interference and/or received power during the CCA process, received grant(s), etc. Interference may be from one or more sources, e.g., other LAA, Wi-Fi, and other interference sources. In an example, a WTRU with multiple configured TBs may send (e.g., decide to send) one or more (e.g., all) TBs, for example, depending on a channel condition. A WTRU may repeat it one or more (e.g., several) times, for example, to improve reception of a TB at an eNB. A WTRU and/or eNB may perform one or more acts or functions in any order. Examples of acts and/or functions are provided.

A WTRU may receive a UL grant in a subframe number, e.g., sf n. A grant may allocate a number of PRBs, e.g., n_prb, to the WTRU, e.g., n_prb=4. A grant may indicate an MCS.

A WTRU may assume tb n number of TBs, e.g., tb n=n_prb (e.g., 4), where each PRB may contain a single TB.

A WTRU may prepare tb n (e.g., 4) number of TBs in advance prior to the potential UL transmission in subframes (e.g., four subframes) after receiving the UL grant, e.g., UL subframe (sf n+4).

A WTRU may monitor a channel during a CCA process prior to the UL subframe (sf n+4) and/or may measure the interference and/or received power during that CCA process.

A WTRU may calculate a difference parameter xx_db as the measured interference/received power minus a set/configured threshold. A WTRU may set the maximum allowable UL transmission power equal to the maximum WTRU transmission power minus xx_db.

A WTRU may determine the requested UL transmission power. For example, A WTRU may determine the requested UL transmission power using legacy procedures and/or parameters (e.g., legacy TPC accumulator) regardless of channel condition.

A WTRU may transmit TBs (e.g., all prepared TBs) where each may be mapped to a PRB (e.g., a single PRB) using the configured MCS, for example, when the maximum allowable UL transmission power is higher than the requested UL transmission power.

A WTRU may transmit (e.g., only transmit) a (e.g., the first) TB and/or drop remaining TBs, for example, when a maximum allowable UL transmission power is lower than the requested UL transmission power. A WTRU may repeat the same TB in multiple (e.g., all) allocated PRBs. As an example, a WTRU may repeat a (e.g., the same) TB n_prb times, where n_prb may be equal to n_tb (e.g., 4 times).

An eNB may decode (e.g., blindly decode). For example, an eNB may decode to determine whether multiple (e.g., all) PRBs contain the same information and/or TB. An eNB may combine multiple (e.g., all) repetitions, for example, to improve decoding performance, such as when PRBs (e.g., all PRBs) contain information (e.g., the same information) and/or TB. An eNB may decode PRBs (e.g., may decode PRBs separately) and/or may decode one TB per PRB, for example, when PRBs (e.g., all PRBs) do not contain the same information and/or TB.

A WTRU may be configured with and/or may measure parameters (e.g., inputs) for a UL power control formula (algorithm and/or procedure). Parameters may comprise a set of (e.g., one or more) UL power control parameters, such as Maximum transmission power ($P_{cMAX,c}$), bandwidth of a PUSCH resource assignment ($M_{PUSCH,c}$), target received power ($P_{O\_PUSCH,c}$), pathloss to the serving cell ($PL_c$), pathloss scaling factor ($\alpha_c$), a factor obtained from the MCS ($\Delta_{TF,c}$), PUSCH power control adjustment state ($f_c$), pathloss of an interfering cell ($PL_i$), a scaling factor of the interfering cell pathloss ($\alpha$), and/or measured interference (I) and bandwidth of the interference ($M_i$).

A WTRU power control formula may account for the effect of interfering cells (e.g., multiple interfering cells). An interfering cell may have, for example, its own pathloss ($PL_i$), scaling factor ($\alpha i$), and/or interference bandwidth ($M_i$). A scaling factor may be pre-configured, for example, by the serving cell. A WTRU may be provided with a set of possible scaling factors for interfering cells. A WTRU may determine an appropriate scaling factor. As an example, a scaling factor may depend on a type of interference. A WTRU may use different interfering pathloss scaling factors, for example, depending on whether interference comes from a friendly LAA cell (e.g., a cell that may allow simultaneous operation on an unlicensed channel), an unfriendly LAA cell (e.g., a cell that may not allow simultaneous operation on an unlicensed channel), and/or from another RAT (e.g., Wi-Fi). Measured interference (I) may be and/or may comprise, for example, a measurement taken during CCA operation and/or an interference measurement on an unlicensed channel in another resource, for example, which may be controlled by an eNB.

A WTRU may be capable of transmitting for a grant it decoded. A WTRU may be unable to acquire an unlicensed channel for a UL transmission. A WTRU may not transmit in an unlicensed channel despite a serving cell granting resources, for example, in case of one or more errors at the transmitter. An error at the transmitter may comprise, for example, an undetected grant by a WTRU and/or an inability of a WTRU to acquire the unlicensed channel. There may be one or more types of errors at a receiver. An error at the receiver may comprise, for example, unsuccessful reception at the receiver when a WTRU may successfully detect a grant and transmit. It may be beneficial for a cell to know which error occurred.

A WTRU may acknowledge reception of UL grants. Acknowledgement may be configurable. A WTRU may indicate an acknowledgement, for example, in configurable resources (e.g., PUCCH resources, MAC CE, etc.) using a bit when it received a UL grant. An indication may or may only, for example, depend on whether a WTRU transmission was performed. PUCCH resources may be to a PCell and/or to an unlicensed cell. The timing of an acknowledgement may coincide with the timing of a granted transmission.

A DCI providing a UL grant may, for example, indicate whether to acknowledge reception of the grant. A WTRU may acknowledge reception of the grant, e.g., when indicated to do so. Status of a previous grant may be indicated in a next granted UL transmission. As an example, a WTRU may be scheduled for transmission in a first UL block. The WTRU may not be able to acquire a channel during the first UL block. The WTRU may be scheduled for transmission in a second UL block. The WTRU may acquire a channel for UL transmission in the second UL block. A WTRU may provide an indication of the status of a grant (e.g., detected, not detected, transmitted, not transmitted, etc.) for a (e.g., first) UL block in a transmission occurring during a second UL block.

A WTRU may be configured with periodic resources. A WTRU may use periodic resources, for example, to indicate to a cell whether one or more grants were detected but dropped, e.g., due to an inability to acquire an unlicensed channel. A WTRU may use a (e.g., a first) subframe of a UL block on a successfully acquired channel, for example, to indicate to a cell whether one or more grants were detected in another (e.g., previous) UL block where a channel was not successfully acquired. As an example, a WTRU may detect a grant for a transmission in a first UL block, but may not be able to acquire the channel during this UL block. In a second UL block, the WTRU may acquire the channel and/or may transmit an indication to the cell that it detected the grant for the previous UL block, but was unable to acquire the channel.

A WTRU may indicate and/or report a status and/or result of other events and/or attempts. As an example, a WTRU may indicate when it was able to detect the grant and/or was able to perform the transmission. Event reporting may enable a cell to distinguish events. As an example, a cell may be able to distinguish between a WTRU not detecting a grant and/or a WTRU detecting a grant and transmitting with unsuccessful reception. An indication may, for example, be provided with one or more (e.g., two) bits. As an example, codepoint '00' may indicate no grant detected for UL block and/or subframe, codepoint '01' may indicate a grant detected for an UL block and/or subframe but no transmission possible, codepoint '10' may indicate a grant detected for an UL block and/or subframe and/or transmission performed, and codepoint '11' may be reserved.

A DCI or DCI format that may include a grant for a UL transmission on an unlicensed channel may include a grant index. As an example, a DAI may be used in FDD, TDD, and/or may be enhanced for TDD. An index may enable a WTRU to determine whether it missed a UL grant. A WTRU may use an index to indicate to a serving cell a list of grants that a WTRU a) detected and/or transmitted, b) detected and/or dropped, e.g., due to an inability to acquire a channel, and/or c) did not detect. A WTRU may transmit to a cell (e.g., serving cell, PCell) indices of grants for one or more detection/transmission cases. Indices may reduce ambiguity at a cell in terms of determining causation for an inability to receive a UL transmission. A grant may be dropped, for example, when a WTRU detects a grant for a UL transmission but is unable to acquire an unlicensed channel for transmission. Transmission parameters (e.g., TPC command) may be included, for example, in a DCI for the UL grant. Without a transmission, there may be ambiguity about how a WTRU accumulates a TPC command, e.g., when a WTRU is configured to accumulate a TPC command.

A WTRU may forget information (e.g., TPC command) included in a grant. For example, a WTRU may forget (e.g., discard) information (e.g., TPC command) included in a grant when a WTRU drops a UL transmission, e.g., due to failure to acquire an unlicensed channel. Accumulation may occur for grants that led to UL transmissions. A WTRU may accumulate the TPC command whether or not an UL transmission occurred.

A serving cell may be unaware, for example, when a transmission occurred and/or was not received, a transmission was dropped and/or a grant was not detected by a WTRU. A TPC command transmitted by a serving cell may assume that a previous transmission occurred and/or was not received. An increase in power may result from poor link adaptation, which may negatively impact a WTRU's ability to acquire a channel, and/or may propagate power control errors.

A WTRU may store a TPC command of a dropped grant and/or use it in a future grant, e.g., ignoring the future grant's TPC command. As an example, a WTRU in a first grant may be given a first value of TPC command (e.g., 0 dB). The WTRU may not be able to acquire the channel and/or may drop the grant. In a future grant, the WTRU may be given a TPC command (e.g., 3 dB). A WTRU may use the stored value of TPC command (e.g., 0 dB) and/or ignore the TPC command included in the new grant. The WTRU may indicate this behaviour to the serving cell, e.g., in a UL transmission and/or using a technique to indicate dropped grants.

A time limit and/or other restriction may be configured for a previous TPC command. For example, a time limit and/or other restriction may be configured for a previous TPC command to override a TPC command in a UL grant. As an example, overriding a current TPC command with a previous TPC command may be permitted, for example, when one or more (e.g., two) grants are intended for adjacent subframes and/or UL blocks. As an example, stored TPC commands (e.g., from dropped grants) may be deleted upon expiration of a fixed and/or configurable timer.

A WTRU may indicate a recognized grant (e.g., a recognized but unused grant). A WTRU may receive a UL grant. A UL grant may indicate a grant is for new data (e.g., new data indicator (NDI) is toggled) and/or for a retransmission (e.g., the new data indicator (NDI) is not toggled). A WTRU may have resources allocated (e.g., implied grant) for UL transmission and/or retransmission, e.g., based on semi-static persistent scheduling (SPS). A WTRU may have resources allocated (e.g., implied grant) for UL retransmission, for example, by reception of NACK for a HARQ process and/or no reception of ACK when expected for a HARQ processes. The term grant may be used to represent one or more of an explicit grant, a resource allocation, and/or an implied grant.

A WTRU may perform LBT/CCA. For example, a WTRU may perform LBT/CCA to determine whether the channel is free, for example, when a WTRU receives a grant for a transmission (e.g., a new transmission). A WTRU may transmit a MAC PDU for a HARQ process on a PUSCH, for example, when the WTRU determines the channel is free. A MAC PDU may remain in the buffer of a HARQ process, e.g., so that a retransmission may be performed when needed, requested, and/or granted. A WTRU may obtain a MAC PDU for transmission for a HARQ process, and/or may not make the transmission, for example, when the WTRU determines the channel is not free. A MAC PDU, although not transmitted, may be in the buffer of the HARQ process and/or may remain in the buffer of the HARQ process. A next grant for a HARQ process may be for a retransmission. An eNB may know a reason for retransmission. Reasons for retransmission may include, for example, a previous transmission failed due to channel interference, a grant for pervious transmission was not received, and/or a grant was received and transmission could not be made, e.g., due to the channel being determined to be busy.

A WTRU may include with a UL transmission (e.g., for a HARQ process) an indication regarding a current transmission and/or at least one of a previous grant, transmission, and/or transmission attempt, e.g., for the HARQ process. An indication included with a transmission that corresponds to a granted retransmission may indicate, for example, whether a previous (e.g., the most recent) granted transmission or retransmission, e.g., for the HARQ process, was attempted and/or failed (e.g., was not transmitted), e.g., due to a determination by the WTRU that the channel was busy. An indication included with a transmission that corresponds to a granted retransmission may indicate whether a grant for a previous (e.g., the most recent) granted transmission and/or retransmission, e.g., for the HARQ process, was received and/or the transmission was not made e.g., due to a determination by the WTRU that the channel was busy. An indication included with a transmission that corresponds to a granted retransmission may indicate whether the transmission is a new transmission, e.g., the HARQ process buffer was empty when the retransmission request was received and/or new data was being transmitted. An indication included with a transmission that corresponds to a granted retransmission may indicate the number of previous granted transmissions and/or retransmissions, e.g., for the HARQ process, that were attempted and failed (e.g., were not transmitted), e.g., due to determination by the WTRU that the channel was busy. An indication included with a transmission that corresponds to a granted retransmission may indicate the number of previous grants for granted transmissions and/or retransmissions that were received, e.g., for the HARQ process, for which the WTRU did not transmit, e.g., due to determination by the WTRU that the channel was busy. An indication included with a transmission that corresponds to a granted retransmission may indicate the number (and/or other statistics) of failed attempts to transmit, e.g., a MAC PDU, for a particular HARQ process of an LAA cell, which may be the number (and/or statistics) since the last transmission of a MAC PDU for that HARQ process. An indication included with a transmission that corresponds to a granted retransmission may indicate a failure of a (e.g., a most recent) previous attempt to transmit, e.g., a MAC PDU, for a particular HARQ process of an LAA cell. An indication may be binary, e.g., one state may mean one or more previous transmission attempts failed and/or did not fail. An indication may represent a failure count. A count may be an actual count, a quantized count, an indication of count range, and/or other representation. A count may be capped at a maximum value, which may be configured.

A WTRU may provide (e.g., include with a UL transmission) an indication as to whether a transmission was previously attempted and failed and/or was prevented, e.g., due to determination (e.g., by the WTRU) that the channel was busy. A WTRU may include an indication with the transmission, for example, when the WTRU receives a grant for retransmission, e.g., for a HARQ process, and makes the transmission. An indication may indicate, for example, whether a previously granted transmission and/or retransmission, e.g., for the HARQ process, was not made by the WTRU, e.g., due to WTRU determination that the channel was busy. A WTRU may (e.g., may only) provide (e.g., include in an UL transmission) an indication that corresponds to a granted retransmission. A WTRU may provide an indication that corresponds to a new data transmission, for example, when the grant is for a retransmission. An indication may be provided (e.g., as separate bits, such as physical layer bits) from the MAC PDU in the transmission, for example, in a manner similar to UCI piggybacked on PUSCH.

A WTRU may maintain a counter. For example, a WTRU may maintain a counter for each UL HARQ process that may be associated with an LAA cell. A counter, which may be referred to as tx-attempt-ctr, may be initialized, e.g., to zero, when a grant for new data is received for a HARQ process. A counter may be implemented with a variety of initialization values and/or a variety of count/increment magnitudes and/or polarities. In an example, a counter may be initialized to a value (e.g., zero) and count up (e.g., count up by ones) and/or count down (e.g., count down by ones). A WTRU may increment a counter, for example, when a WTRU does not transmit new data, e.g., due to determination the channel is busy. A WTRU may store new data in the HARQ process buffer. Storage may be before or after channel busy determination. A WTRU may increment a counter, for example, when the WTRU receives a grant for retransmission for a HARQ process and does not transmit the data for the HARQ process (e.g., the data in the HARQ process buffer), for example, due to determination that the channel is busy.

A WTRU may provide (e.g., include with a transmission) an indication when the WTRU receives a grant for retransmission for a HARQ process and/or transmits the data for the HARQ process (e.g., the data in the HARQ process buffer). An indication may be the value of a counter. The indication may be a binary, for example, where one value may indicate the count is zero and the other may indicate the count is non-zero.

A WTRU may send a report to an eNB, for example, when a tx-attempt-ctr exceeds a threshold.

A WTRU may provide one or more radio link (RL) status reports to an eNB. A WTRU may provide (e.g., include in an RL status report) LBT/CCA status and/or statistics. As an example, a WTRU may provide a UL RL status report. In an example, a WTRU may report how many LBT/CCA attempts failed out of how many tries, e.g., over a period of time, which may be configured. A report may be, for example, periodic, event triggered, or on-demand. An example of an event, which may trigger the WTRU to send a report, may be when the number of failed attempts, e.g., over a configured period of time, exceeds a threshold, which may be configured (e.g., by the eNB). A WTRU may report (e. g., for a specific attempt) whether LBT/CCA passed or failed. A request to report may be provided. A request may be included in a UL grant. A WTRU may be configured to provide RL status, e.g., for one or more LAA cells. RL status may be used, for example, to indicate to an eNB (and/or to be used by the eNB to determine) the probability of success for UL (and/or DL) transmissions on one or more unlicensed channels or LAA cells.

A WTRU may transmit an RL status report (e.g., UL RL status report) using, for example, one or more of physical layer, MAC layer, and/or RRC signaling. An RL status report (e.g., UL RL status report) may (e.g., may be triggered to) indicate to an eNB that a WTRU did not perform one or more UL transmissions, e.g., even though it had successfully determined that it had been granted resources for the one or more UL transmissions on an LAA cell.

A WTRU may be provided with a UL transmission grant. For example, a WTRU may be provided with a UL transmission grant (e.g., by a licensed cell), for a transmission on an LAA cell. A WTRU may attempt to acquire an unlicensed channel for UL transmission, for example, at some time between reception of the grant and/or the time of the granted resources. A WTRU may increment a count of failed attempts, for example, when the WTRU determines that it cannot access the channel in time to proceed with the granted UL transmission. An RL status report may be triggered, for example, when the count exceeds a threshold. A WTRU may report a rate of failed UL transmissions, for example, over a fixed and/or configured period of time. The time period may be included in the report. A WTRU may transmit the report, e.g., periodically. A WTRU may zero the count, for example, when the report is transmitted and/or scheduled for transmission.

A WTRU may transmit an RL status report on a licensed carrier and/or unlicensed carrier. The WTRU may indicate, e.g., in a status report, a HARQ process number and/or another identifier (e.g., a DAI) for one or more UL transmissions (and/or transmission attempts) on one or more LAA cells and/or unlicensed carriers that may have failed, for example, due to being unable to acquire the unlicensed channel(s) in time.

A WTRU may be provided with resources on which to transmit an RL status report. A WTRU may transmit a UL status report, for example, upon reception of a future UL grant. A WTRU may request a UL grant on a licensed and/or unlicensed carrier. A WTRU may provide (e.g., include in a scheduling request) a list of UL transmissions (e.g., a list of all UL transmissions) that failed, for example, due to being unable to acquire the unlicensed channel.

A WTRU may provide probability and/or statistics information, e.g., in an RL status report. A WTRU may measure and/or determine (e.g., based on measurements) the information for one or more LAA cells and/or unlicensed channels. The information may comprise, for example, channel acquisition probability for UL and/or DL transmissions. In an example, a WTRU may determine that a channel may be too busy for UL and/or DL transmissions and may indicate this determination to an eNB. An eNB may use the information, for example, to help determine the presence of a hidden node for the WTRU.

A WTRU may monitor a channel. For example, a WTRU may monitor a channel by use of an interference measurement mechanism. A WTRU may determine average interference levels on a channel. A WTRU may determine a time-based interference profile of a channel. A determination may comprise second order statistics on interference and/or load of the channel. In an example, a WTRU may determine different interference levels on a channel and/or the probability of each interference level (e.g., load distribution). A WTRU may be provided (e.g., by an eNB) with a load assumption for a channel. A WTRU may use a load assumption, e.g., in combination with an interference measurement, for example, to determine a channel acquisition probability. A WTRU may determine the probability of acquiring a channel, for example, based on interference and/or load measurements. A channel acquisition probability may, for example, depend on UL transmission power. A WTRU may determine multiple channel acquisition probabilities. A WTRU may be configured by an eNB with a (e.g., a specific) UL transmission power assumption for one or more (e.g., all) activated unlicensed channels. Measurements, which may be used for determining channel acquisition probability, may be performed over one or more potentially valid UL subframes (e.g., every n frames, where n may be fixed and/or configurable). A WTRU may be configured, e.g., by higher layer signaling, with a specific set of subframes in which a WTRU may make measurements. Signaling may take the form of measurement resource restriction patterns. A WTRU may be enabled to make appropriate measurements for DL channel acquisition probability in possible DL subframes and/or UL channel acquisition probability in possible UL subframes.

A UL grant may be provided to a WTRU (e.g., in subframe n). A WTRU may be expected to transmit, for example, in subframe n+k, where k may be 4 for FDD. It may be difficult for an eNB to distinguish no transmission by the WTRU from unsuccessful reception of a transmission by the eNB, for example, given that CRC may fail in both cases.

A WTRU may provide an indication and/or signal, e.g., in or with the transmission on an LAA cell, that may be used, for example, by an eNB to determine transmission presence and/or successful reception (e.g., by the eNB). The indication and/or signal may not be subject to CRC. In an example, an indication and/or signal may be one or more bits, which may not be included as part of a transport block and/or MAC PDU, for example, similar to UCI bits. In an example, a reference signal (RS), such as SRS and/or DMRS, may be provided (e.g., by the WTRU), for example, with a UL transmission, e.g., on (e.g., only on) an LAA cell. One or more transmission parameters and/or a time/frequency (e.g., time and/or frequency) location of an RS may be configured (e.g., by higher layer signaling) and/or physical layer signaling, such as in the grant (e.g., the DCI for the grant). The time/frequency location may be a specific symbol, such as the last symbol.

An eNB may receive and/or detect (e.g., successfully receive and/or detect) an indication and/or signal that may be used to determine transmission presence and/or successful reception. An eNB may determine that a WTRU made a transmission that may comprise an accompanying MAC PDU, TB, and/or PUSCH transmission, for example, even when the accompanying MAC PDU, TB, and/or PUSCH may not be successfully received by the eNB. An eNB may determine that a WTRU did not make an associated MAC PDU, TB, and/or PUSCH transmission, for example, when an eNB does not receive and/or detect (e.g., does not successfully receive and/or detect) the indication and/or signal.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A wireless transmit/receive unit (WTRU) comprising:
   a processor configured to:
   detect a listen before talk (LBT) failure, wherein the LBT failure is associated with a first cell;
   determine that a number of LBT failures associated with the first cell has reached a threshold value based on the detected LBT failure; and
   based on the determination that the number of LBT failures associated with the first cell has reached the threshold value, send a notification to a base station using a second cell, wherein the notification indicates that the threshold value has been reached.

2. The WTRU of claim 1, wherein the threshold value is a configured value, and wherein the threshold value is a maximum number of LBT failures.

3. The WTRU of claim 1, wherein the notification comprises a medium access control (MAC) control element (CE).

4. The WTRU of claim 1, wherein the processor is configured to:
   send the notification to the base station in at least one of a radio resource control (RRC) message or a MAC message.

5. The WTRU of claim 1, wherein to send the notification to the base station comprises being configured to detect a triggering event, and the triggering event is based on the determination that the number of LBT failures associated with the first cell has reached the threshold value.

6. The WTRU of claim 1, wherein to determine that the number of LBT failures associated with the first cell comprises being configured to:
   count a number of uplink transmission failures, wherein the number of uplink transmission failures is associated with the number of LBT failures associated with the first cell.

7. The WTRU of claim 1, wherein to determine that the number of LBT failures associated with the first cell has reached the threshold value based on the detected LBT failure comprises being configured to:
   count the number of LBT failures associated with the first cell; and
   determine that the number of LBT failures associated with the first cell is greater than or equal to the threshold value.

8. A method implemented by a wireless transmit/receive unit (WTRU) comprising:
   detecting a listen before talk (LBT) failure, wherein the LBT failure is associated with a first cell;
   determining that a number of LBT failures associated with the first cell has reached a threshold value based on the detected LBT failure; and
   based on the determination that the number of LBT failures associated with the first cell has reached the threshold value, sending a notification to a base station using a second cell, wherein the notification comprises information associated with the threshold value has been reached.

9. The method of claim 8, wherein the threshold value is configured value, and wherein the threshold value is a maximum number of LBT failures.

10. The method of claim 8, wherein the notification comprises a medium access control (MAC) control element (CE).

11. The method of claim 8, wherein the method comprises:
    sending the notification to the base station in at least one of a radio resource control (RRC) message or a MAC message.

12. The method of claim 8, wherein sending the notification to the base station comprises:
    detecting a triggering event, and the triggering event is based on the determination that the number of LBT failures associated with the first cell has reached the threshold value.

13. The method of claim 8, wherein determining that the number of LBT failures associated with the first cell comprises being configured to:
    count a number of uplink transmission failures, wherein the number of uplink transmission failure is associated with the number of LBT failures associated with the first cell.

14. The method of claim 8, wherein determining that the number of LBT failures associated with the first cell has reached the threshold value based on the detected LBT failure comprises:
    counting the number of LBT failures associated with the first cell; and
    determining that the number of LBT failures associated with the first cell is greater than or equal to the threshold value.

* * * * *

UNITED STATES PATENT AND TRADEMARK OFFICE
CERTIFICATE OF CORRECTION

PATENT NO. : 11,743,079 B2
APPLICATION NO. : 17/875064
DATED : August 29, 2023
INVENTOR(S) : Stern-Berkowitz et al.

Page 1 of 2

It is certified that error appears in the above-identified patent and that said Letters Patent is hereby corrected as shown below:

In the Specification

Column 6, Line 67: Delete "TRU" and insert -- WTRU --.

Column 16, Line 41: Delete "the a" and insert -- a --.

Columns 32-33, Lines 56-67 (Column 32) and Lines 1-8 (Column 33): Delete "Separate MAC entities may be used for one or more (e.g., each) subset of cells. There may be a separate MAC sub-entity for one or more (e.g., each) subset of cells. Separate configuration may be provided and/or used for one or more (e.g., each) MAC entity or sub-entity. The configuration may identify what may be allowed for transmission by a certain MAC entity or sub-entity. The configuration may identify what may be disallowed for transmission by a certain MAC entity or sub-entity. The configuration may associate RBs and/or LCHs with the MAC entity or sub-entity. The configuration may identify and/or provide transmission allowance for one or more RBs, LCHs, MAC-CEs of one or more types, RLC Status PDUs, etc. The configuration may identify and/or provide transmission disallowance for one or more RBs, LCHs, MAC-CEs of one or more types, RLC Status PDUs, etc. A configuration may provide parameters, such as MAC, HARQ, PHR, and/or BSR parameters. The mapping of RBs to LCHs may be configured separately for one or more (e.g., each) MAC entity or sub-entity." and insert the same on Column 32, Line 57, as a new paragraph.

Column 40, Line 22: Delete "AWTRU," and insert -- A WTRU, --.

Column 47, Line 28: Delete "AWTRU" and insert -- A WTRU --.

Column 52, Line 60: Delete "fixed power" and insert -- fixed_power --.

Column 52, Line 64: Delete "fixed power" and insert -- fixed_power --.

Column 53, Line 2: Delete "fixed power" and insert -- fixed_power --.

Signed and Sealed this
Twenty-first Day of November, 2023

Katherine Kelly Vidal
*Director of the United States Patent and Trademark Office*

CERTIFICATE OF CORRECTION (continued)
U.S. Pat. No. 11,743,079 B2

Column 57, Line 56: Delete "sf n." and insert -- sf_n. --.

Column 57, Line 59: Delete "tb n" and insert -- tb_n --.

Column 57, Lines 59-60: Delete "tb n=" and insert -- tb_n= --.

Column 57, Line 61: Delete "tb n" and insert -- tb_n --.

Column 57, Line 64: Delete "(sf n+4)." and insert -- (sf_n+4). --.

Column 57, Line 66: Delete "(sf n+4)" and insert -- (sf_n+4) --.

Column 58, Line 37: Delete "($P_{cMAX,c}$)," and insert -- ($P_{CMAX,c}$), --.

Column 58, Line 43: Delete "($\alpha$)," and insert -- ($\alpha_i$), --.